US006456982B1

(12) United States Patent
Pilipovic

(10) Patent No.: US 6,456,982 B1
(45) Date of Patent: Sep. 24, 2002

(54) COMPUTER SYSTEM FOR GENERATING PROJECTED DATA AND AN APPLICATION SUPPORTING A FINANCIAL TRANSACTION

(76) Inventor: Dragana N. Pilipovic, 325 W. Belden Ave., Chicago, IL (US) 60614

( * ) Notice: Subject to any disclaimer, the term of this patent is extended or adjusted under 35 U.S.C. 154(b) by 0 days.

(21) Appl. No.: 08/086,002

(22) Filed: Jul. 1, 1993

(51) Int. Cl.[7] .............................................. G06F 17/60
(52) U.S. Cl. .............................. 705/36; 705/1; 705/10; 705/35; 705/37
(58) Field of Search .................................. 364/401, 402, 364/408; 705/1, 7, 35, 36, 37, 10, 42

(56) References Cited

U.S. PATENT DOCUMENTS

| | | | | |
|---|---|---|---|---|
| 5,148,365 A | * | 9/1992 | Dembo | 364/408 |
| 5,189,608 A | * | 2/1993 | Lyons et al. | 364/401 |
| 5,282,128 A | * | 1/1994 | Braude | 364/148 |
| 5,307,260 A | * | 4/1994 | Watanabe et al. | |
| 5,313,560 A | * | 5/1994 | Maruoka et al. | 395/54 |
| 5,521,814 A | * | 5/1996 | Teran et al. | |
| 5,657,255 A | * | 8/1997 | Fink et al. | |
| 5,712,984 A | * | 1/1998 | Hammond et al. | |
| 5,806,049 A | * | 9/1998 | Petruzzi | |

FOREIGN PATENT DOCUMENTS

JP 04359365 A * 12/1992 ........... G06F/15/21

OTHER PUBLICATIONS

Scott, Louis O., "The Information Content of Prices in Derivative Security Markets", International Monetary Fund Staff Papers, v39n3, pp:596–625, Sep. 1992.*

* cited by examiner

Primary Examiner—Hyung-Sub Sough
Assistant Examiner—Calvin L. Hewitt, II
(74) Attorney, Agent, or Firm—Brinks Hofer Gilson & Lione

(57) ABSTRACT

In a computer system, a method for making the system and a method for using the system, the invention includes providing a data processing system to generate projected data for variables. The data processing system includes a digital computer performing steps of processing the input data to calculate projected data respectively for a plurality of variables, and generating output including the projected data; wherein the processing was first tested for accuracy by preprocessing input test data to calculate projected test data for the variables and by preprocessing the projected test data to derive a portion of the input test data from the projected test data.

41 Claims, 24 Drawing Sheets

FIG. 11
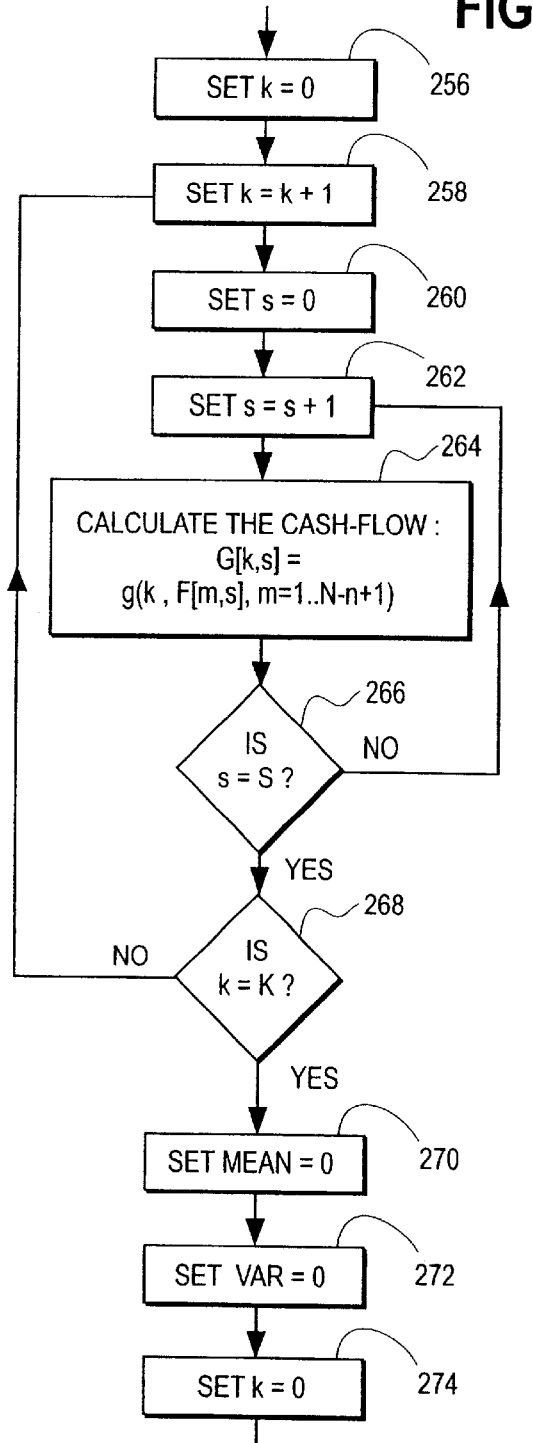
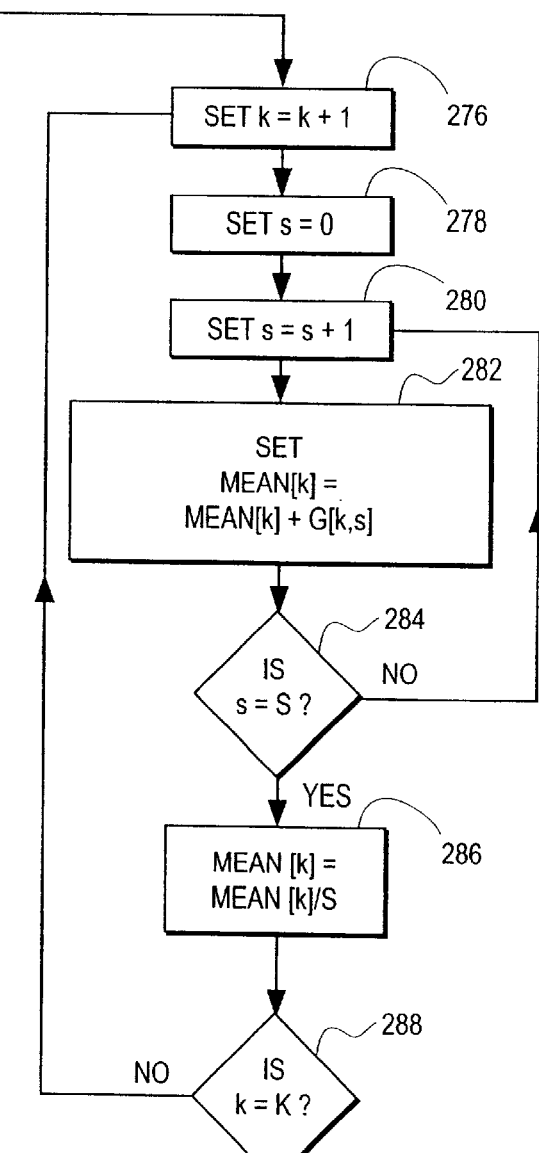

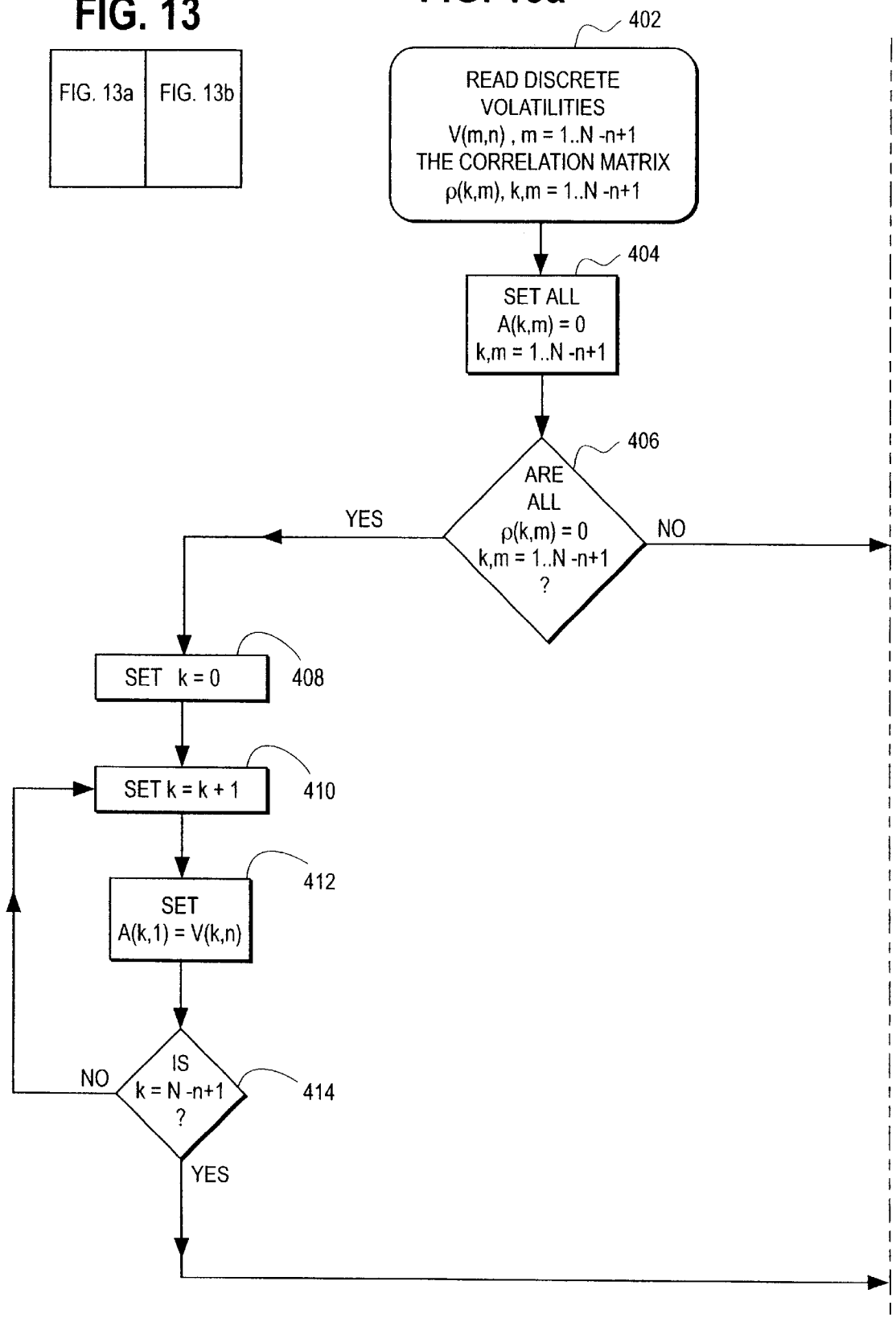

MARKET FORWARD PRICES
ACROSS EXPIRATION TIMES

HISTORICAL SINGLE PERIOD VOLATILITIES
ACROSS FORWARD PRICE EXPIRATION TIMES

MARKET OPTION VOLATILITIES
ACROSS OPTION EXPIRATION TIMES

SINGLE PERIOD CORRELATIONS
ACROSS FORWARD PRICE EXPIRATION TIMES

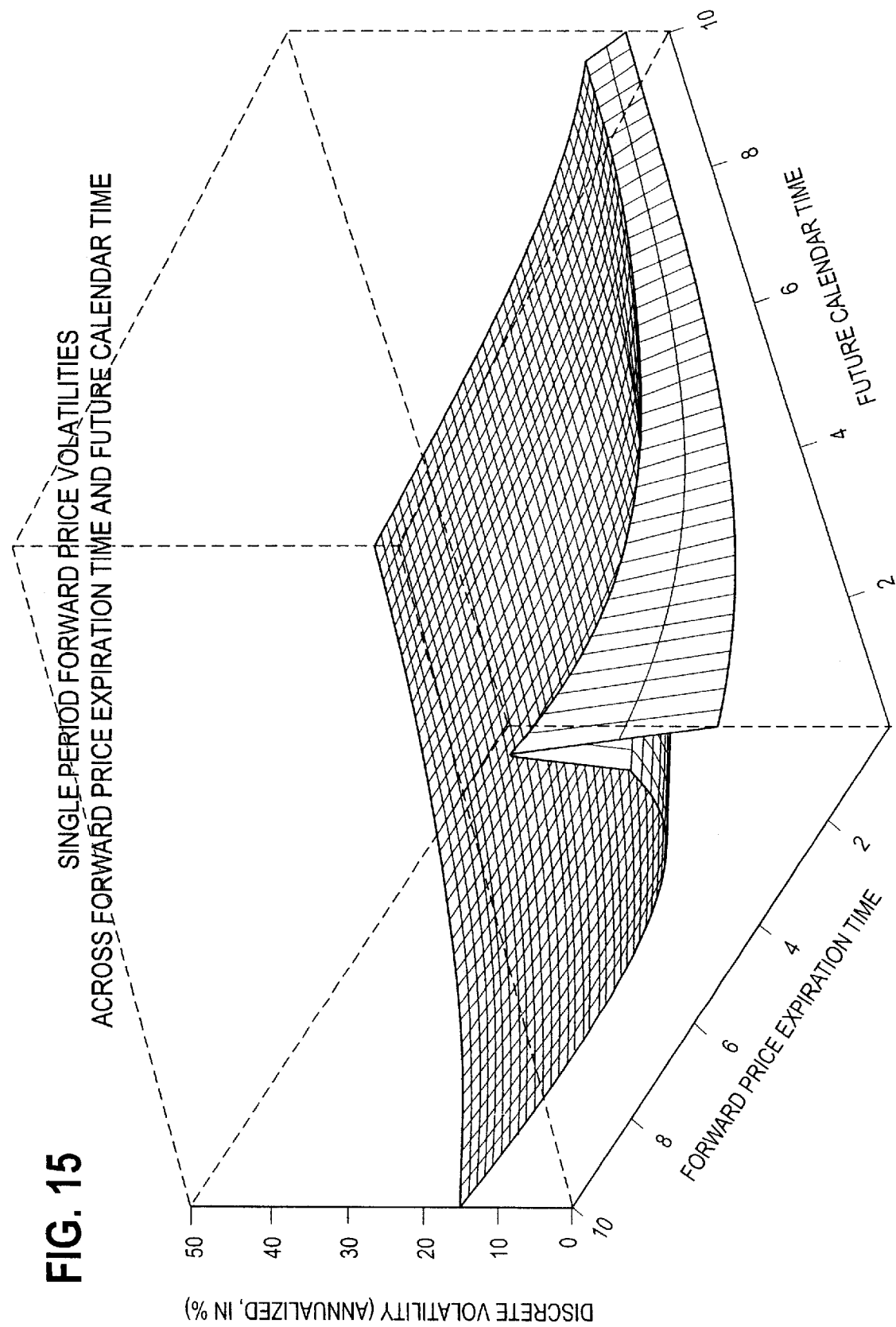

CALENDAR PERIOD: 1
DISCRETE VOLATILITIES

CALENDAR PERIOD: 2
DISCRETE VOLATILITIES

CALENDAR PERIOD: 3
DISCRETE VOLATILITIES

CALENDAR PERIOD: 4
DISCRETE VOLATILITIES

MEAN FORWARD PRICE CURVE

MEAN FORWARD PRICE CURVE

MEAN FORWARD PRICE CURVE

MEAN FORWARD PRICE CURVE

SPOT PRICE DISTRIBUTION

SPOT PRICE DISTRIBUTION

SPOT PRICE DISTRIBUTION

SPOT PRICE DISTRIBUTION st = 1 mean p&l = -0.3144 pandl (,i + 1)

st = 2 mean p&l = -0.3047 pandl (,i + 1)

st = 3 mean p&l = -0.259 pandl (,i + 1)

st = 4 mean p&l = -0.1784 pandl (,i + 1)

st = 5 mean p&l = 0.0545 pandl (,i + 1)

st = 1 mean cum p&l = -0.3144 cumpandl st = 2 mean cum p&l = -0.6192 cumpandl st = 3 mean cum p&l = -0.8782 cumpandl st = 4 mean cum p&l = -1.0566 cumpandl st = 5 mean cum p&l = -1.0021 cumpandl st = 1 mean npa = 100 st = 2 mean npa = 100 st = 3 mean npa = 100 st = 4 mean npa = 100 st = 5 mean npa = 42.4688 st = 1 mean delta = 0 st = 2 mean delta = 0.0025 st = 3 mean delta = 0.0025 st = 4 mean delta = 0.0025 st = 5 mean delta = 0.0014 st = 6 mean p&l = 0.0998 st = 7 mean p&l = 0.1225 st = 8 mean p&l = 0.1405 st = 9 mean p&l = 0.1422 st = 10 mean p&l = 0.1507 st = 6 mean cum p&l = -0.9023 st = 7 mean cum p&l = -0.7798 st = 8 mean cum p&l = -0.6393 st = 9 mean cum p&l = -0.4971 st = 10 mean cum p&l = -0.3463 st = 6 mean npa = 34.1136 st = 7 mean npa = 29.9758 st = 8 mean npa = 27.596 st = 9 mean npa = 25.819 st = 10 mean npa = 24.621 st = 6 mean delta = 0.0008 st = 7 mean delta = 0.0007 st = 8 mean delta = 0.0006 st = 9 mean delta = 0.0006 st = 10 mean delta = 0.0005 st = 2 SwapValue = 0.0674 st = 2 curr vol = 15.49 st = 3 SwapValue = 0.0674 st = 3 curr vol = 14.73 st = 4 SwapValue = 0.0674 st = 4 curr vol = 14.92 st = 5 SwapValue = 0.0674 st = 5 curr vol = 14.25 st = 6 SwapValue = 0.0674 st = 6 curr vol = 13.62 st = 2 swap vol = 15.49 sqrt (swapvol/i)

st = 3 swap vol = 15.12 sqrt (swapvol/i)

st = 4 swap vol = 15.05 sqrt (swapvol/i)

st = 5 swap vol = 14.86 sqrt (swapvol/i)

st = 6 swap vol = 14.62 sqrt (swapvol/i)

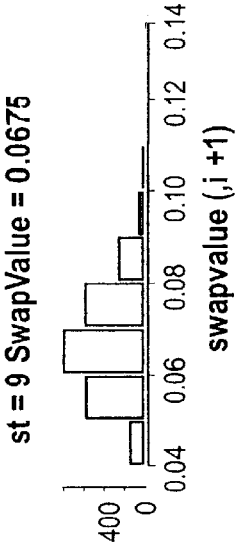
FIG. 20a
FIG. 20b
FIG. 20c
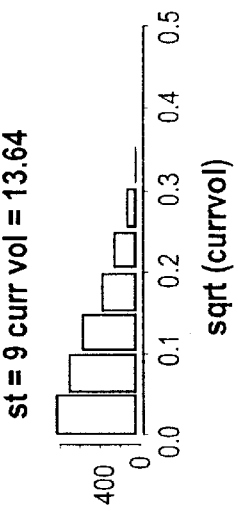
FIG. 20d
FIG. 20e
FIG. 20f
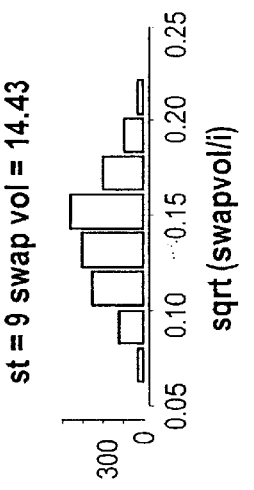
FIG. 20g
FIG. 20h
FIG. 20i

COMPUTER SYSTEM FOR GENERATING PROJECTED DATA AND AN APPLICATION SUPPORTING A FINANCIAL TRANSACTION

I. FIELD OF THE INVENTION

The present invention is directed to electrical computers and data processing systems, with applications involving finance. More particularly, the present invention includes an apparatus, along with methods for making and using it, to receive input data (which can represent market data), to process the input data to calculate projected data, and to generate output including the projected data, wherein the processing was first tested by calculating projected test data from input test data and then using the projected test data to derive a portion of the input test data. The projected data can include financial simulations of future market behavior, such as prices, to aid in making financial decisions including transactions, hedging, etc.

II. BACKGROUND OF THE INVENTION

A. Overview

Many mathematical and statistical techniques have been used to estimate the likelihood of future events. Sophisticated techniques include "Random Walk" models which assume that future behavior characteristics will continue as they have in the past. Thus, projections and distributions of projections can be made and, by examining historic data, a statistical level of confidence for the projections can be computed. Such models, which are usually implemented by computer, have been used as the basis for making financial decisions.

To intelligently engage in market transactions—buying or selling a financial product, and even maintaining an investment position—players considering possible future market behavior make projections from present market phenomenon. One aspect of such projections involves market simulations, wherein the future market prices of such financial products as futures, swaps, options, and any other derivative products are randomly generated in great numbers and over chosen future time periods.

A "forward price" is a risk-adjusted future spot price; a "future spot price" is the spot price to be observed at some future time; and the "spot price" is the price for which some asset can be exchanged for money. In case of commodity markets, the 'asset' is some commodity; in case of equity markets, the asset is some stock; in case of interest rate markets, the 'asset' is some type of a loan or deposit. A financial "derivative" is a financial product having future cash flows, the values of which are derived as functions of future spot prices.

Financial products that commonly use simulation include: for Interest Rate Markets—mortgage-rate contingent derivative products (e.g., derivative products for which future cash flows are derived as functions of future mortgages rates as 'spot prices'); path-dependent options, swaps, and swaptions (these are derivative products having future cash flows derived as functions of future London Inter Bank Offering Rates as 'spot prices'; and, counter-party risk exposure calculations (here, the 'spot prices' can be any of the foregoing, but are combined with the additional default information of the counterparty); for Commodities—path-dependent options (which are derivative products having cash flows derived as functions of more than one future spot price, and where the future spot price is the price of the commodity at the corresponding future date), swaps and swaptions (these are derivative products having cash flows derived as functions of future spot prices, the spot prices being the commodity prices); and, counter-party-risk exposure calculations (which are functions of commodity spot prices and counterparty risks, but applied to commodity-related products); and for Equities—hedging scenarios (these are cash flows which result from using a particular market hedging strategy, with the cash flows derived as functions specific to the hedging strategy and of future equity prices as the 'spot prices'), and counter-party-risk exposures.

Simulations can also involve using present information about liquid financial products to predict forward prices and to generate price distributions of various liquid and illiquid financial products. As the number of random numbers increases, the average of simulated changes in prices "converges" toward the drift term, which is defined below.

Prices are typically considered as following "Brownian motion." According to Brownian motion, a percent change in price depends on a deterministic drift term (i.e., an expected change in price) and a random term (which gives variability to price changes around the expected change in price). The future value of the random term cannot be predicted per se. However, the magnitude of price changes can be measured statistically as the price volatility over some previous time period. Thus, in simulating future prices, many random terms can be generated to build a future price distribution. The greater the number of random numbers generated, the closer the average of the simulated prices represents the drift term and the closer the simulated distribution represents the price volatility about the drift term.

At any point in time, the markets will provide quotes on the spot price and on a series of forward spot prices—the quotes corresponding to a number of different future time periods. A market quote for a forward spot price corresponding to some future time period represents the market's expectation of what the spot price will be at that future time period—adjusted for risk.

The market quotes for the spot price and the forward prices combine to create what is called the "forward price curve." Very seldom is the forward price curve the same from day to day, and it is the movement of the forward price curve which the simulations attempt to realistically represent.

Simulating methodologies typically use statistical parameters—such as price volatility and other characteristics of pride probability distributions to predict the distributions of various financial derivative product prices. Simulations of the distributions of derivative product future cash-flows can be used to solve a, variety of problems including pricing, hedging analysis, and profit-loss analysis, as set forth below.

1. Pricing

Simulations can be used in pricing financial products, even those which are difficult to price because they are illiquid (i.e., rarely traded) and thus do not have a readily available market price. Such financial products are difficult to price easily or correctly with readily available, simpler pricing techniques.

2. Hedging

Simulations can be a powerful financial tool for hedging analysis or portfolio management. The simulation of the market behavior allows for an analysis of particular hedging scenarios which a firm might consider for managing its exposure to market risks. In comparing different hedging scenarios, one would analyze the standard deviations of the simulated distributions: the smaller the standard deviation, the better is the hedging scenario.

3. Profit/Loss Analysis

Simulations can also be used to simulate the profit and loss distributions of portfolios of derivative products. The generated distribution of the portfolio performance may be used very generally to manage a firm's exposure to the market risks. By incorporating the market risks with the counter-party default risks, simulations can be used to manage the firm's exposure to the counter-party risks. Particular measures of this counter-party risk exposure can be used by the firm to make decisions on when to limit the firm's dealing with some counter-party. For these purposes, one would analyze the "tails" of the distribution curves which would represent unlikely but extreme events.

B. Methods of the Prior Art

Simulation methods are widely used in fields such as physics and finance. Through a method commonly referred to as "Monte Carlo," a large number of random numbers are generated in simulating random behaviors. All Monte Carlo methods have in common an assumption that random behaviors can be represented by using a Random Walk model. To select a particular Random Walk model, performance of the model is tested by calculating confidence levels from historic data.

Specifically, in finance, Monte Carlo methods have been used to calculate expected prices for financial products. In general, pricing methods use such statistics to simulate forward price or forward cash flow distributions; these methods use the average of these distributions to predict the expected forward price or expected forward value of the cash flow.

Consider, for example, a financial product which has an uncertain future cash flow occurring at some known future time. The distribution that would be used to price this financial product would be a probability distribution of this future cash flow. Then, the average price of the distribution is the expected forward price of the financial product. The present value of this forward price would represent the price one would pay today in order to receive the uncertain future cash flow.

Methods of the prior art, which are almost always computerized, include a single-factor model, a two-factor model, and a multi-factor model. The most frequently used model is the single-factor model, followed closely by the two-factor model. While considered superior in theory, multi-factor models have not been in common use due to problems in applying them.

1. Single-factor Model

The simplest existing market simulation methods include the single-factor model. Typically, this model assumes that the historical distribution of spot prices provides all the information needed to determine the distribution of spot prices in the future. The single-factor in this model stands for a single distribution (of the spot price) being generated at every point in time.

The single-factor model is extremely simple in design and cannot incorporate present market information about future events. The simplicity of this model has to do with the fact that it assumes that there is a single variable (termed the "driver factor" or the "independent variable") that moves around and cannot be exactly predicted. This single variable is assumed to drive all other prices (termed the "dependent variables").

An example of a single-factor model would be one having all the forward prices for a forward price curve move Unequally or in proportion to each other over time. This means that if the spot price goes up, all the forward prices—the dependent variables—on the curve at that particular time go up. See FIG. 1.

Typically, the driver factor is the spot price. Thus, the distribution of the spot price at some time in the future is simulated such that it is centered around today's spot market price. In the case of the crude oil market, for example, the expected forward spot price of West Texas Intermediate (WTI) crude oil (in present dollar terms) would be, according to this single-factor model, today's spot market price.

2. Two-factor Model

A two-factor simulation model can represent market behavior better by adding a second driver factor to drive the forward price curve. The important distinction here is that two things are allowed to be random, thus allowing a better representation of future market behavior. See FIG. 2.

An example of a two-factor model would be the case where the spot price is the first driver factor and some long-term forward price is taken to be the second driver factor. Now the curve could become steeper or flatter while at the same time the overall forward price level could go up or down.

3. Multi-factor Model

Finally, a multi-factor simulation model for the market prices brings variability into the whole curve of forward prices for any future calendar time (i.e., simulation node), as illustrated in FIG. 3.

The market provides quotes for current forward prices for different periods, thereby defining a curve for the particular market in question. This curve is used as the starting point for the multi-factor simulation. For the sake of the example, consider that the market has provided forward spot prices for ten different future dates of some particular interest rate, commodity, or equity; these are used to construct the forward price curve. Then, at the first future calendar period of interest (i.e., also known as the first "simulation node") ten forward price distributions can be randomly generated around the present market forward price values. Thus, the distribution of each forward price at some future time is characterized by its average, which is also the current market value of the forward price. Historical correlations between the movements of different futures prices along the curve can also be built into the multi-factor model.

The state of the art for known multi-factor models typically assumes that the distributions of the forward prices at any point in time are centered around the existing forward prices implied by today's market. For example, if the current forward rate curve as quoted in the market indicates that the market forward rate for a three month loan effective one year from today (expressed in terms of general language used here, this forward rate would be the 'forward spot price' for a future time which is one year away from today) is 5%, then the simulation will center all the three month rates with forward start times one year away at any simulation node at 5%. Typically, the variability of the forward prices is assumed constant, and is either given the current market option volatility quote value or a long-term historically calculated value.

C. Drawbacks with these Methods

Unfortunately, the above-described methods have drawbacks that have not been solved in the prior art. The primary test of the accuracy of a simulation model is how closely its answers correspond with market events, and these three existing methods fail this test due to errors in their basic assumptions.

1. Drawbacks of the Single-factor Model

A single-factor model, while easy to use due to its simplicity, is overly simple as it assumes that all market prices are driven by a single random independent variable. In reality, many market variables exhibit randomness, and market prices of financial derivative products are often functions of several if not all of these independent variables. Needless to say, the simulations of markets through the use of a single-factor model give prices of financial derivative products—as the dependent variables—which do not, when tested, all simultaneously converge to their present market prices. (Convergence should occur as the number of random values generated and used in the creation of the price distributions increases.) Accordingly, applying the same single-factor simulations to different financial products would put the user at the risk of arbitrage: using these simulations to price a variety of derivative products would put the user at financial risk from dealing with somebody whose more realistic simulations converge just slightly closer to the market values. The analogy could be made to an 'insider/outsider' trader—one who uses simulations which reflect a better knowledge of market behavior versus a trader with a simulation model that reflects very little about the actual market behavior. Accordingly, using the single-factor model as a guide in making financial transactions, and even in making the decision to maintain an investment position, would not be as financially productive as would using a more accurate model.

In summary, the problems with the single-factor model are as follows: (i) simulations do not converge to market prices; (ii) a single driver-factor is inadequate to represent the complicated market reality; (iii) the model does not provide a means for correctly simulating and pricing illiquid products as dependent variables using liquid product data; and (iv) financial transaction decisions based on the model are not as good as they would be if a more accurate model were used.

2. Drawbacks of the Two-factor Model

While the two-factor model captures much more of the market reality through the additional driver factor, it still overly simplifies market behavior. It also does not provide for simultaneous convergence to market prices of a variety of financial products as dependent variables as two factors is still not enough to fully explain the manner in which the forward price curves move over time. In other words, the market forward price curves are in reality driven by much more than just two driver factors.

In summary, the problems with the two-factor model are the same as-with the single-factor model, those being: (i) averages of distributions of do not converge to market prices; (ii) while there is an improvement over a single-factor, two factors are still inadequate to represent the complicated market reality; and (iii) the model does not provide a means to simulate the behavior of and price illiquid products using liquid product data; and (iv) financial transaction decisions based on the model are not as good as they would be if a more accurate model were used.

3. Drawbacks of Multi-factor Model

Multi-factor models have the most potential for representing the complex behavior of the market because they do not limit the number of driver factors. These models typically use ten to twenty such driver factors.

Multi-factor models attempt to address two of the problems with the single- and two-factor models. With regard to the problem of simulating illiquid product prices using liquid product data, multi-factor models have the theoretical ability to break market behavior down into driver factors that can then be used to define the relationships between liquid and illiquid products—relationships that in turn can be used for simulating the behavior of any financial product—liquid and/or illiquid. To date, however, no model is known to have been able to actually perform this task.

Also, the fundamental problem of market convergence, continues to be an issue. Existing methods have not provided accurate price predictions for liquid products. By extension, if these models cannot predict accurate liquid product prices as represented by market prices, they can not accurately predict illiquid product prices using liquid data. In order to use liquid market data to simulate the behavior of illiquid product prices, the convergence of the method back to observed liquid product market prices is used.

A primary cause for the lack of market convergence is that, generally, the multi-factor models center all forward spot price distributions around the current spot market price. This assumption is contrary to the way in which market prices are determined. In reality, the current market forward prices represent the risk-adjusted future spot prices. This information is ignored by current technology. Risk-adjusted future spot prices need to be taken into account appropriately by the simulation technology, and existing multi-factor models fail to do so.

Furthermore, there is the issue of the volatility of the forward spot prices that are used as the driver factors and, in particular, how that volatility changes over time. The current multi-factor simulation technology does not address this issue and generally assumes that the variability of each forward spot price is constant over time. In reality, however, the market prices of derivative products—the dependent variables—tend to reflect the changing volatilities of the driver factors.

Unless the volatilities of forward prices as the independent variables are allowed to change over time, the simulated behaviors of dependent variables turn out to be inaccurate. In fact, holding forward price volatilities constant (as most models do) has the following negative effects: (i) this is not what is observed in historical data—thus the assumption of constant volatilities contradicts the statistically observed volatility behavior; (ii) this is not what is observed and implied by market prices of options—thus the assumption of constant volatilities contradicts the market expectations of how that volatility will behave over some future time period; and (iii) the bridge between the liquid option volatility market information and the historical forward price volatilities cannot be built without allowing the volatilities to change over time—as constant volatilities contradict both the historical and the current market observations and thus also ignore any meaningful relationship possibilities between the two observations. Thus, as with other models of the known prior art, financial decisions based on the use of a multi-factor model are not as good as they would be if they were based on a more accurate model.

The problems with existing multi-factor models can therefore be summarized as follows: (i) the averages of distributions of dependent variables do not converge to market prices; and (ii) while existing multi-factor models provide a means for simulating and pricing illiquid products-sometimes using liquid product data, these models fail to simulate liquid products in convergence back to the same market data used as inputs, which guarantees inaccuracies in simulating behaviors of other liquid or illiquid prices—if the simplest liquid products cannot be priced correctly, then correct pricing of more complicated liquid or illiquid products cannot be expected; (iii) the models exclusively rely on current spot prices for developing future spot price distributions, thus ignoring the market information provided by the market forward prices which include information about future spot prices; (iv) existing methods are typically unable to account for changing volatilities of driver factors and thereby make the inaccurate assumption that these driver factor volatilities remain constant over time; and (v) financial transaction decisions based on the model are not as good as they would be if a more accurate model were used.

In sum, then, the above-referenced prior art has not yet uncovered a system for simulating, pricing, and hedging financial products without significant drawbacks and limitations.

III. SUMMARY OF THE INVENTION

A. Objects of the Invention

In general, the present invention is intended to have utility in addressing problems, particularly those inherent in the existing multi-factor simulation methods, and as an improvement over the prior technology, as indicated by the following additional, representative objects of the invention.

An object of the present invention is to provide a computerized system for simulating, pricing, and hedging financial products.

It is also an object of the present invention to provide a multi-factor computerized system for simulating, pricing, and hedging financial products with convergence to market price.

An additional object of the present invention is to provide a multi-factor computerized system for simulating, pricing, and hedging financial products in a manner consistent with data inputs.

A further object of the present invention is to provide a multi-factor computerized system for simulating, pricing, and hedging financial products with consistency among simulations of driver factor behavior and dependent variable behavior.

Another object of the present invention is to provide a multi-factor computerized system for simulating behavior of, generating distribution of, pricing, and hedging financial products, the system having consistency among final outputs.

Yet another object of the present invention is to provide a model that uses market information provided by the market forward prices, which includes information about future spot prices.

Still another object of the present invention is to provide a model that accounts for changing volatilities of driver factors.

Still another object of the present invention is to provide a model that facilitates financial transaction decisions.

Other objects and advantages of the present invention will become apparent from the following summary of the invention, drawings, and detailed description of a preferred embodiment of the present invention.

B. SUMMARY OF THE INVENTION

In accordance with the objects of the present invention, a computer system for generating and testing projected data is provided. The system includes a digital computer connected to means for receiving input data for making projections about a first variable and means for outputting processed data; and logic means for controlling the digital computer. The logic means implements a mathematical technique underlying the present invention. The logic means uses the technique to process the input data to calculate projected data, to test the accuracy of the projected data by calculating the input data from the projected data, and to generate output including the tested projected data. The projected data can include volatilities for the projected data.

The logic means can also use the technique to generate distributions of the variable. The average of each variable distribution converges to the projected data as the number of simulated projected data generated to form the distribution increases. And the simulation also can have distributions of the volatilities, each having an average. The simulations are generated so that the averages converge to the volatilities with an increase in the number of volatilities generated.

The system can be applied to simulating behavior of, generating distribution of, pricing, and hedging financial products, and for supporting financial decisions, such as whether to make a particular transaction. The system, termed for recognition in the market the "Univol System," is a multi-factor model which uses forward prices as the driver factors. However, the Univol System improves over the prior art as set forth below.

1. Convergence with Market Price

No known existing technology converges the averages of generated distributions to the input data, e.g., converges output expected prices to prices actually observed in the market. However, the present invention starts with the current market prices, uses them as inputs to the system, and then works backwards to build relationships between observed and simulated variables, thereby converging the expected prices on the market prices.

2. Consistency Between Data Inputs, Intermediary Simulations, and Final Outputs The present invention uses data. as inputs to the process of defining driver factors. The definitions are then tested for accuracy by calculating the input data from the projected data. When used in a financial application, say, to facilitate a decision to buy, sell, or keep a financial product, the input data includes the most recent liquid market data. The computer system is then used to compute present market values and their distributions, which are then used as a basis for making a buy, sell, keep decision.

Because the averages of distributions of financial products, the market prices of which were used as input data, converge back to the input market prices, there is consistency between the market data that is input and the simulated market behavior of the liquid products.

The driver factors, which can be built using the information from the liquid market data, are then used to simulate the illiquid market data. Therefore, both the liquid and illiquid products in a sense have a common denominator—the driver factors. Thus, there is consistency between the treatment of liquid and illiquid products.

3. More Realistic Price Distributions

Prior art methods generally center all forward spot price distributions around a single price, namely a particular day spot price. In the present invention, however, the simulated forward spot prices for any time T in the future are driven by the market expectation of future market spot prices for the same time T—risk adjusted. This distribution-centering strategy more realistically reflects market expectations. By building distributions around these market expectations, the expected variability of markets is better incorporated.

The present invention recognizes that the expected spot price at some time T in the future—risk-adjusted—is today's forward price expiring at time T. Thus, the simulated spot price distribution for future calendar time T is centered around today's forward price expiring at time T.

One can visualize this process as follows: the expected forward price curve retains its shape but moves to the left over future calendar time. (See FIGS. 4a–4c.) For example, today the spot price is quoted at $95 and the three-month forward price is quoted at $100. Then, three months from now, the present invention would project the risk-adjusted spot price to be $100, whereas other methods might project the value to be $95.

4. Allows Volatilities to Change

The present invention makes use of a tendency of the current period forward price volatilities to revert back to the long-term historical volatilities. Thus, the present invention is able to capture changes in volatility values over time by dynamically relating the current period forward price volatilities to these long-term historical volatilities.

5. Supports Financial Decisions

The present invention facilitates those financial decisions that have been made using the models of the above-mentioned prior art, except that the decisions are made more accurately. This accuracy should be reflected in increased profits from transactions made (and refrained from) based upon the information generated by the present invention.

Indeed, a wide spread use of this invention ought to make the markets more efficient and the bid/ask spreads on swaptions (an example of an illiquid financial product) tighter, as the invention would provide a means for pricing the swaptions in a manner that is consistent with the pricing of all other liquid derivative products—and thus would eliminate the guess-work which is currently involved in the pricing of illiquid products, such as swaptions.

C. BRIEF DESCRIPTION OF THE DRAWINGS, CODE, AND COMPUTER RUNS

1. Drawings

Figure 1:
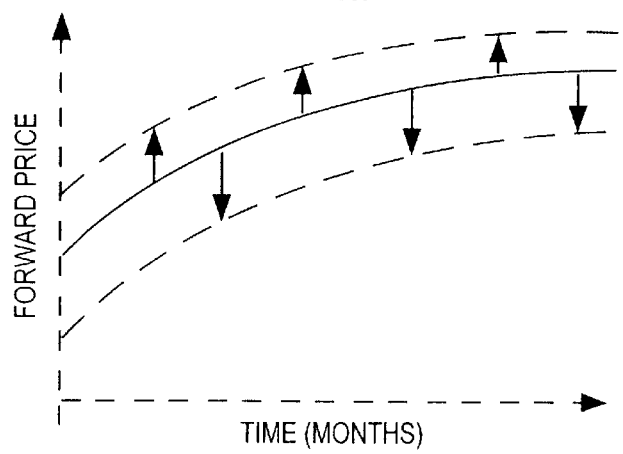
FIG. 1 is a graph representing simulation in accordance with a Single-factor Model of the prior art.
Figure 2:
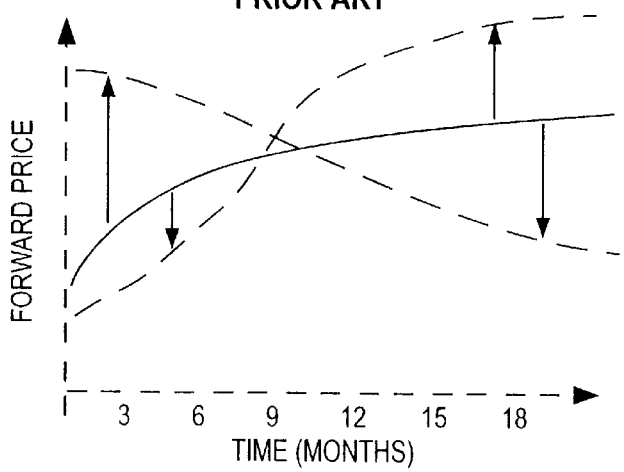
FIG. 2 is a graph representing simulation in accordance with a Two-factor Model of the prior art.
Figure 3:
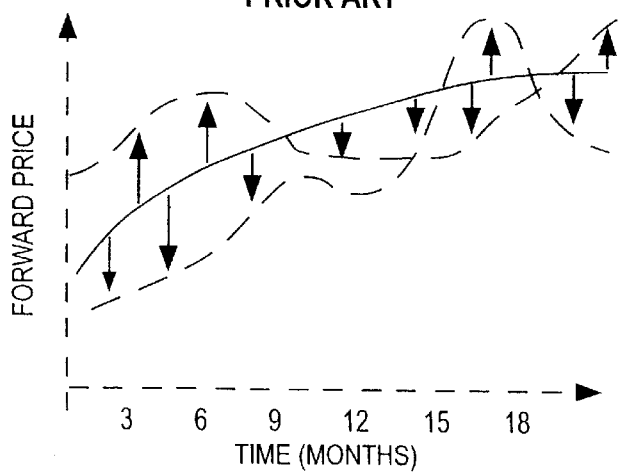
FIG. 3 is a graph representing simulation in accordance with a Multi-factor Model of the prior art.

FIGS. 6–13 collectively represent a flow chart for Logic Means of the present invention.

FIGS. 14a–14d provide an example of four input data sets for dollar interest rates.

FIG. 15 is a graph representing the calculated discrete volatility matrix—across forward price curve and future calendar times—illustrative of Generated Output pursuant to the present invention.

FIG. 16 is illustrative of Generated Output pursuant to the present invention.

FIG. 17.is illustrative of Generated output pursuant to the present invention.

FIG. 18 is illustrative of Generated Output pursuant to the present invention.

FIG. 19 is illustrative of Generated Output pursuant to the present invention.

FIG. 20 is illustrative of Generated output pursuant to the present invention.

2. Computer Code

Exemplary computer code for making an embodiment of the present invention is included herein as Appendix I. The exemplary code is consistent with the logic in FIGS. 6–13.

3. Computer Runs

Exemplary computer runs produced by using the compiled computer code of Appendix I in operating a computer in accordance with the present invention are included herein as Appendix II–Appendix IV. The runs are consistent with the input data sets of FIG. 14 and the Generated Output in FIGS. 15–20.

IV. DETAILED DESCRIPTION OF A PREFERRED EMBODIMENT OF THE INVENTION AND METHODS FOR MAKING AND USING IT

Generally, the present invention can be viewed as including a method for using a data processing system to generate projected data for variables. The data processing system can comprise a digital computer having a processor operably connected to memory for storing logic means, the processor also operably connected to means for receiving input data and to means for outputting processed data. The logic means is for controlling the digital computer to perform steps of processing the input data to calculate projected data respectively for a plurality of variables, and generating output including the projected data; wherein the processing was first tested for accuracy by preprocessing input test data to calculate projected test data for the variables and by preprocessing the projected test data to derive a portion of the input test data from the projected test data. An important feature of the present invention is that it permits processing such that an increased number of values in a distribution of values for the variables produces increased convergence on the portion of input data. Applications of the present invention include as making financial buy\sell\keep decisions for financial products in response to the output of the data processing system.

The present invention can also be viewed as including the aforementioned data processing system itself, as well as a method for making it. In making the data processing system, it is important to first test the processing for accuracy by preprocessing input test data to calculate projected test data for the variables and preprocessing the projected test data to derive a portion of the input test data from the projected test data. By this approach, a simulation can indicate the expected behavior of at least one variable, for example, price of a liquid financial product. And once the simulation approach is established, it can also be used to indicate the expected behavior of another variable, for example, an illiquid financial product.

A. How to Make the Invention

Figure 5:
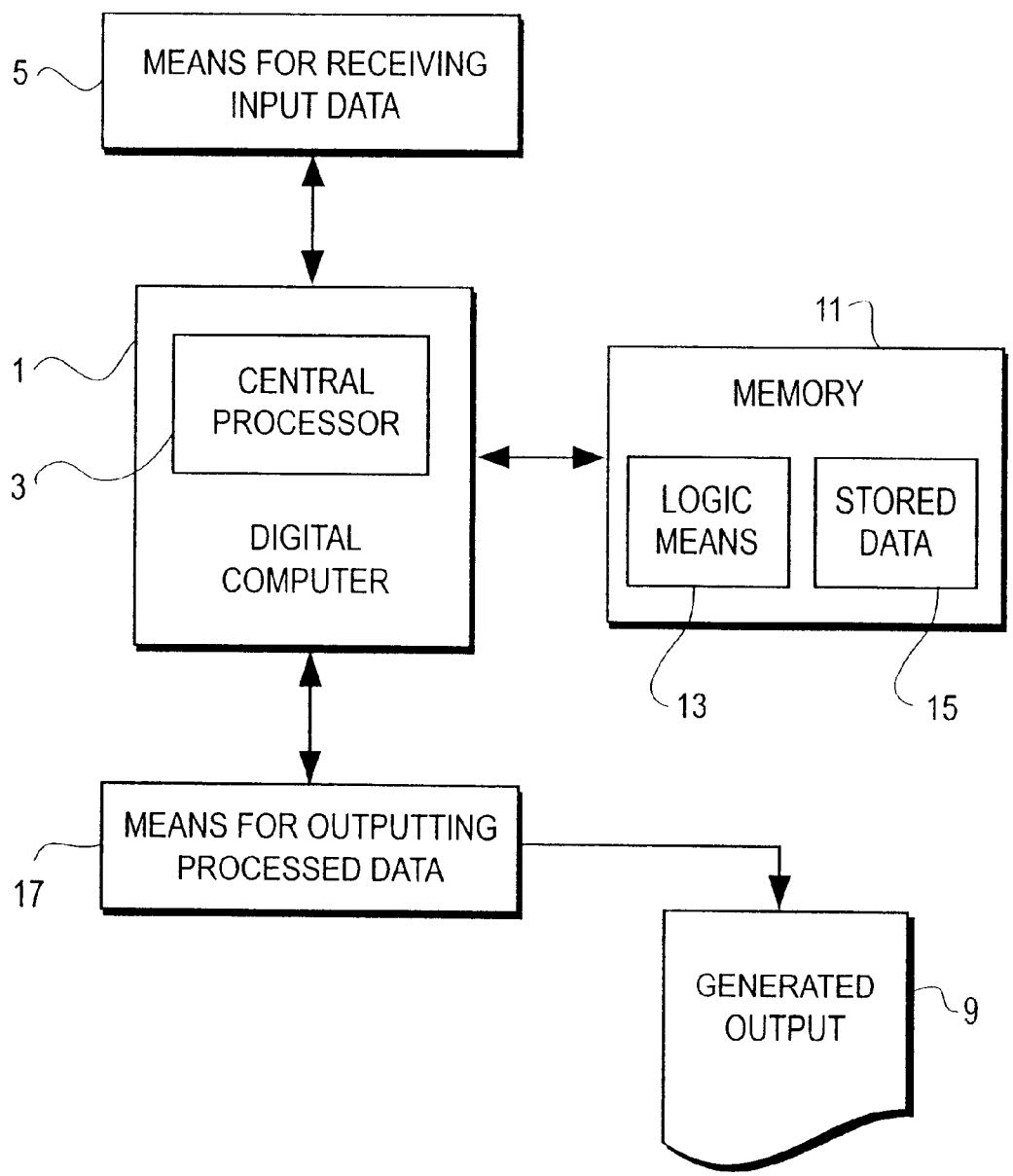
FIG. 5 is an overview of the present invention.

FIG. 5 shows a representative example of elements of the present invention. There is a digital electrical Computer 1, which can be an IBM, personal computer, a Work Station, or any other digital means for computing. Computer 1 has Central Processor 3, for example, be a 486 processor, and a DOS or a UNIX Operating System. Computer 1 is operably connected to Means for Receiving Input Data 5, such gas a keyboard, mouse, or modem. Computer is also operably connected to Means for Outputting Processed Data 17, such as a terminal screen or a printer, to produce Generated Output 9. Computer 1 is operably connected to Memory 11, such as a disk drive and disc, a "hard drive" memory, or the like that can store Logic Means 13 and Stored Data 15.

Preferably, aspects of the present invention are implemented in software, i.e., at least one computer program. Alternatively, the present invention can be implemented in a hardwired embodiment, to the extent that all digital computer programs have hardware equivalents. Of course, loading software into a conventional computer in effect makes a new computer by setting switching devices in the computer. Thus, the logic of Logic Means 13 can equivalently be used regardless of whether a hardware or software embodiment is preferred. However, a software embodiment of the present invention is preferred for flexibility and ease of construction.

More particularly, Computer 1 has a memory within for facilitating the running of a computer program such as that for Logic Means. 13 (see Appendix I). The memory requirements. for Computer 1 relate to the use of random numbers: The greater the number of the random numbers to be generated, the more stable are the results. And, the greater the number of the random numbers to be generated, the more memory (disc and RAM) is required by the logic for storage and processing of the generated distribution data. However, such a computer program could be run on smaller memory allocations, but with limitations on the number of random numbers which can be generated per distribution.

Also, in making the present invention, as opposed to using it, an additional Computer Program 17 is used, such as a compiler which also has the built in functionality of generating random normally distributed independent numbers. The code in Appendix I is S-Plus, a UNIX based statistical package having graphics and math capabilities. However, suitable compilers include FORTRAN; Turbo Pascal, C, C++, etc. Also, worksheets or statistical packages which allow for macro building and random number generation could do the job—but perhaps not with quite as much speed. For graphics output, a graphics package should be used with the compiler. However, the graphs in the simulations are just an additional feature and certainly not a requirement. Thus, the full use of the invention would be just as obtainable without a graphics package linked to Logic Means 13. Of course, the output would only then be available as numbers—which is not as easy to 'summarize' conceptually as the graphs are.

Generally, Logic Means 13 could be adapted to have input formats and screens, such that in a more sophisticated form, it could be mouse and window driven. But the logic in its simplest form could be purely 'prompt-driven' or ASCII file driven. The inputs and screens do not have any particular requirements other than that they allow for the input of the input data in one form or another.

More particularly, the logic of Logic Means 13 is illustrated in FIGS. 6–13. Beginning with FIG. 6, the elements of the overall logic are illustrated. There is Procedure 2, which reads in all the market and historical data inputs. These inputs include the following: the market spot and forward prices—this market data comprises a vector 'MF' of length N+1 of real numbers; the market option volatilities—this market data comprises a vector of length N of real numbers; the historical, statistically calculated, long-term mean volatilities—this historical data comprises a vector 'H' of length N of real numbers; each forward price in vector MF represents the risk-adjusted future spot price at some future time, and these future times are specified as an input—thus, the future times comprise a vector 'T' of length N of real numbers; and the historical, statistically calculated, correlation matrix of the forward prices—this data comprises a two-dimensional matrix 'p' of dimensions N×N of real numbers.

Procedure 4 which calculates the discrete volatility matrix 'V' of dimension N×N of real numbers. Procedure 4 is described in detail by FIGS. 7–8 and the following paragraphs. Question 6 prompts an input reply with a command to continue with the market simulations or not. If the input reply is 'no', Procedure 8 prints out a discrete volatility matrix 'V' created by Procedure 4 and the logic stops.

If the user's reply to Question 6 is 'yes', Procedure 10 sets an integer variable 'n'. to 0. Procedure 12 sets 'n' to 'n+1'. Procedure 14 performs the simulations and creates S, an integer variable, a matrix of randomly simulated cash-flows 'G' of dimension K×S—where K is an integer number specifying how many different types of cash-flows are being simulated—of real numbers, vector 'mean' of length K of real numbers, and vector 'var' of length K of real numbers. The details of Procedure 14 are shown in FIGS. 9–12 and described in the following paragraphs.

Procedure 16 generates K histograms, where the kth. histogram (k=1 . . . K). contains the data defined by the kth row of matrix 'G'—thus the total number of data points in any of the histograms is S. Procedure 16 also prints out the vectors 'mean' and 'var'.

Question 18 checks to see if 'n' equals 'N'. If yes, the matrix 'G' imprinted as part of Generated Output 9 and the logic stops. If no, the logic loops back to Procedure 12.

Figure 7:
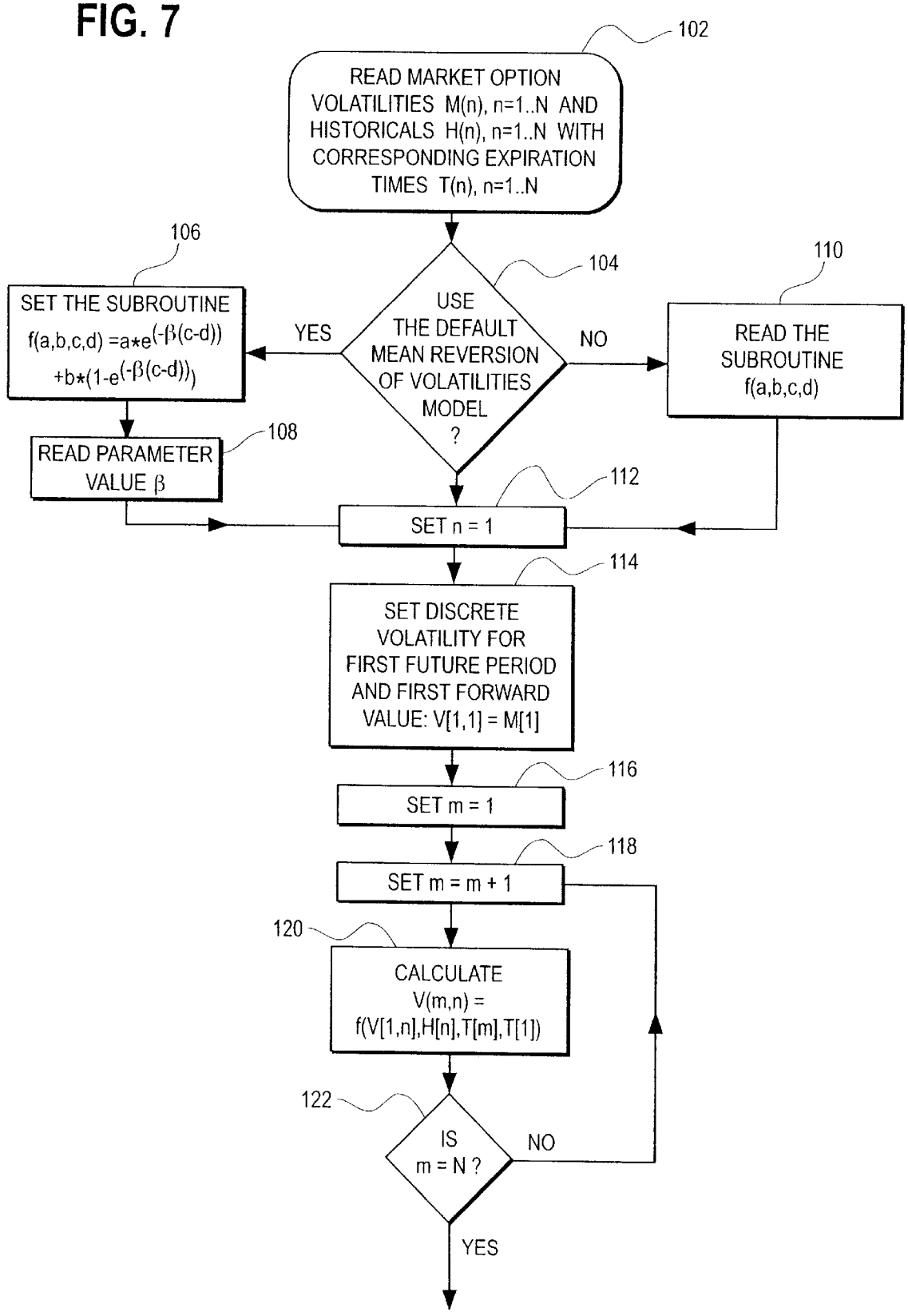
Figure 8:
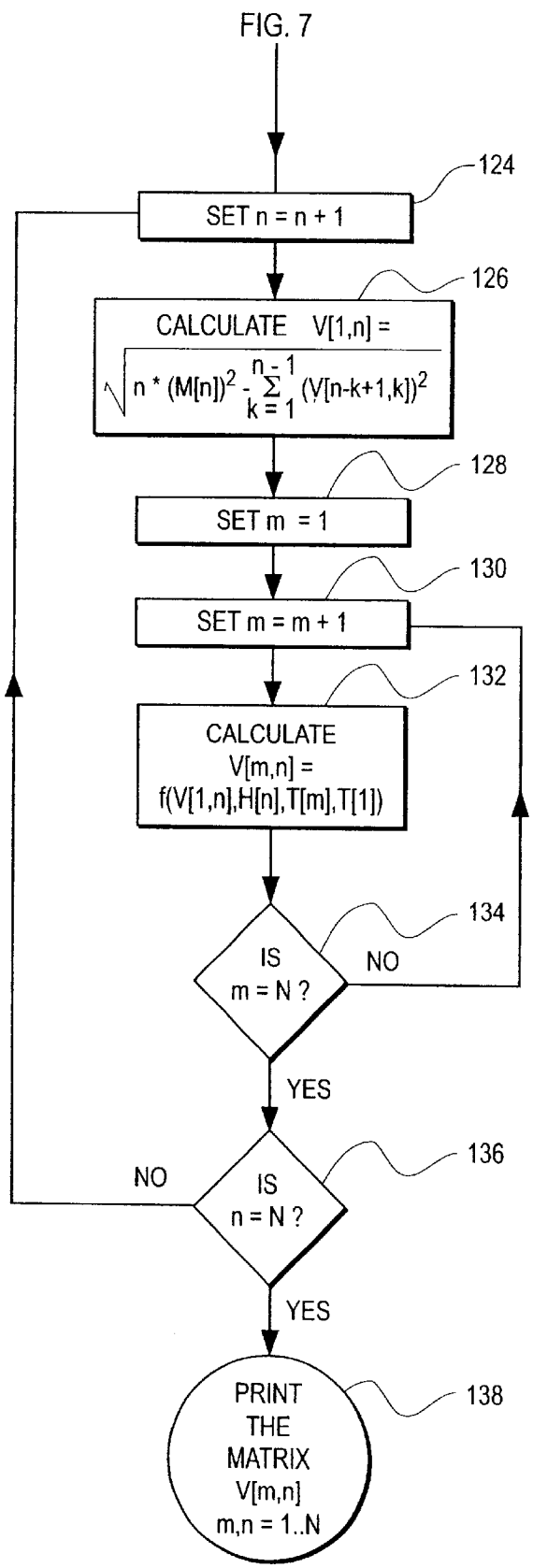

FIGS. 7–8 detail the logic of Procedure 4 to show more particularly how to calculate the discrete volatility matrix 'V' of dimensions N×N. Procedure 102 reads in the above-identified data sets: vector 'M', vector 'H', matrix 'p', and the vector. 'T'. Question 104 asks for input representing whether the logic can use a default mean-reverting model for the forward spot price volatilities. If the input answer is 'yes', Procedure 106 defines the function 'f(a,b,c,d) as being equal to $$a*\exponent(-beta*(c-d))+b*(1-\exponent(-beta*(c-d))),$$

a real number function. Procedure 108 prompts the user to input a value 'beta', reads the value, and stores it as real variable 'beta'. The logic then proceeds to Procedure 112. If the answer to question 104 was 'no'. Procedure 110 reads in the user-defined function 'f(a,b,c,d)'. The logic then proceeds to Procedure 112.

Procedure 112 sets an integer variable 'n' to 1. Procedure 114. sets the first column and first row value of the matrix V—V [1,1]—to the value contained in the first position of the vector M—M[1]. Procedure 116 sets an integer variable 'm' to 1. Procedure 118 sets 'm' to 'm+1'. Procedure 120 calculates the value V[m,n] by applying the function f(a,b,c,d) as follows:

$$V[m,n]=f(V[1,n], H[n], T[m], T[1]).$$

Question 122 checks if m equals N. If the answer is 'no', the logic loops back to Procedure 118. If the answer is 'yes', the logic proceeds as illustrated in FIG. 8.

In FIG. 8, Procedure 124 sets 'n' to 'n+1', and Procedure 126 calculates V[1,n] by applying the following relationship:

$$\text{computing } V[1, n] = \sqrt{n*(M[n])^2 - \sum_{k=1}^{n-1}(V[n-k+1,k])^2}.$$

Procedure 128 sets 'm' to 1. Procedure 130 sets 'm' to 'm+1'. Procedure 132 calculates V[m,n] by applying:

$$V[m,n]=f(V[1,n], H[n], T[m], T[1]).$$

Question 134 checks to see if m equals N. If the answer is 'no', the logic loops back to Procedure 130. If the answer is 'yes', the logic continues to the question 136.

Question 136 checks if n equals N. If the answer is 'no', the logic loops back to Procedure 124. If the answer is 'yes', then Procedure 138 prints out the values of the discrete volatility matrix V and the logic STOPS.

FIGS. 9–12 illustrate details of Procedure 14. Procedure 202 reads in the previously defined discrete volatility matrix 'V', the correlation matrix 'ρ', the user-defined integer variable S—which represents the number of random numbers to be generated for each forward price and cash-flow distribution, the vector 'MF', and the integer variable 'n'. Question 204 checks if 'n' equals 1. If the answer to Question 204 is 'yes', Procedure 222 sets 'm' to 0. Procedure 224 sets 'm' to 'm+1'. Procedure 226 sets an integer variable 's' to 0. Procedure 228 sets 's' to 's+1'. Procedure 230 sets the mth row and sth column of a matrix F to MF[m+1]—F[m,r]=MF[m+1]. Question 232 checks to see if 's' equals 'S'. If 'no', the logic loops back to Procedure 228.

If 'yes', the logic continues to question 234. Question 234 checks if 'm' equals 'N−n+1'. If 'no', the logic loops back to Procedure 224. If 'yes', the logic continues to Procedure 236.

If the answer to Question 204 is 'no', Procedure 206 reads in the matrix F values—F[m,s], for m=1 . . . (N−n+2) and s=1 . . . S. Procedure 208 sets 'm' to 0. Procedure 210 sets 'm' to 'm+1'. Procedure 212 sets 's' to 0. Procedure 214 sets 's' to 's+1'. Procedure 216 sets F[m,s] to F[m+1,s]. Question 218 checks if 's' equals 'S'. If the answer is 'no', the logic-loops back to Procedure 214. If the answer is 'yes', the logic continues to question 220. Question 220 checks to see if 'm' equals 'N−n+1'. If answer is 'no', the logic loops back to Procedure 210. If the answer is 'yes', the logic continues to Procedure 236.

Figure 13B:
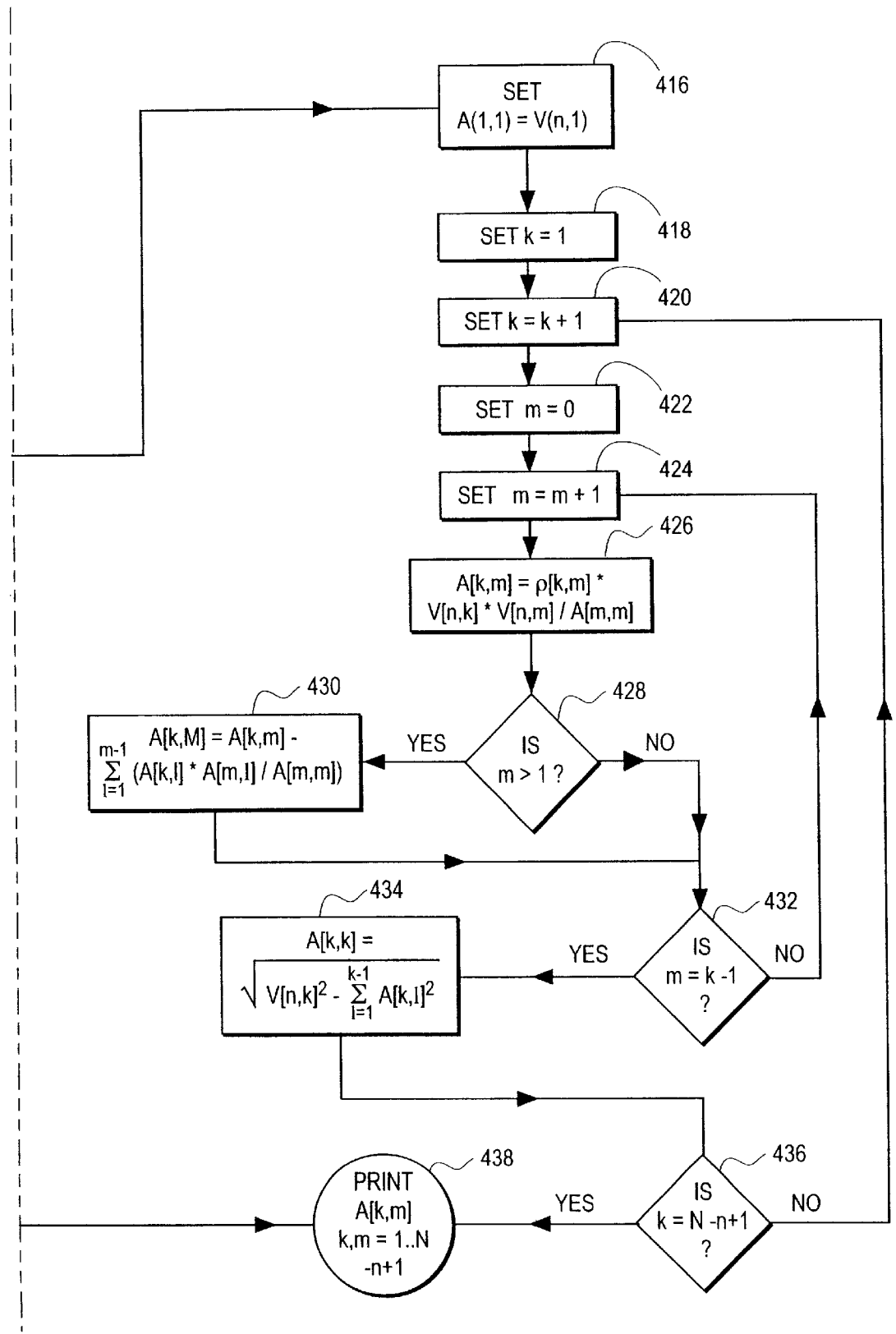

Procedure 236 calculates the simulation coefficients matrix A of dimension (N−n+1)×(N−n+1). The details of the Procedure are shown by FIG. 13 and described fully in the following paragraphs. Procedure 238 generates 's*(N−n+1)' normally distributed independent random numbers and puts these into the matrix 'Z' of dimensions s×(N−n+1) of real numbers. Procedure 240 sets 'm' to 0. Procedure 242 sets 'm' to 'm+1'. Procedure 244 sets 's' to 0. Procedure 246 sets 's' to 's+1'. Procedure 248 sets F[m,s] to $$F[m,s]*\exponent(-(V[n,m])^2/2*(T[m]-T[m-1]))$$

$$\exponent\left(\sum_{k=1}^{m} A[m,k]*Z[s,k]\right)$$

Question 250 checks if 's' equals 'S'. If the answer is 'no', the logic loops back to Procedure 246. If the answer is 'yes', the logic continues to question 252. Question 252 checks if 'm' equals 'N−n+1'. If not, the logic loops back to Procedure 242. If 'yes', the logic continues to Procedure 254. Procedure 254 reads the number of cash-flow types which the user wants to calculate—an integer value 'K'. Procedure 256 sets 'k' to 0.

Turning to FIG. 11, the logic continues with Procedure 258, which sets 'k' to 'k+1'. Procedure 260 sets 's' to 0. Procedure 262 sets 's' to 's+1'. Procedure 264 sets G[k,s] to g(k; F[1,s], F[2,s], F[3,s], . . . , F[N−n+1,s]) where g( . . . ) are user-defined functions which define the particular cash flows. Question 266 checks if 's' equals 'S'. If not, the logic loops back to Procedure 262. If 'yes', the logic continues to question 268. Question 268 checks if 'k' equals 'K'. If 'no', the logic loops back to Procedure 258. If 'yes', the logic continues to Procedure 270.

Procedure 270 sets all the elements of vector 'mean' to 0. Procedure 272 sets all the elements of vector 'var' to 0. Procedure 274 sets 'k' to 0. Procedure 276 sets 'k' to 'k+1'. Procedure 278 sets 's' to 0. Procedure 280 set 's' to 's+1'. Procedure 282 sets mean[k] equal to $$\mean[k]+G[k,s].$$

Question 284 checks, if 's' equals 'S'. If 'no', then the logic loops back to Procedure 280. If 'yes', the logic continues to Procedure 286. Procedure 286 sets mean[k] to $$\mean[k]/S.$$

Figure 12:
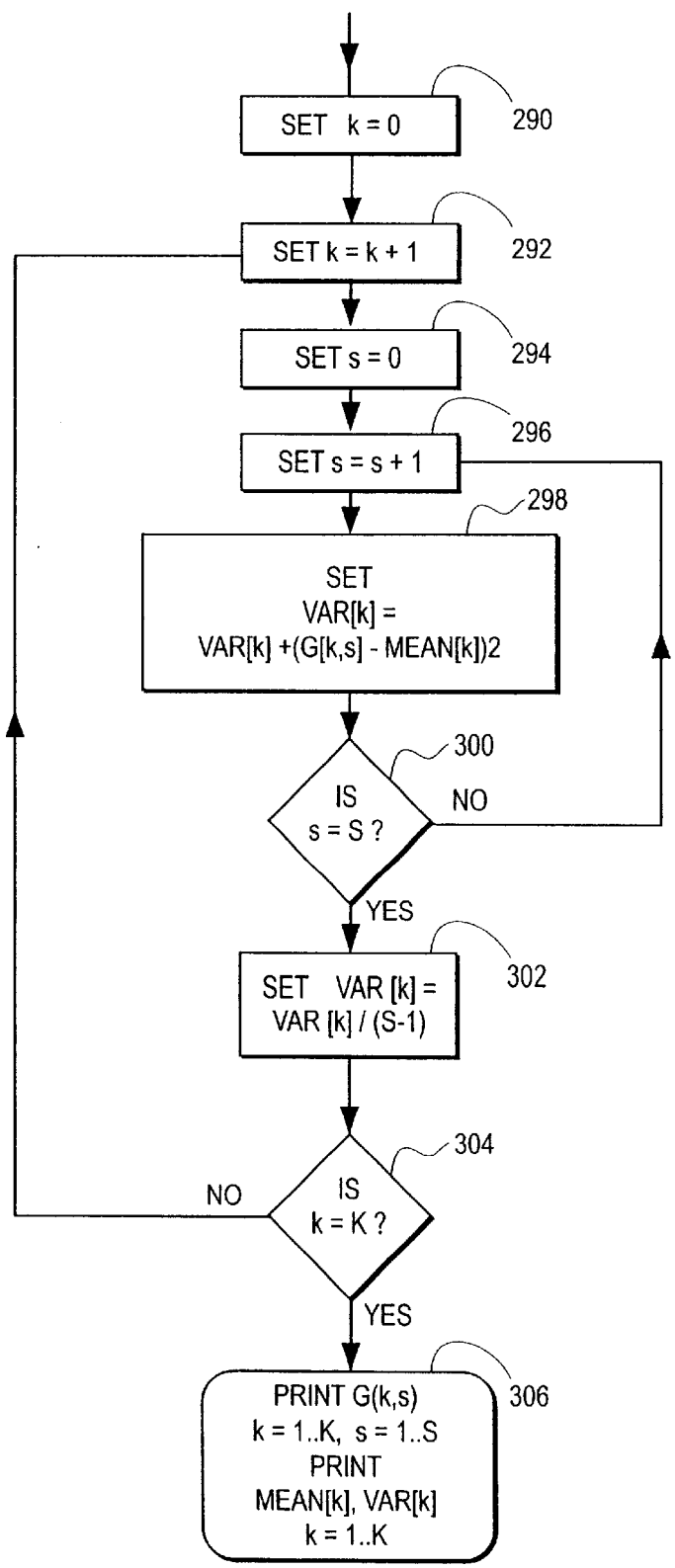

Question 288 checks if 'k' equals 'K'. If 'no', then the logic loops back to Procedure 276. If 'yes', the logic proceeds as illustrated in FIG. 12 where Procedure 290 sets 'k' to 0.

Procedure 292 sets 'k' to 'k+1'. Procedure 294 sets 's' to 0. Procedure 296 sets 's' to 's+1'. Procedure 298 sets var[k] to $$\var[k]+(G[k,s]-\mean[k])2.$$

Question 300 checks if 's' equals 'S'. If 'no', then the logic loops back to Procedure 296. If 'yes', then Procedure 302 sets var[k] to $$\var[k]/(S-1).$$

Question 304 checks if 'k' equals 'K'. If 'no', then the logic loops back to Procedure 292. If 'yes', then Procedure 306 returns all the values of the matrix 'G', the values of the vector 'mean', and the values of the vector 'var'. The subroutine then stops.

FIG. 13 illustrates in detail the procedures used for the completion of Procedure 236 and the calculation of the matrix 'A' which has dimensions (N−n+1)×(N−n+1). Procedure 402 reads the discrete volatility matrix 'V', and the correlation matrix 'ρ'. Procedure 404 sets all elements of the 'A' matrix to 0. Question 406 checks if all the elements of the matrix 'ρ' equal 1. If the answer is 'yes', then the logic continues with Procedure 408. Procedure 408 sets 'k' to 0. Procedure 410 sets 'k' to 'k+1'. Procedure 412 sets A[k,1] to V[k,n]. Question 414 checks if 'k' equals 'N−n+1'. If not, then the logic loops back to Procedure 410. If yes, the logic continues to the Procedure 438.

If the answer to Question 406 is 'no', the logic continues with Procedure 416. Procedure 416 sets A[1,1] to V[n,1]. Procedure 418 sets 'k' to 1. Procedure 420 sets 'k' to 'k+1'. Procedure 422 sets 'm' to 0. Procedure 424 sets 'm' to 'm+1'. Procedure 426 sets $$A[k,m]=\rho[k,m]*V[n,k]*V[n,m]/A[m,m].$$

Question 428 checks if 'm' is greater than 1. If 'no', the logic goes to the question 432. If 'yes', the logic continues to the Procedure 430. Procedure 430 sets $$A[k,m] = A[k,m] - \sum_{l=1}^{m=1} (A[k,1]*A[m,1]/A[m,m]).$$

The logic then continues with question 432.

Question 432 checks if 'm' equals 'k−1'. If the answer is 'no', the logic loops back to Procedure 424. If the answer is 'yes', the logic continues with Procedure 434. Procedure 434 sets $$\sqrt{\left(V[n,k]^2 - \sum_{l=1}^{k-1} (A[k,1])^2\right)};$$

Question 436 checks if 'k' equals 'N−n+1'. If not, the logic loops back to Procedure 420. If 'yes', the logic continues with Procedure 438.

Procedure 438 returns all the values of the matrix 'A'. The subroutine stops.

Code for a representative computer program in accordance with the above is provided as Appendix I. This code, or such other code made in accordance with the above-described FIG'S., can be entered in Computer 1 via the Means for Receiving Input Data 5 and compiled by Computer Program 17 to form compiled Logic Means 13. Data entered while using compiled Logic Means 13 is processed thereby and stored in Memory 11 to form Stored Data 15 and used to produce Generated Output 9 via the Means for Outputting Generated Data 7. The Generated Output 9 can then be used to make a financial decision, a step that can be human, automated, or a combination thereof. The financial decision can be a buy\sell\keep decision for a financial product. (Which can include adding a spread to a computed break even price to produce a price quote for the financial product.) Thus, the present invention can include managing a portfolio of financial products by adding a financial product to the portfolio, by removing a financial product from the portfolio, or even keeping the portfolio unchanged.

B. How to Use the Computer System

To a considerable degree, a disclosure of how to make the present invention is significantly revealing about how to use the invention (and vice versa). This is particularly true when these are viewed in the context of the other portions of this document. However, the following focusses on use of the present invention.

1. Overview

The present invention can use current and historical market spot and forward price data for liquid financial products to simulate future spot and forward price data for liquid and illiquid financial products and for any future calendar time period. The present invention generates two distinct types of building blocks that are repeatedly used in this market simulation. These two building blocks are:

1. Building Block #1 (See FIG. 6, Procedure 4) is a discrete forward price volatility matrix. This matrix can provide accurate single-period volatility data for any forward price on the forward price curve.
2. Building Block #2 (See FIG. 9, Procedure 216) is a series of expected forward price curves over future calendar periods (which reflect the leftward shift of the forward price curve across future calendar time periods.) Each curve at any future calendar period is defined by a vector of expected forward prices for that future calendar period. These curves provide both expected values and the statistical confidence levels of these values.

Figure 9:
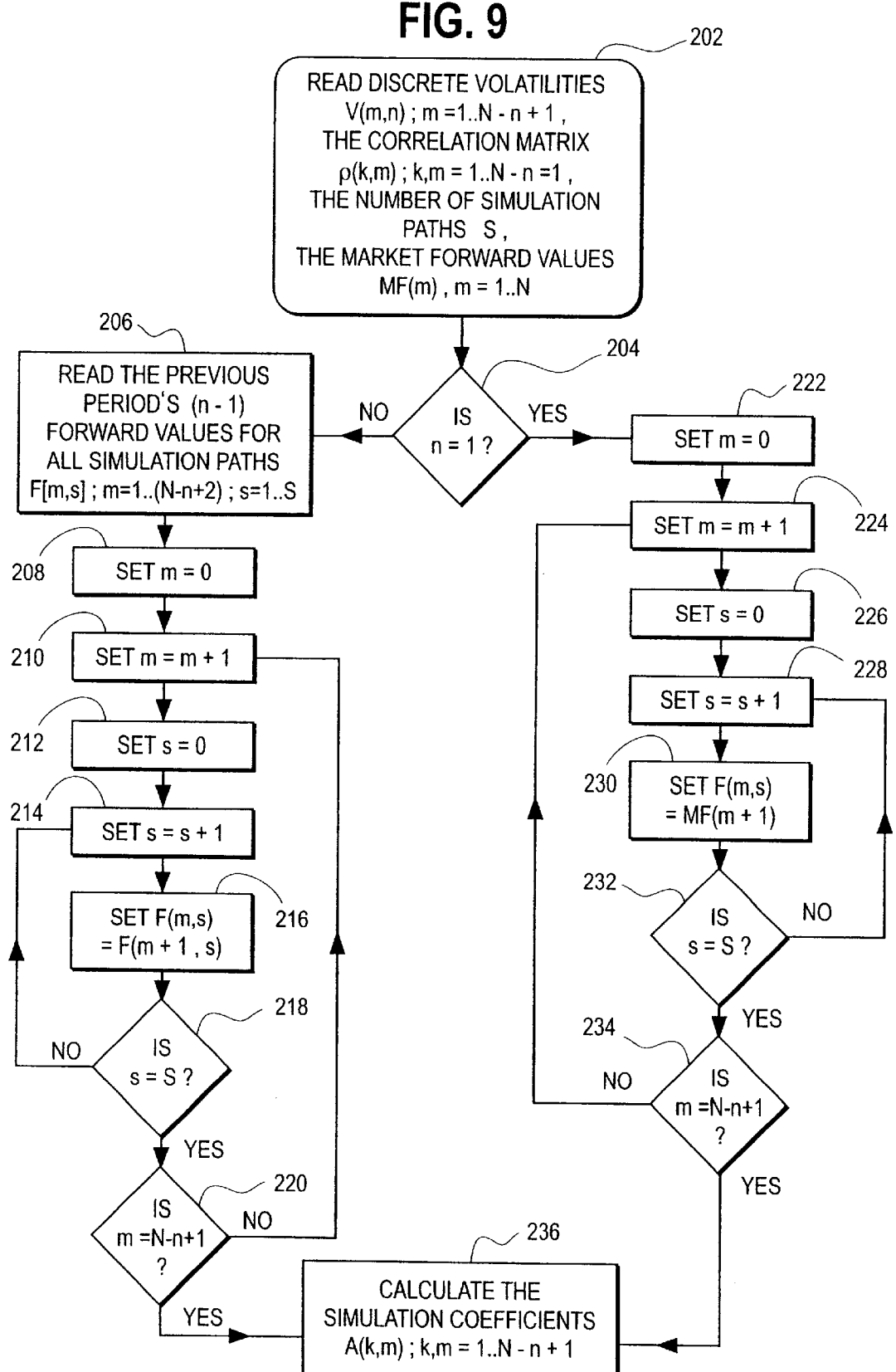
Figure 10:
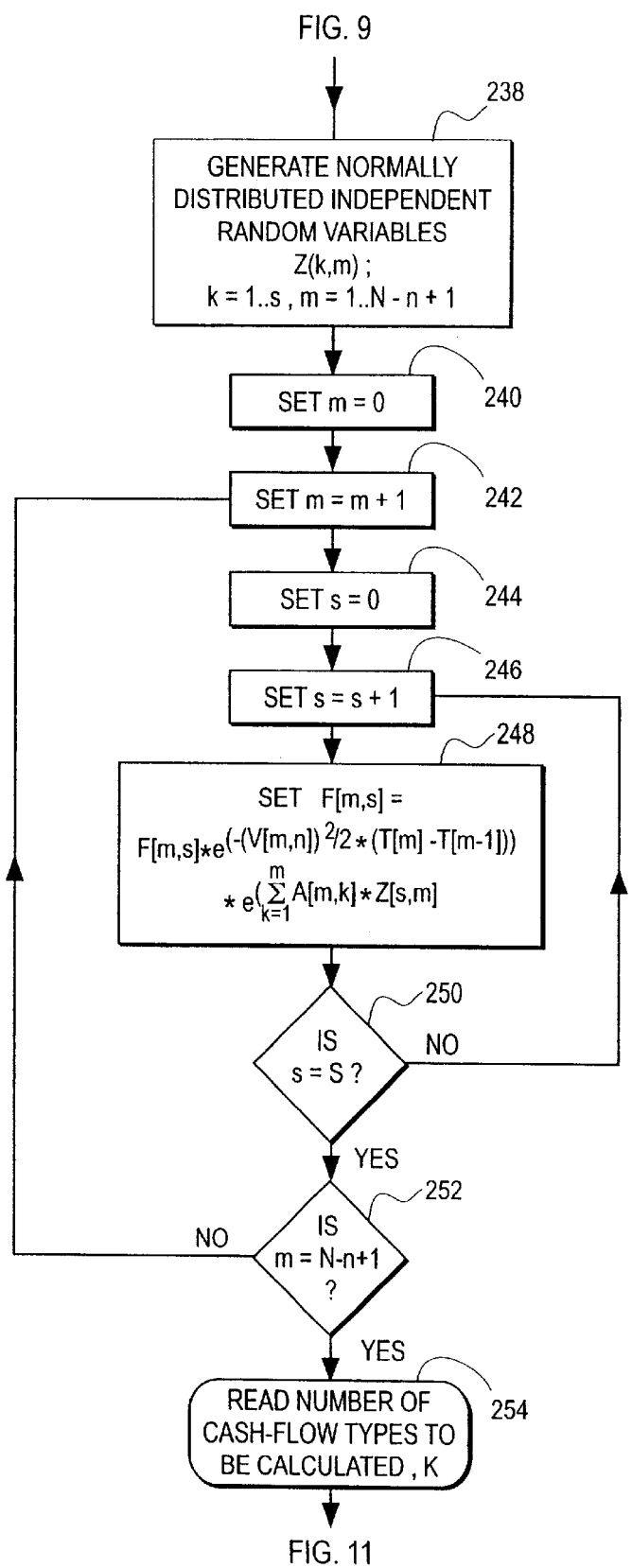

With these two building blocks, a distribution of any cash flow at any future calendar time can be generated by using the calculated random number coefficient matrix (see FIG. 9 Procedure 236).

2. Inputs

A key aspect of the present invention involves the definition and selection of inputs to the system. Unlike any other known simulator, the present invention can start with the current market data, combine it with historical data for generating data, a portion of which converges back to the original market data used as input data.

Four data sets can be used as inputs for simulations of a particular market such as interest rates, crude oil, an equity index, etc.

1. The present market spot and forward prices;
2. The present market option volatilities (also. referred to as the market implied volatilities);
3. The historical single-period volatilities on the same forward prices as used for Input #1; and
4. The historical single-period correlations of the same forward prices as used for Input #1. An example of these four data sets for U.S. dollar interest rates is provided in FIGS. 14(a–d).

Figure 6:
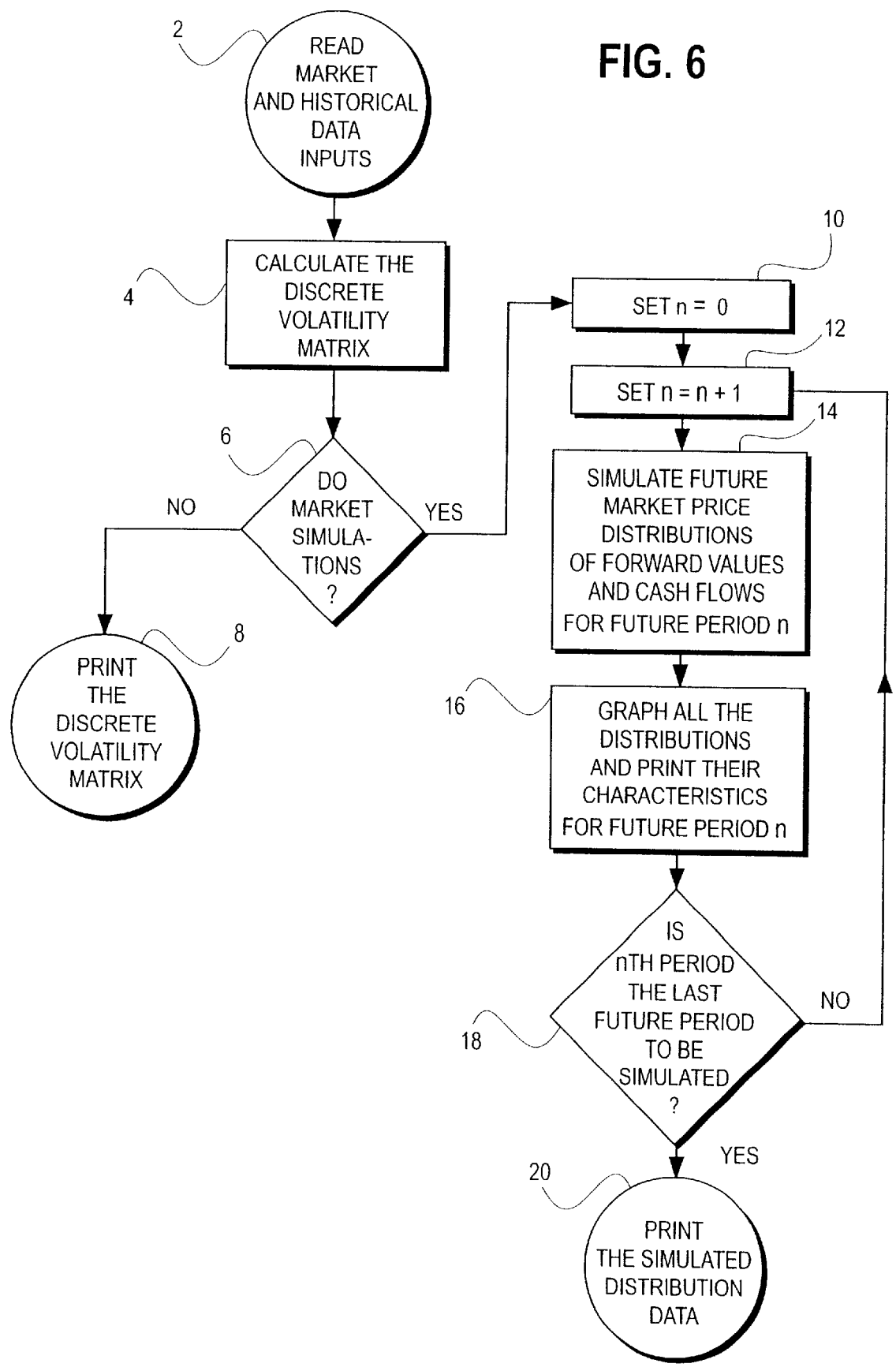
Figure 14A:
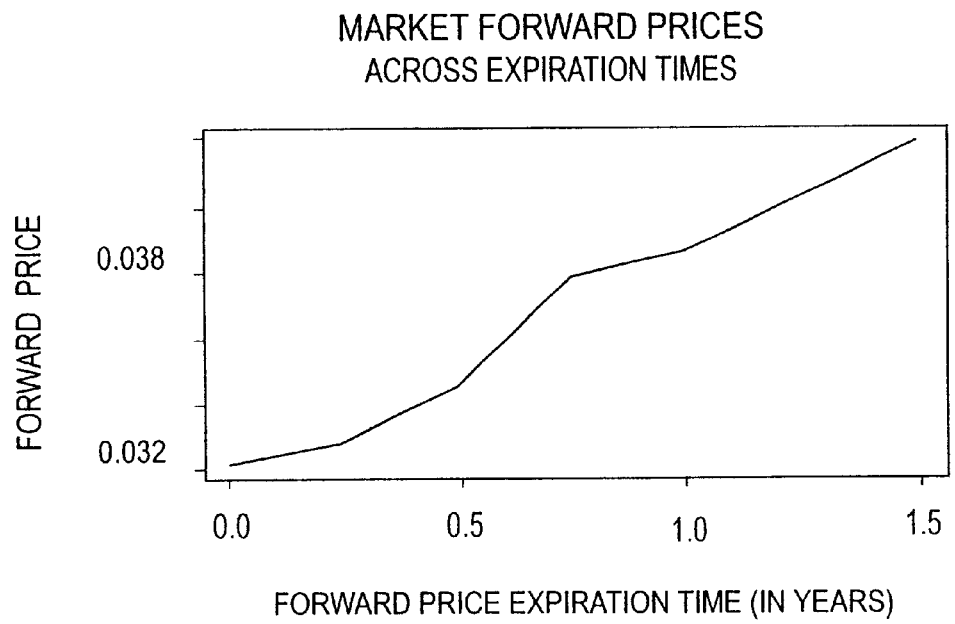

The present forward market values of FIG. 14(a) are used as Input #1 (also see FIG. 6, Procedure 2; FIG. 9, Procedure 202 ), and such data is generally readily available from futures exchanges; financial brokers, or indirectly from other readily available financial instruments, such as swaps, forward rate agreements, etc.

As an example, consider again the case of West Texas Intermediate (WTI) crude oil, a commodity on which options and futures are frequently traded. Input #1 for a WTI simulation would be the data set of today's forward values: (i) the spot price of WTI; (ii) the 3-month forward price of WTI; (iii) the 6-month forward price of WTI; (iv) the 9-month forward price of WTI, etc.; (v) the 4-year-and-9-month forward price of WTI; and (vi) the 5-year forward price of WTI.

Figure 14B:
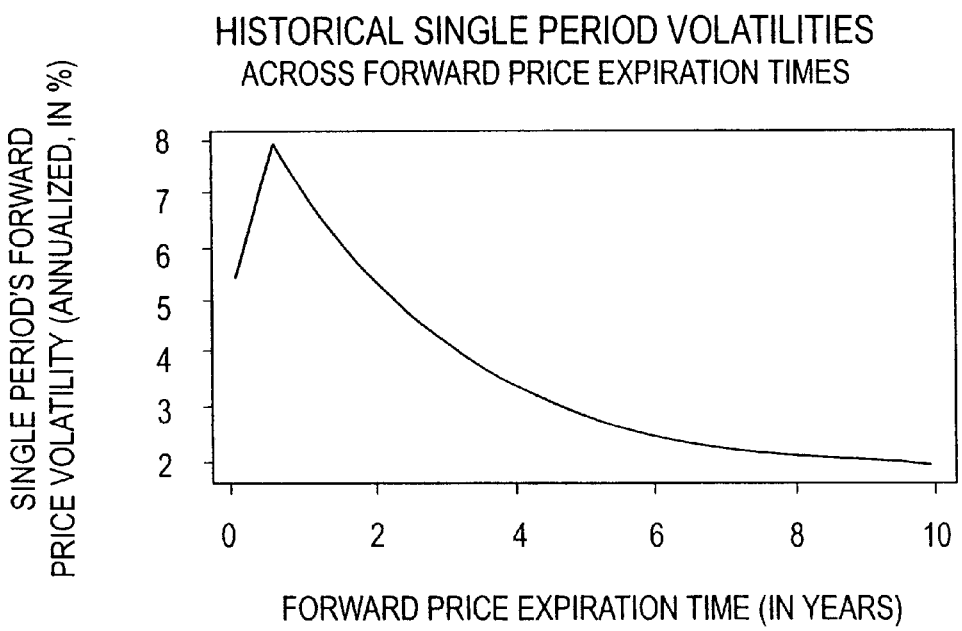
Figure 14C:
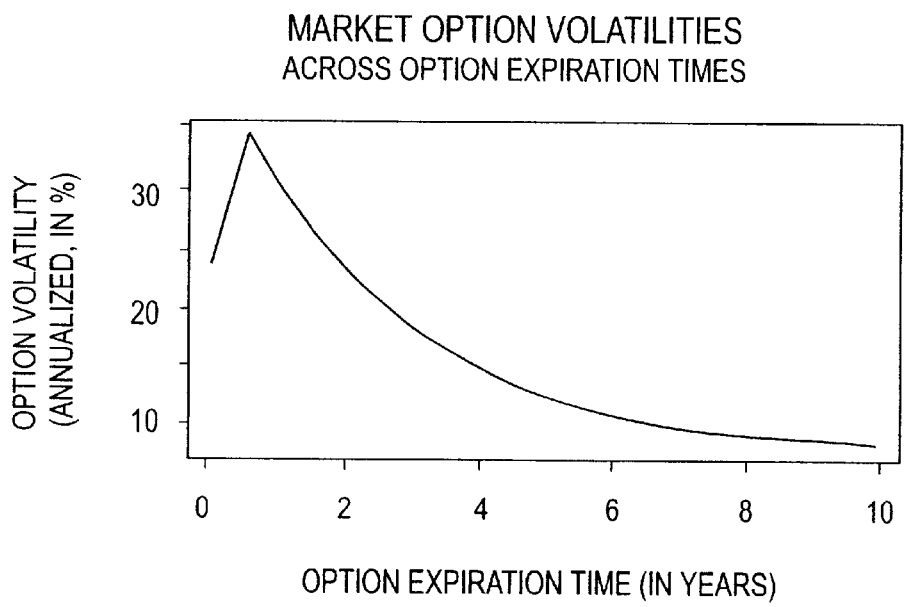

The volatility data for Input #2 of FIG. 14(c) would also be generally available from a variety of financial brokers and or market makers. (See FIG. 6, Procedure 2; FIG. 7, Procedure 102.)

Figure 14D:
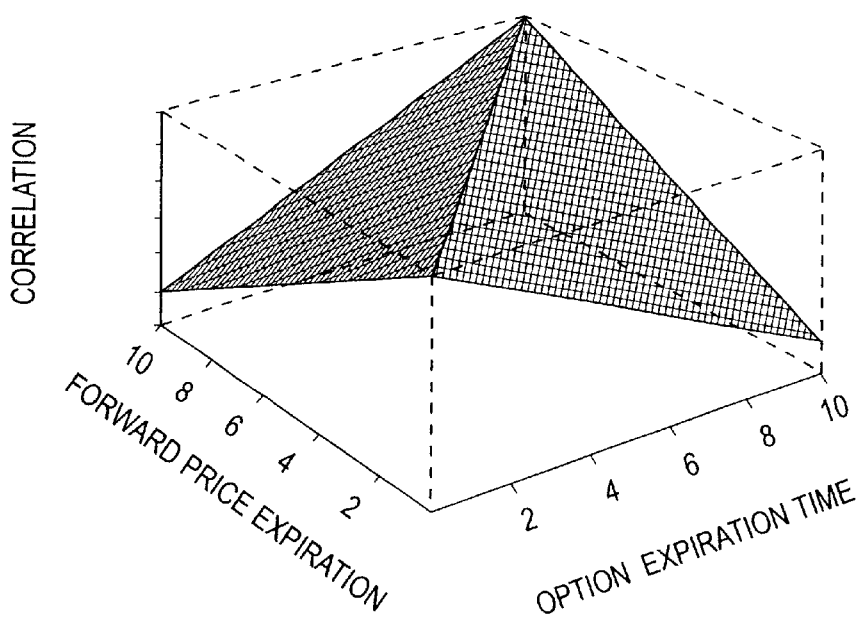
Figure 16A:
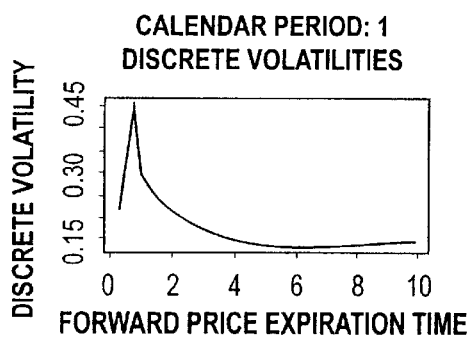
Figure 16B:
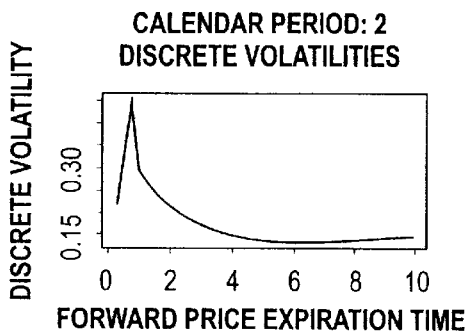
Figure 16C:
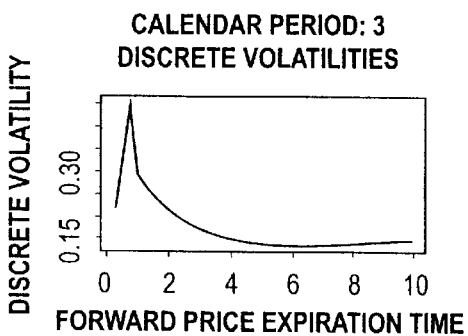
Figure 16D:
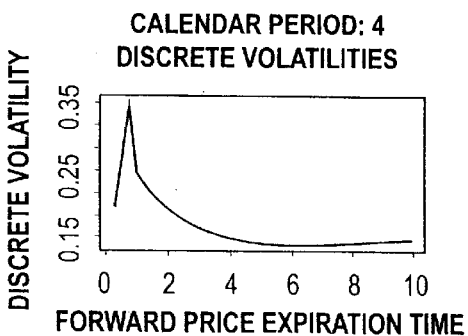
Figure 16E:
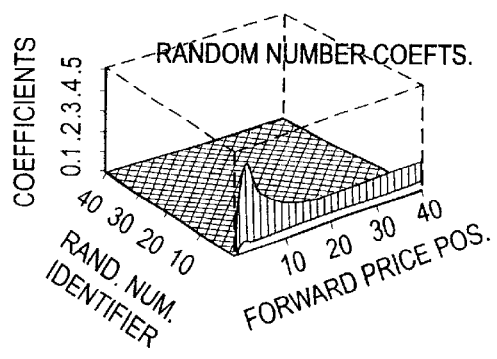
Figure 16F:
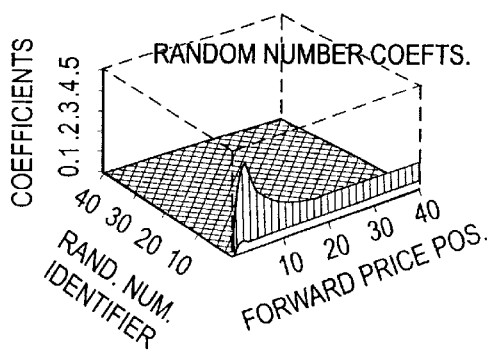
Figure 16G:
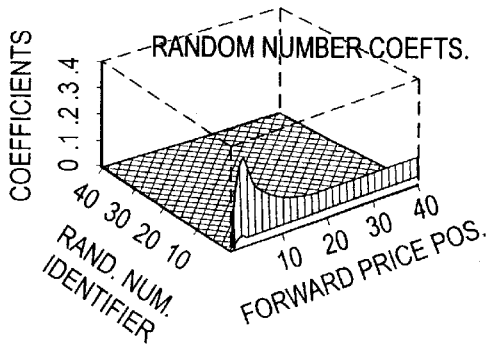
Figure 16H:
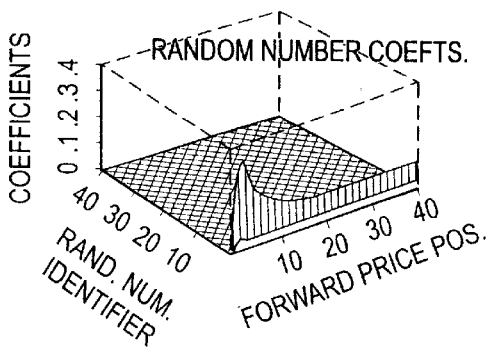
Figure 16I:
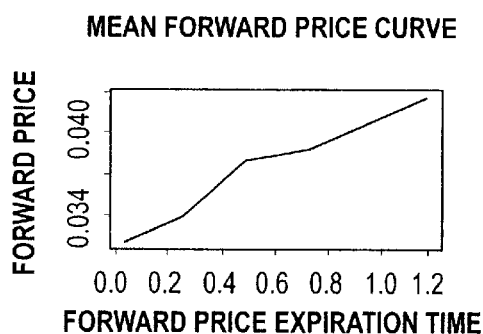
Figure 16J:
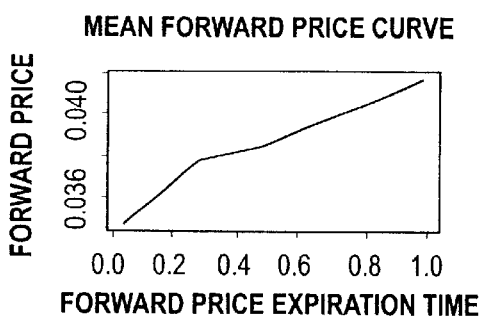
Figure 16K:
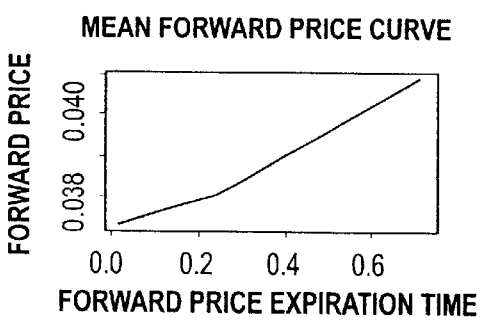
Figure 16L:
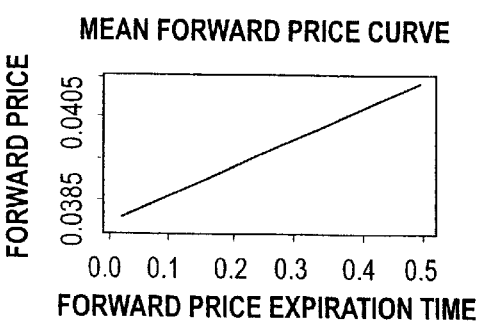
Figure 16M:
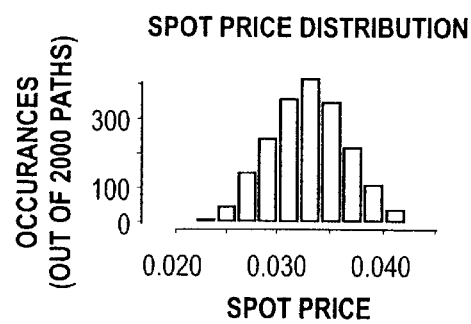
Figure 16N:
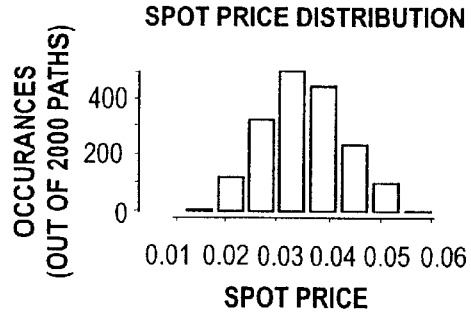
Figure 16O:
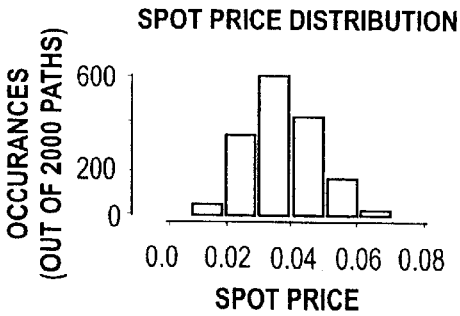
Figure 16P:
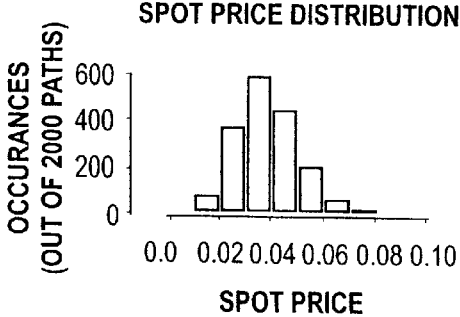
Figure 17A:
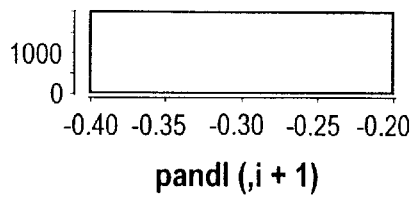
Figure 17B:
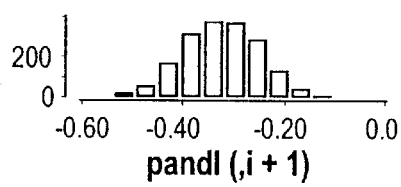
Figure 17C:
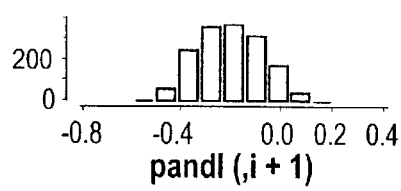
Figure 17D:
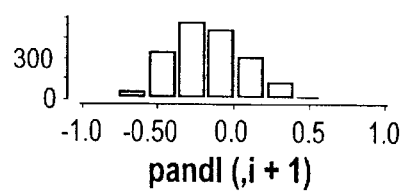
Figure 17E:
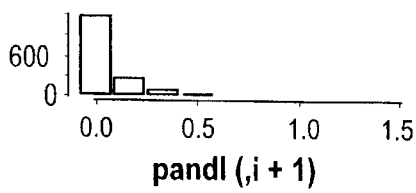
Figure 17F:
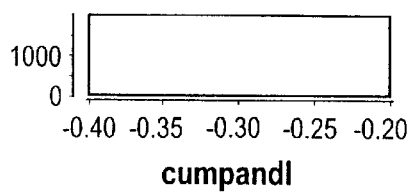
Figure 17G:
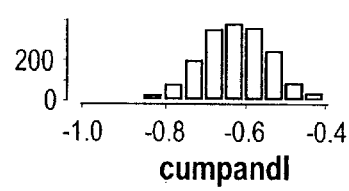
Figure 17H:
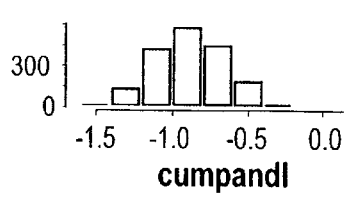
Figure 17I:
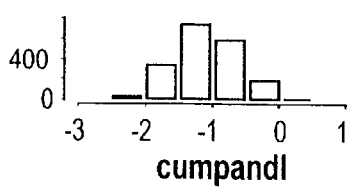
Figure 17J:
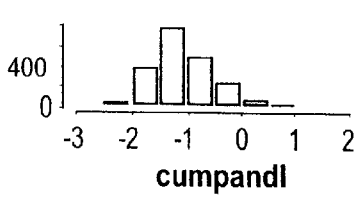
Figure 17K:
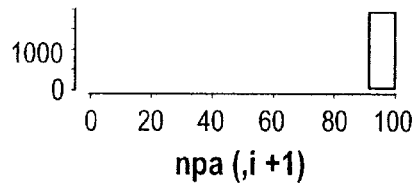
Figure 17L:
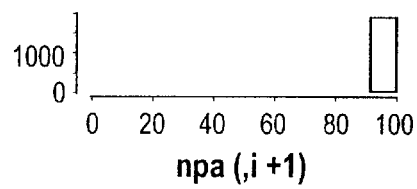
Figure 17M:
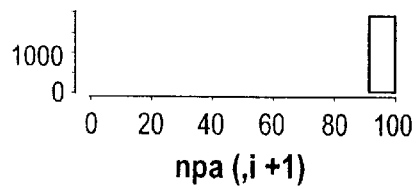
Figure 17N:
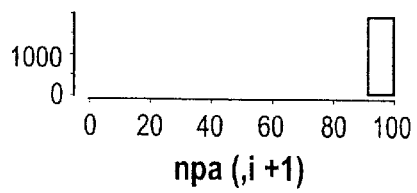
Figure 17O:
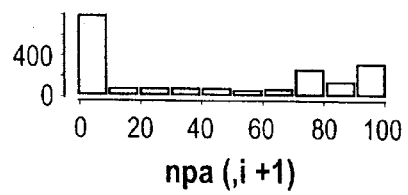
Figure 17P:
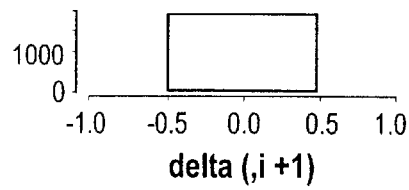
Figure 17Q:
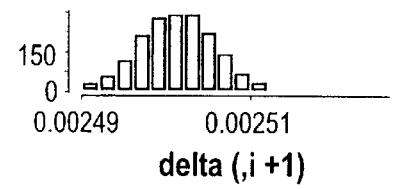
Figure 17R:
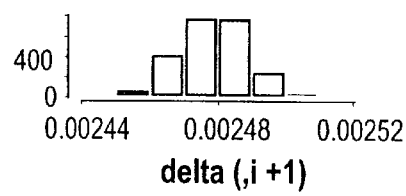
Figure 17S:
Figure 17T:
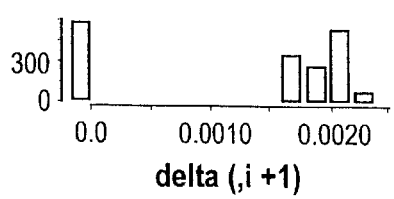
Figure 18A:
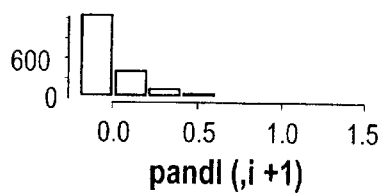
Figure 18B:
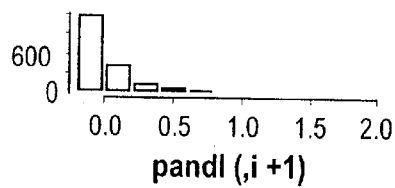
Figure 18C:
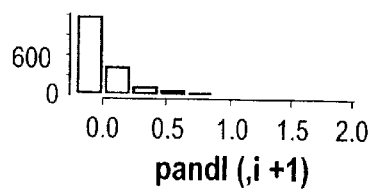
Figure 18D:
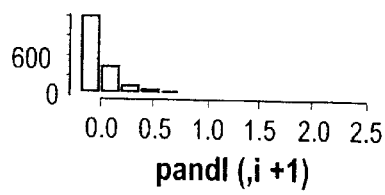
Figure 18E:
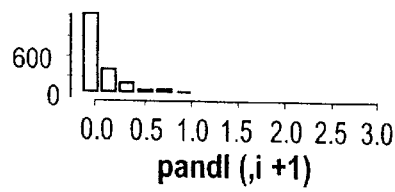
Figure 18F:
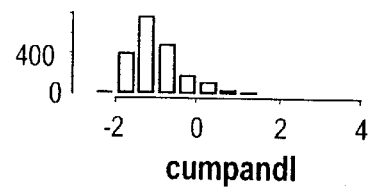
Figure 18G:
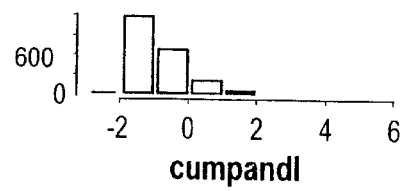
Figure 18H:
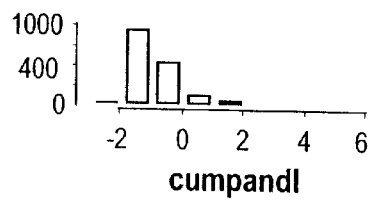
Figure 18I:
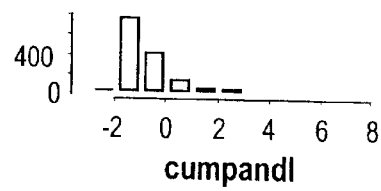
Figure 18J:
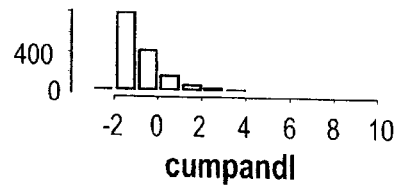
Figure 18K:
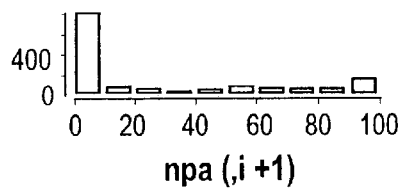
Figure 18L:
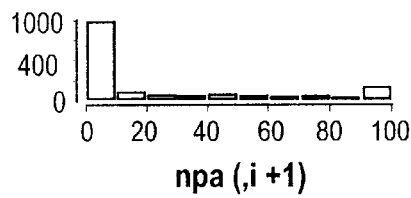
Figure 18M:
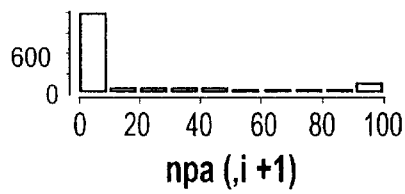
Figure 18N:
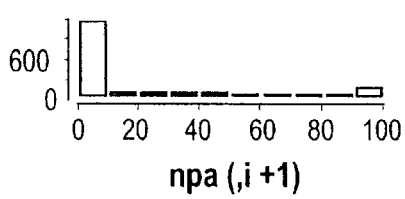
Figure 18O:
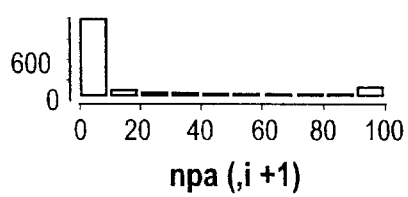
Figure 18P:
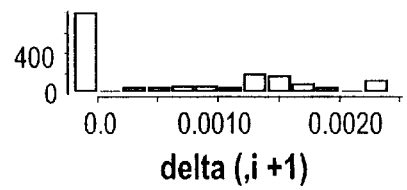
Figure 18Q:
Figure 18R:
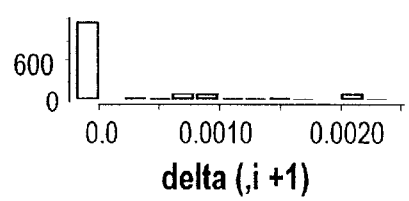
Figure 18S:
Figure 18T:
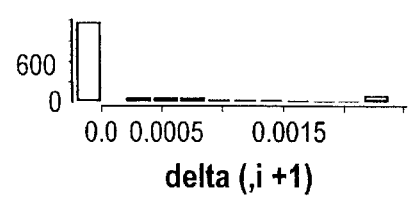
Figure 19A:
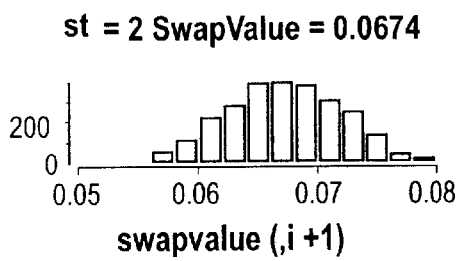
Figure 19F:
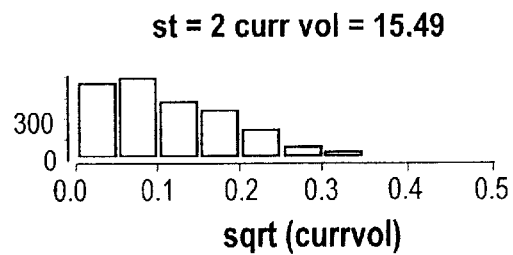
Figure 19B:
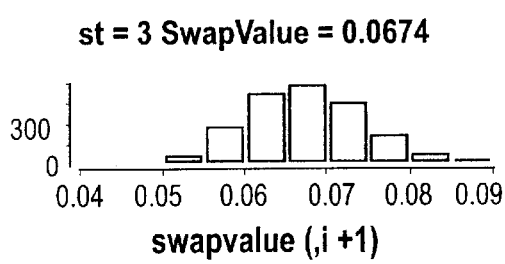
Figure 19G:
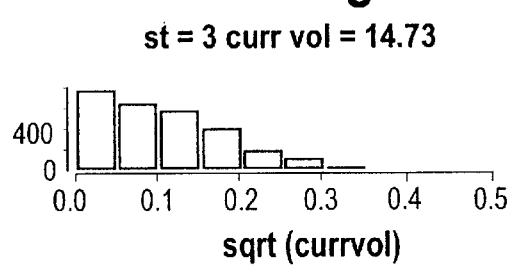
Figure 19C:
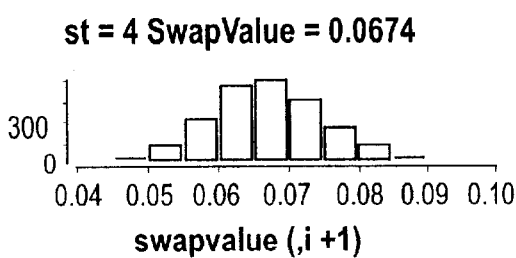
Figure 19H:
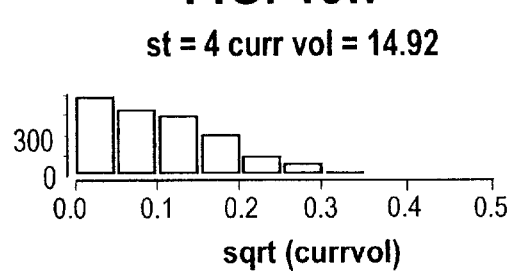
Figure 19D:
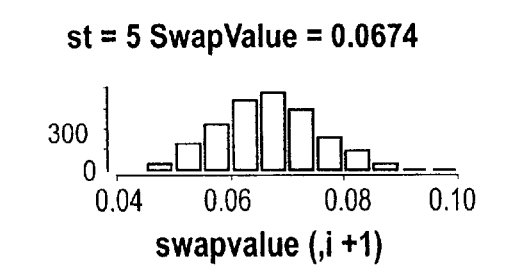
Figure 19I:
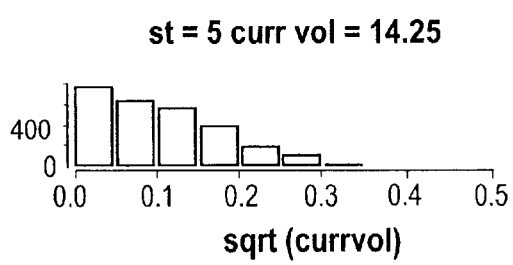
Figure 19E:
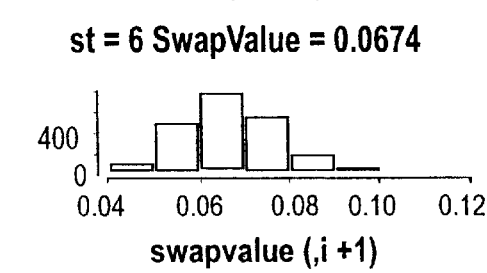
Figure 19J:
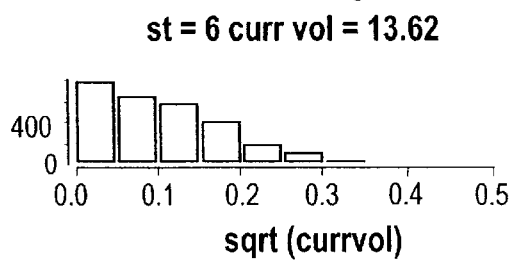
Figure 19K:
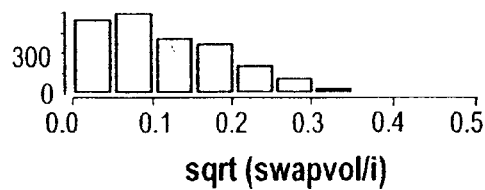
Figure 19L:
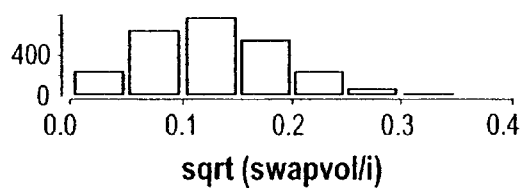
Figure 19M:
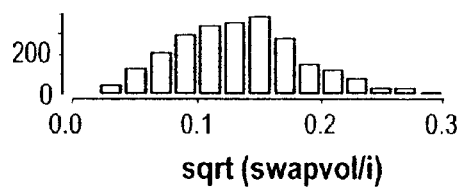
Figure 19N:
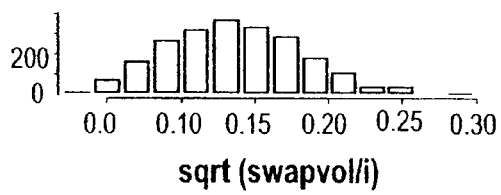
Figure 19O:
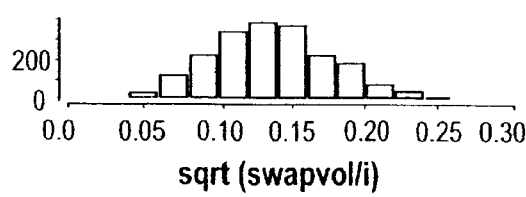

The historical data—as exemplified in FIGS. 14(b) and 14(d)—are calculated by doing a statistical analysis of historical forward price behavior.

More specifically, Input #3 of FIG. 14(b) is the historically calculated long-term mean volatility of particular forward values. (See FIG. 6, Procedure 2; FIG. 7, Procedure 102.) The inputs in case of the WTI crude oil example would be: the long-term mean volatility of the three month forward price as it becomes the spot price, the long-term mean volatility of the six month forward price as it becomes the three month forward price, the long term mean volatility of the nine month forward price as it becomes the six month forward price, etc., up to the long-term mean volatility of the five year forward price as it becomes the 4.75 year forward price.

The calculation of Input #4 and exemplified in FIG. 14 (d) would follow a similar procedure as shown above for Input #3. (See FIG. 6, Procedure 2; FIG. 9, Procedure 202; FIG. 13, Procedure 402.)

In order to perform the simulations of forward prices across future calendar time periods, one can use the volatility that is particular to the forward price and the future calendar period in question. Thus, such a volatility is a single-period volatility, otherwise known as a discrete volatility. FIGS. 7 and 8 show the procedures for the calculation of the discrete volatilities across all forward prices and across all future calendar periods. FIG. 15 is a sample representation of Generated Output 9, a graph of such discrete volatilities across all forward prices and future time periods.

Each forward price discrete volatility starts at some value for the first calendar period and, over the subsequent calendar periods, the volatility reverts to a long-term historical value, which is entered as Input #3. Then, the problem is to calculate for each forward price the series of its discrete volatilities over all relevant future calendar periods. For example, given ten future calendar periods and five forward prices, one would end up with a ten-by-five matrix of discrete volatility values. Each column would represent the discrete volatilities of a particular forward price over all the future calendar periods. A visual example of such a discrete volatility matrix is shown on FIG. 15.

The discrete volatilities are calculated using the present market values for option volatilities and the historically calculated average volatilities—both of these are the volatilities corresponding to the forward prices which are used as inputs to present invention. In addition, a mean reverting model which relates the first calendar period's discrete volatility to the long-term mean historical volatility (Input #3) is used (see FIG. 7, Procedure 104). The present invention builds in a default mean-reversion model but leaves the user the option of using a different mean-reverting model.

Given the first calendar period's discrete volatilities (see FIG. 7, Procedure 114; FIG. 8, Procedure 126), and given the historical volatilities (see FIG. 7, Procedure. 102 ) and the choice of mean-reverting model (see FIG. 7, Procedure. 104–110), the volatilities of any future calendar period can be calculated (see FIG. 7, Procedure 120; FIG. 8, Procedure 132). Thus, the calculation of the discrete volatility matrix is facilitated by building on this calculation of the first calendar period's discrete volatilities across the forward prices.

Finally, the choice of the mean-reversion model which-relates the first three month period's forward value volatilities to the long-term—historically calculated—mean volatilities of the same forward values, is important in that it incorporates a mean-reverting tendency of the forward value volatilities towards their long-term mean levels. The present invention provides a default mean-reverting model but also allows the user the option to provide his or her own mean-reverting models in FIG. 7, Procedure 110.

For the sake of simplicity, assume that the future calendar periods are in three-month intervals and therefore the inputs would be defined as follows:

Input #1 would be a vector of spot and forward prices, where the first forward price has three month expiration, the second forward price has six month expiration, etc.;

Input #2 would be a vector of market option volatilities, where the first option volatility would be for an option which expires in three months from today, the second option volatility would be for an option which expires six months from today, and so on;

Input #3 would be a vector of single period historical volatilities across forward prices. Thus, the first historical volatility would be the mean historical volatility of the three month forward price as the curve moves to the left and the forward price becomes the spot price. The second historical volatility would be the volatility of the six month forward price as it becomes the three month forward price, etc.; and Input #4 would represent the correlations between the various forward prices (but with expiration times arranged in an increasing order and three months apart)—as the forward price curve moves to the left over a single calendar period, this being a three month period.

Figure 4A:
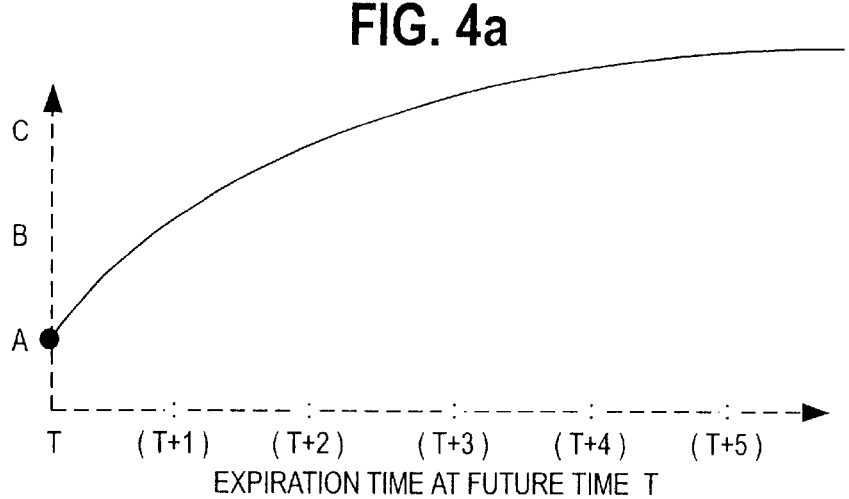
FIGS. 4a–4c are three graphs representing shifts of expected forward price curves in accordance with the present invention.
Figure 4B:
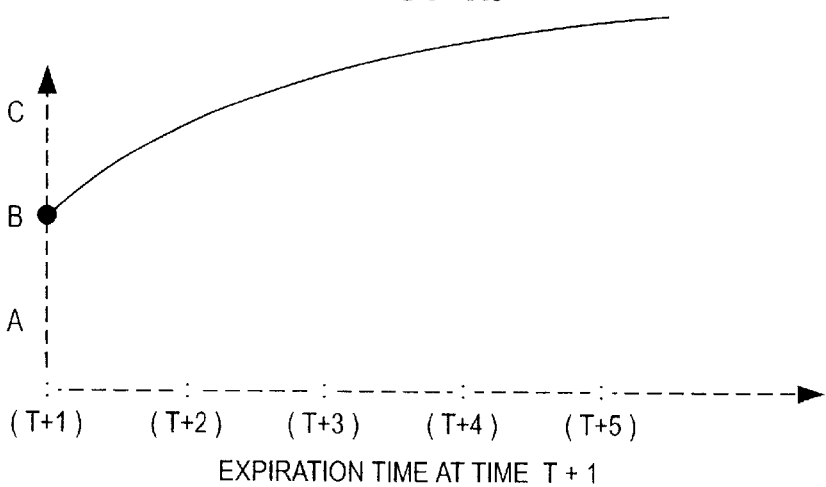
Figure 4C:
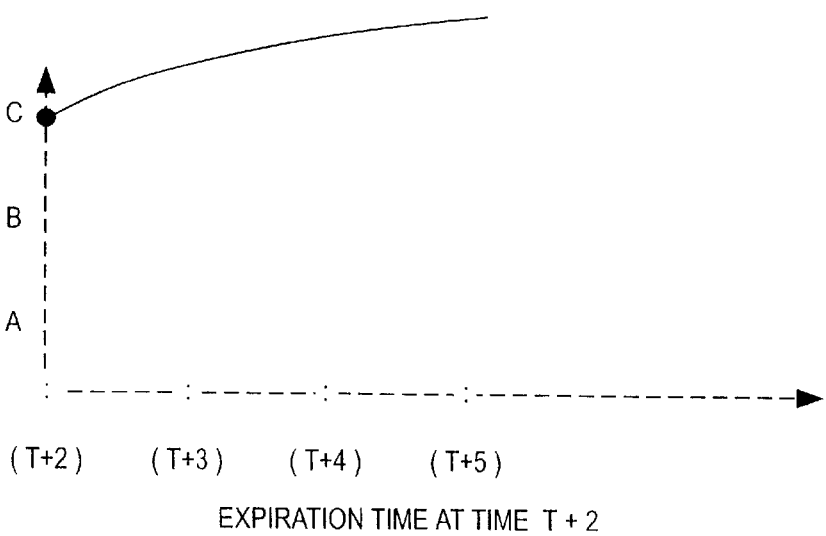

The option volatility (Input #2) associated with a particular forward value represents the average volatility of that forward value through calendar time as it slowly becomes the spot price. Thus, the three month option volatility is the average volatility of what is today the three month forward price over the next three calendar months as it 'becomes' the spot price. Similarly, the six month option volatility is the volatility of today's six month forward price over the next six months as the forward price curve moves to the left (as in FIG. 4) to, in the end, have what was originally the six month forward price in turn become the spot price—six months from today.

Therefore, the option volatility for the three month forward value is also the discrete volatility of the three month forward value over the first three month period—as the three month forward value becomes the spot price three months from today. Thus, the first period's volatility for the first forward price expiring three months from today can be computed. (see FIG. 7, Procedure 114). Therefore, the system can calculate volatilities for the first forward price on the forward price curve at any future period, as we have the historical volatilities and the mean-reverting model which tells how the first period's volatilities revert to the historical volatilities over future calendar periods (see. FIG. 7, Procedure 116–122). In other words, there is a first column of the discrete volatility matrix.

The second column of the discrete volatility matrix holds information about the discrete volatility of the second forward price on the forward price curve, the six month forward value—as it becomes the three month forward value—over the three month calendar periods. Now, the six month option volatility (the second number in the Input #2 vector) is an average volatility of the six month forward value over the next six months as what today is the six month forward value becomes first the three month, forward value, which will happen three months from today, and thereafter become the spot price—which will happen six months from today. This average can thus be decomposed as an average of the first period's second forward value volatility plus the second calendar period's and first forward value volatility. Because the second period's three month forward value volatility (the second number in the first column) is already known, and the six month option volatility is also known, the system can calculate the first period's second forward value volatility. This technique, in addition to the long-term mean volatility for the six month forward value as it becomes the three month forward value, is what enables calculating all the volatilities of the second forward value on the forward price curve as it becomes the three month forward value over some future time period, and so on. This recursive procedure (see FIG. 8, Procedure 126–136. ) allows filling in all the pieces of the discrete volatility matrix—an example of which is shown in FIG. 15.

FIG. 16 includes a first column of graphs showing the discrete volatility curve corresponding to a particular future calendar period. A second column of graphs shows the random number coefficients for each simulation mode. A third column of graphs shows the average simulated forward price curve corresponding to each future calendar period. And a fourth column of graphs shows the distribution of the forward spot price per simulation mode. These four columns of graphs in FIG. 16 summarize the basic simulation outputs which can then be used to generate distributions of cash-flows of any financial derivative product across future time periods. In fact, these graphs are the graphical outputs as defined by FIG. 6, Procedure 16, where the cash flows were simply defined as the future periods spot prices.

The significance of the above-described method is that it starts with input data, generates simulation data, and can converge the simulation data back to the input data. The input data includes the observed market values for the option volatilities, and with the additional long-term historical information, the present invention constructs volatility building blocks. This method replicates the way the market acts, and thus, the simulations based on such discrete volatilities allow for convergence of option cash flows to the market option prices. Thus, the method starts with the market data (under FIG. 6, Procedure 2) and can go back to the market data (under FIG. 6, Procedure 20).

At any future time and for any forward value the two pieces of information used to define the forward value distribution are known, i.e., its mean (via the present market forward values), and its-standard deviations (via the discrete volatilities). These preferably include confidence intervals at the 66th, the 95th, and the 99th percentile. Thus, the present invention has all the information to create distributions of possible outcomes for any forward rate and for any period in the future.

3. Using the Discrete Volatility Matrix To Perform Simulations

With the expected forward values as the market sees them (a sample shown in FIG. 14(a)), and the discrete volatilities matrix (a sample shown in FIG. 15)—which holds both current market and historical information—one can perform simulations of the forward price curve at any future calendar time—and therefore the present invention facilitates performing simulations of any financial instrument which has cash flows tied to the forward price curve.

The distribution generation process begins by examining the first calendar period, which starts today and ends three months from now. The volatility of the three month forward rate which is used in generating all the possible random values of that forward rate as it becomes the spot rate over the first calendar period is the volatility from the discrete volatility matrix which is in the first row and the first column. (See FIG. 10, Procedure 248.) The volatility of the six month forward rate during this first calendar period from today is the first row, second column discrete volatility matrix component, and so on. During the second calendar period the volatilities used will come from the second row of the discrete volatility matrix, and so on.

In addition to the above, the simulations are performed such that the input correlations between the forward values are honored to ensure consistency. This is done as follows. Each forward price on the forward price curve exhibits some discrete volatility (from the discrete volatility matrix) and also honors certain correlations with the other forward prices on the forward price curve (which are one of the input data sets—see FIG. 6, Procedure 2; FIG. 9, Procedure 202; FIG. 13, Procedure 402). Thus, for a forward value curve which has five forward values, for example, the number of distributions to generate is also five—i.e., each of the forward prices will have some distribution for that particular calendar period in question. Therefore, at most there could be five driver factors. In order to calculate the sensitivities of a particular forward value to the five drivers (these sensitivities are termed the random number coefficients) the five coefficients could be solved for by requiring that the forward value discrete volatility for the period, and its four correlations with the other four forward values, be honored. This gives five equations for five unknowns. Thus, the random number coefficients can be solved for. The solving procedure is iterative, and the details are described by the Procedures in FIG. 13. The output from FIG. 13, Procedure 438 is then used in the simulation process under FIG. 9, Procedure 236. In FIG. 16, the second column of graphs, shows these same random number coefficients (output from FIG. 13) calculated for four consecutive future calendar periods.

FIGS. 17 and 18 are illustrative of Generated Output pursuant to the present invention, representing the simulation output of the present invention produced in the process of calculating an Index Amortizing Swap (IAS) Value—over all the simulation nodes over the life of the deal. FIGS. 17 and 18 show some of the potential use of the present invention. The first column of the FIGS. shows the distributions of the cash-flows relating to the IAS on a per period basis—thus providing a look of when the deal will be giving positive and when negative expected cash-flows (the expected cash-flows are termed as "mean p&l" on the graph headings of FIGS. 17 and 18), in addition to the distributions around these expected cash-flows. The second column of graphs shows the cumulative net profit and loss from the deal on a per period basis. Here, again, the expected cumulative profit/loss on a period by period basis is summarized in the graph heading as "mean cum p&l" and the corresponding expected value is given for each period. The third column of the graphs shows the distributions of something called the IAS Notional Amounts—also functions of the future spot prices, and a type of a 'cash-flow' which is used in the determination of the IAS per period cash-flow. The last column of graphs on FIG. 17 shows something called the 'delta'. The 'delta' of the deal is used by traders to tell the trader by how much the deal value will change for a given change in the spot price. It is ultimately used by traders to hedge the market risks embedded in the derivative product away. This is done by off setting one deal's positive delta (i.e., net change in value) with another deal's negative delta—thus neutralizing the net of two deals' delta, meaning that the net of the two deals will not change in value as the spot prices move around. Thus, the calculation of the 'delta' is a crucial feature of any pricing system to have, as without it the market makers could not precisely determine how to hedge the market risks away. And this is what the fourth columns of FIGS. 17 and 18 show for the case of the IAS being the derivative product.

Two basic principles of the present invention are arrived at by starting the method with the market prices and ending with the same market prices. Thus, the present invention enables the user to price any financial product, liquid or illiquid, while at all points in the process incorporating the present market information.

A print out of a computer run for a sample session with basic simulation routine (e.g., generating FIG. 16) is given in Appendix II.

C. Representative Applications

Applications generally involve facilitating a Financial Decision, as suggested in FIG. 5. The decision usually is a decision of whether to buy or sell a financial product (and particularly at what price), but in some cases, the decision may involve maintaining a position in a financial-product. Sometimes, the decision involves participating in hedging strategies, which include indirect financial transactions—ones nevertheless that might not have been undertaken without the assistance of the present invention. Representative examples, not at all intended to be limiting of the scope of the invention, are provided below.

1. Using the Simulation Method To Calculate the Breakeven Value for an Index Amortizing swap Fix A representative application of the present invention involves making the financial decision referenced in FIG. 5 for a very illiquid financial product with a complicated cash flow structure, such as an Index Amortizing Swap (IAS). In particular, it is a swap which has cash flows at each settlement period defined by the previous period's cash flows and the current period's spot rate. An IAS being an illiquid product, is difficult to price by simply 'following' the other market maker quotes—as there are practically none. Thus, the market maker uses his or her own ingenuity in pricing such instruments. Applying the invention here would allow a market maker to price such an illiquid product as the IAS, without knowing anything more than the definition of the cash-flows. And these cash-flows are simply the derivative product definitions—and therefore are well. known by anyone who deals in the derivative products.

Thus, when a potential buyer comes to a market maker for a quote on an IAS fixed rate. (or some equivalently illiquid financial product), the market maker would—by using the liquid and thus available market information plus some historical data—be able to obtain the break-even fix rate value by using the present invention.

Here, the market maker would probably be a bank, which would show a price on a derivative product, if the bank is in the derivative product market. After the market maker internally computes the break-even value for the derivative product (e.q., the IAS), the market maker might add a spread of some basis points, and show the total price to the potential buyer. (In determining the basis points, the bank may apply the invention as discussed subsequently with respect to Appendix IV, given a spread and what the present dollar value of the deal would be).

If the potential buyer and the market maker can reach agreement, then there is a financial transaction, e.g., the purchase/sale of an IAS. Note that alternatively, the IAS could be purchased by the bank, say, from another bank. The present invention has application on both sides of a deal. A print out of a computer run for a sample session for such an application is given in Appendix III.

2. Using the Simulation Methodology To Value Index Amortizing Swaps And Make Hedging Decisions For the same IAS fixed rate that the above-described market maker has obtained, a spread can be added in providing a price to the potential buyer. The market maker would determine the spread by using the calculated cumulative value of the IAS deal—included in the Generated Output 9 from this particular application of the invention—by adding some spread to the break-even fixed rate. In addition to determining the spread to build into the deal, the market maker should know how much 'delta' the deal would bring to the market maker's portfolio of derivative products, as the market maker would be interested in how the deal's value changes as the spot and forward prices change over time. And this, in turn, would determine how many exchange-traded futures the market maker may want to buy/sell. Thus, this particular application of the invention would be important to the market maker as it would guide the determination of the deal's ultimate quote to the client, as well as the hedging process once the deal has been done.

Note that if the deal cannot be priced correctly by any of the existing technologies, the deal's delta—and thus its hedge—also cannot be calculated correctly. Therefore, once the deal was bought or sold, regardless of whether the price was correct or not, the market maker who is using an inappropriate pricing technology would end up with not only managing the market risk from the deal, but also managing the computational risk which would arise due to the incorrect delta calculations.

The swap fix, which is the fair-value of the dealing rate, or 'price' of the Index Amortizing swap, calculated above can then be fed into yet another application of the simulation method for a detailed examination of the future cash flow distributions, cumulative profit and loss distributions, and delta-values (as defined above)—used by the market makers in hedging the market risk of the transaction. FIGS. 17 and 18 graphically show the generated distributions and provides some statistics about them. Appendix IV is a print out of a computer run for a sample session for this particular application.

This application can further be used to maintain a zero risk position on a deal. As a result of applying the present invention, the Financial Decision may include buying, selling, or maintaining a position in one or more swaps, derivatives, swaptions, commodities, caps, floors, exotics, etc.

3. Using the Simulation Technology to Calculate Swaption Volatility

Swaptions—which are derivative products with future cash flows being functions of the forward rate curves and the volatilities of these curves at future times—are fairly illiquid instruments. Thus, another representative application of the present invention involves facilitating buy and sell decisions for swaptions based on a variety of market quotes.

As above in the case of the IAS, a potential buyer comes to market maker to purchase/buy a swaption. To price the swaption, the swaption-specific volatility is used. The Financial Decision indicated in FIG. 5 includes buying, selling, or maintaining a position in a financial product same as above; the case of a swaption is just a different derivative product.

The specific application by which the buy/sell recommendations would be made go as follows: if there is a market maker selling a swaption at a volatility of 12%, for example, and the application of this invention suggests that the swaption volatility is actually 14%, the user of the invention would want to buy the swaption sold at 12% volatility (as the price of a swaption is higher with higher volatility, and vice versa).

Swaption volatility is just one aspect of an illiquid product which does not have a standard pricing mechanism in the market place, and thus, there is a great deal of 'guessing' going on in determining the 'correct' price. The current methodology would take a great deal of this guess work out of the pricing process, and would thus provide more aggressive-bid and ask spreads—ultimately making markets more efficient.

FIGS. 19 and 20 is illustrative of Generated Output 9 pursuant to the present invention, including simulation output of the present invention produced in the process of calculating the swaption volatility-over the life of the deal. Appendix V is a print out of a computer run for a sample session for such an application. FIGS. 19 and 20 show the resulting distributions and some of their characteristics. In particular, the first column of the graphs show the distributions of the swap values at each time period into the future. Note that the mean swap values, or the expected swap values, or the values around which the distributions are centered, are the same across all time-periods. In fact, this value is also be the same as the current market value of the same swap. While generating distributions of future spot and forward prices, the cash flows generated and simulated for the swaps correspond to the current market swap value, and are carried through future time. However, the volatilities of the same swap change over time, as is implied by the market option volatility values. This characteristic of the manner in which the swap values move over time can be observed by looking at how 'fat' the swap value distributions are from period to period. The changing width of the distributions represents the changing volatility of the swap value over time. The second column of the graphs shows the distribution of this swap value volatility for each period into the future. The third column of the graphs shows the overall swap volatility—from today up the settlement in question. This is a sort of a 'cumulative' volatility—and it is this volatility which is used in pricing the derivative products called swaptions. Swaptions, while frequently used, are considered illiquid, as only the over the counter market makers deal in them (and not the exchanges). A market maker could price the swaption if he or she knew the swap volatility. However, determining the volatility by trying to follow other quotes in the market has proven very difficult, as the bid/ask spreads are very wide and the market-maker to market-maker spreads are also very wide: this implies a great deal of uncertainty in the market place as to what the swap volatility really ought to be. This invention, in fact, resolves this issue, and the result is shown by the fourth column in FIGS. 19 and 20.

4. Using the Volatility Building Block To Calculate Swaption Volatility

Interestingly, sometimes it is not necessary to perform the simulations, but it is possible to mathematically calculate the desired result—but only given the discrete volatility matrix. This is the case with the swaption volatility, which can be calculated without the simulations, but through the use of the discrete volatility matrix, included in Generated Output 9 of this invention. Appendix VI is a print out of a computer run for a sample session in which the swaption volatility is calculated theoretically through the calculation of the discrete volatility matrix.

Thus, in some situations, the discrete volatility matrix can be enough to generate the information for making the Financial Decision indicated in FIG. 5, e.g., deal pricing by the market maker(s). However, this is only optional to the more sophisticated market maker. The benefit, however, of having this option, is that the simulations do not need to be run, and thus the pricing process can be much quicker for someone who does not have a great deal of RAM and disk memory. Besides the time saving, the additional benefit is that not having to run the simulations means that the discrete volatility matrix is enough to formulate a Financial Decision that can then be easily encoded within any computer pricing system and used for automated or partially automated buy/sell decisions.

D. Conclusion

While this invention has been shown and described with reference to a preferred embodiment, it will be readily appreciated from the present disclosure by those of ordinary skill in the art that various changes, modifications, and applications may be made without departing from the spirit and scope of the invention. For example, the present invention is based on computerized aspects of a mathematical innovation. Thus, a suitably broad view is that the invention can be used in any application where it is desired to generate data that converges on the input data—finance is only a preferred application. The present invention should not be limited to the preferred embodiment or to specific applications discussed herein. Therefore, it is contemplated that the claims be interpreted as including the foregoing and such, changes and modifications, along with their equivalents.

VI. APPENDIXES

APPENDIX 1

Code Which Generated Output Under Appendix II

```
[1] "THE TOP LEVEL PROGRAM"
function()
{
        print("FIRST -- SOME QUESTIONS......................................."
        )
        print("How many price paths do you want to simulate?")
        nsims <- scan(n = 1)
        print("How far out in calendar time do you want to go?")
        nexp <- scan(n = 1)
        print("Please give me the name of the file where the present market")
        print("forward prices are stored.")
        frwdname <- scan(n = 1, what = character())
        frwds0 <- matrix(scan(file = frwdname), ncol = 2, byrow = TRUE)
        print("Please give me the name of the file where the present market")
        print("standard option volatilities are stored.")
        volname <- scan(n = 1, what = character())
        vols <- matrix(scan(file = volname), ncol = 2, byrow = TRUE)
        print("Please give me the name of the file where the historical")
        print("forward price volatilities are stored.")
        hvolname <- scan(n = 1, what = character())
        mvols <- matrix(scan(file = hvolname), ncol = 2, byrow = TRUE)
        print("Please give me the name of the file where the historical")
        print("forward price correlations are stored.")
        corrname <- scan(n = 1, what = character())
        corrs <- scan(file = corrname)
        lcorr <- length(corrs)
        ndc <- (lcorr)^0.5
        corrs <- matrix(corrs, ncol = ndc)      #
        print("I will now recap what you have given me as inputs..............."
        )
        print("Do you want the graphs to be sent to...")
        print("   1) the screen")
        print("   2) a file for later printing")
        npout <- scan(n = 1)
        if(npout == 1) {
                openlook()
        }
        else {
                postscript(file = "out_graph")
        }
        par(mfrow = c(2, 2))
        plot(frwds0[, 1], frwds0[, 2], type = "l", xlab =
                "Forward Price Expiration Time (in years)", ylab =
                "Forward Price")
        title("MARKET FORWARD PRICES\nAcross Expiration Times", cex = 0.75)
        print("Here are the PRESENT MARKET FORWARD PRICES -- Across Expiration Times"
        )
        print(frwds0)
        plot(vols[, 1], vols[, 2], type = "l", xlab =
                "Option Expiration Time (in years)", ylab =
                "Option Volatility (annualized, in %)")
        title("MARKET OPTION VOLATILITIES \nAcross Option Expiration Times",
                cex = 0.75)
        print("Here are the PRESENT MARKET OPTION VOLATILITIES -- Across Option
                Expiration Times")
        print(vols)
        plot(mvols[, 1], mvols[, 2], type = "l", xlab =
                "Forward Price Expiration Time (in years)", ylab =
                "Single Period's FOrward Price Volatility (annualized, in %)")
        title(main = "HISTORICAL SINGLE PERIOD VOLATILITIES\nAcross Forward Price
                Expiration Times", cex = 0.75)
        print("Here are the HISTORICAL FORWARD PRICE SINGLE PERIOD VOLATILITIES
        )
        print(mvols)
        persp(vols[, 1], vols[, 1], corrs, xlab =
                "Forward Price Expiration Time", ylab =
                "Forward Price Expiration Time", zlab = "Correlation")
        title(main = "SINGLE PERIOD CORRELATIONS\nAcross Forward Price Expiration Times",
                cex = 0.75)
        print("Here are the FORWARD PRICE SINGLE PERIOD CORRELATIONS -- Across Forward Price
                Expiration Times")
        print(corrs)    #
        n <- nrow(vols)
        print("I WILL NOW DECOMPOSE THE INPUT VOLATILITY INFORMATION INTO THE DISCRETE
                VOLATILITY MATRIX")
        dvols <- ptntdiscvols(vols, mvols)
        print("HERE IS THE DISCRETE VOLATILITY MATRIX")
        print(dvols)
```

– 50 –

APPENDIX I

```
        par(mfrow = c(1, 1))
        persp(vols[, 1], vols[, 1], dvols, xlab = "Future Calendar Time", ylab
                = "Forward Price Expiration Time", zlab =
                "Discrete Volatility (annualized, in %)")
        title(main = "SINGLE PERIOD FORWARD PRICE VOLATILITIES\nACROSS Forward Price
                Expiration Times", cex = 0.75)
        dvols <- dvols/100      #
        pandl <- matrix(0, ncol = n, nrow = nsims)
        tenor <- mean(diff(frwds0[, 1]))
        nexp <- nexp/tenor
        fvd <- matrix(0, ncol = n, nrow = nsims)
        fvd[, 1] <- 1 + (frwd0 * diff(frwds0[, 1])[1])
        frwdmean <- frwds0[, 2]
        frwdmean <- frwdmean[1:n]
        frwds <- matrix(rep(frwdmean[1:n], nsims), ncol = n, nrow = nsims,
                byrow = TRUE)
#               cumpandl <- ((frwd0 - swapfix)/fvd[, 1] *
#       npa[, 1] * tenor * payrec * 365)/360
#       meancumpandl <- 1:n *.0
#       meancumpandl[1] <- mean(cumpandl)
pandl[, 1] <- cumpandl
#       meanpandl <- 1:n * 0
meanpandl[1] <- meancumpandl[1]
#       meanpandl[1] <- 0
        par(mfrow = c(5, 5))    #       print(paste("st=", i + 1, "mean p&l=",
#       round(mean(pandl[, i + 1]) * 10000/10000))
#       hist(pandl[, i + 1])
title(paste("st=", i + 1, "mean p&l=", round(mean(pandl[, i + 1]) *
10000)/10000))
#       print(paste("st=", i + 1, "mean cum p&l=",
#       round(mean(cumpandl) * 10000
#               )/10000))
hist(cumpandl)
#       title(paste("st=", i + 1, "mean cum p&l=",
#       round(mean(cumpandl) * 10000
#               )/10000))
        par(mfrow = c(4, 4))
        for(i in 1:(nexp)) {
                alphas <- ptntcalcalphas(dvols[i,  ], corrs[1:nrow(dvols), 1:
                        nrow(dvols)])
                frwdmean <- calcfrwdmean(frwds0[, 2], i)
                frwds <- calcnewfrwds(frwds, frwdmean, tenor, ralpha, alphas)
                fvd[, i + 1] <- fvd[, i] * (1 + (frwds[, 1] * tenor))
                print(paste("SPOT PRICE DISTRIBUTION AT FUTURE CALENDAR PERIOD",
                        i - 1))
                print(paste("Mean Price =", mean(frwds[, 1]),
                        "Standard Deviation =", sqrt(mean((frwds[, 1] - mean(
                        frwds[, 1]))^2))))
#               hist(frwds[, 5], xlab = "1-year Forward Price", ylab = paste(
#               "Number of Occurances (out of", nsims,
#               " Simulated Paths"))
#       title(main = paste(
#               "1-YEAR FORWARD PRICE DISTRIBUTION AT\nFUTURE CALENDAR PERIOD",
#               i - 1), cex = 0.3)
                print(paste("1-YEAR FORWARD PRICE DISTRIBUTION AT FUTURE CALENDAR PERIOD",
                        i - 1))
                print(paste("Mean Price =", mean(frwds[, 5]),
                        "Standard Deviation =", sqrt(mean((frwds[, 5] - mean(
                        frwds[, 5]))^2))))
                plot(vols[, 1], dvols[i,  ], type = "l", xlab =
                        "Forward Price Expiration Time", ylab =
                        "Discrete Volatility")
                title(paste("CALENDAR PERIOD:", i, "\nDiscrete Volatilities"),
                        cex = 0.3)
                persp(1:nrow(corrs), 1:nrow(corrs), alphas, xlab =
                        "Forward Price Position", ylab =
                        "Rand. Num. Identifier", zlab = "Coefficients")
                title("\nRandom Number Coeffs.", cex = 0.3)
                plot(c(0, vols[1:(ncol(frwds) - 1), 1]), apply(frwds, 2, mean),
                        type = "l", xlab = "Forward Price Exp. Time", ylab =
                        "Forward Price")
                title("\nMean Forward Price Curve", cex = 0.3)
                hist(frwds[, 1], xlab = "Spot Price", ylab = paste(
                        "Occurances (out of", nsims, "Paths"))
                title("\nSpot Price Distribution", cex = 0.3)    #       plot(
                pandl[, i + 1] <- ((frwds[, 1] - swapfix)/fvd[, i + 1] *
#       tenor * 365)/360 * npa[, i + 1] * payrec
#       cumpandl <- cumpandl + pandl[, i + 1]
print(paste("st=", i + 1, "mean p&l=", round(mean(pandl[, i + 1
]) * 10000)/10000))
hist(pandl[, i + 1])
title(paste("st=", i + 1, "mean p&l=", round(mean(pandl[, i + 1
]) * 10000)/10000))
print(paste("st=", i + 1, "mean cum p&l=", round(mean(cumpandl) *
10000)/10000))
```

- 51 -

APPENDIX 1

```
#                       hist(cumpandl)
title(paste("st=", i + 1, "mean cum p&l=", round(mean(cumpandl) *
10000)/10000))
#                meanpandl[i + 1] <- mean(pandl[, i + 1])
#                meancumpandl[i + 1] <- mean(cumpandl)
                 if(round((i + 1)/5) == (i + 1)/5) {
                         print("Press RETURN to go to the next page of the graph."
                                 )
                         scan()
                 }
         }
}
[1] " "
[1] "SUBROUTINE DISCVOLS"
function(vols, mvols)
{
        print("Do you want to....")
        print("  1) use the default mean-reverting volatility model, or")
        print("  2) provide your own mean-reverting volatility model?")
        nm <- scan(n = 1)
        dt <- mean(diff(vols[, 1]))
        if(nm == 1) {
                print("Please give me the mean-reverting parameter value...")
                alpha <- scan(n = 1)
                ealphadt <- exp( - alpha * dt)
                vol0 <- mvols
                vol0[, 2] <- 0
                for(i in 1:nrow(vols)) {
                        vol0[i, 2] <- 1/ealphadt * (i * (vols[i, 2])^2 - (mvols[
                                i, 2])^2 * (1 - ealphadt))
                        if(i > 1) {
                                vol0[i, 2] <- vol0[i, 2] - 1/ealphadt * sum((
                                        vol0[1:(i - 1), 2] - (mvols[1:(i - 1), 2])^2) *
                                        ealphadt^(i - 1:(i - 1) + 1) + (mvols[1:(i -
                                        1), 2])^2)
                        }
                }
                vol0[vol0 < 0] <- 0
                vol0[, 2] <- sqrt(vol0[, 2])
                print(vol0)
                dvols <- matrix(0, ncol = nrow(vols), nrow = nrow(vols))
                for(i in 1:nrow(vols)) {
                        dvols[, i] <- sqrt(ealphadt^(1:nrow(vols)) * (vol0[i, 2
                                ])^2 + (mvols[i, 2])^2 * (1 - ealphadt^(1:nrow(
                                vols))))
                }
        }
        else {
                print("Please type in the subroutine -- use the vi editor")
                mdl <- vi(mdl)
                vol0 <- mvols
        # the software to be further developed
        }
        dvols
}
[1] " "
[1] "SUBROUTINE PTNTCALCALPHAS"
function(dv, corrs)
{
        alphas <- corrs * 0
        if(mean(corrs) == 1) {
                alphas[, 1] <- dv
        }
        else {
                alphas[1, 1] <- dv[1]
                n <- nrow(corrs)
                for(i in 2:n) {
                        for(j in 1:(i - 1)) {
                                alphas[i, j] <- (corrs[i, j] * dv[i] * dv[j])/
                                        alphas[j, j]
                                if(j > 1) {
                                        alphas[i, j] <- alphas[i, j] - sum(alphas[i,
                                          1:(j - 1)] * alphas[j, 1:(j - 1)])/alphas[j,
                                          j]
                                }
                        }
                        alphas[i, i] <- sqrt(dv[i]^2 - sum(alphas[i, 1:(i - 1)]^
                                2))
                }
        }
        alphas
}
[1] " "
```

APPENDIX 1

```
[1] "SUBROUTINE CALCFRWDMEAN"
function(frwd0, i)
{
        nlen <- length(frwd0)
        if(i < nlen) {
                frwdmean <- frwd0[(i + 1):nlen]
                if(nlen > length(frwdmean)) {
                        frwdmean <- c(frwdmean, frwd0[nlen] + 1:i * 0)
                }
        }
        else {
                frwdmean <- frwd0 * 0 + frwd0[nlen]
        }
        frwdmean
}
[1] " "
[1] "SUBROUTINE CALCNEWFRWDS"
function(frwds, frwdmean, dt, ralpha, alphas)
{
        jmax <- ncol(frwds) - 1
        nsims <- nrow(frwds)
        frwdmean <- frwdmean[1:jmax]
        alphas <- matrix(alphas[1:jmax, 1:jmax], ncol = jmax)
        alphas <- t(alphas)
        randoms <- rnorm((nsims * jmax)/2)
        randoms <- matrix(randoms, ncol = jmax, nrow = nsims/2)
        randoms <- rbind(randoms, - randoms)
        randoms <- randoms/sqrt(mean(randoms^2))
        frwdsnew <- matrix(frwds[, 2:ncol(frwds)], nrow = nsims)
        newfrwds <- frwdsnew + ralpha * dt * (matrix(rep(frwdmean, nsims), nrow
                = nsims, byrow = TRUE) - frwdsnew)
        newfrwds <- newfrwds + randoms %*% alphas * sqrt(dt) * frwdsnew
        matrix(newfrwds, ncol = ncol(frwds) - 1, nrow = nsims)
}
```

- 53 -

APPENDIX I

Code Which Generated Output Under Appendix III

```
[1] "FINDIASFIX"
function(tlrnc, nsimsmax, nexp, nlo, npastr, npaterm, vols, mvols, valpha,
        ralpha, corrs)
{
        payrec <- 1
        npa0 <- 100
        n <- nrow(vols)
        npapars <- calcnpapars(npastr)
        print(npapars)
        if(nexp < n)
                n <- nexp
        dvols <- discvols(vols[1:n, ], mvols[1:n, ], valpha)
        print(cbind(vols[1:n, 1], dvols[, 1], dvols[, n]))
        dvols <- dvols/100
        rates <- iaszerorates()
        tenor <- mean(diff(vols[, 1]))
        frwd0 <- calcfrwd0(rates, tenor * 360, n)
        print(frwd0)
        frwds0 <- calcfrwds(rates, tenor * 360, n - 1)
        fvd0 <- c(1 + frwd0 * tenor, frwds0[, 3])
        frwds0 <- rbind(c(0, frwd0), frwds0[, 1:2])
        frwds0[, 2] <- (frwds0[, 2] * 360)/365
        swap0 <- sum(frwds0[1:nlo, 2]/fvd0[1:nlo])/sum(1/fvd0[1:nlo])
        swapfixmin <- swap0
        print(paste("REGULAR SWAP FIX LOCK OUT TERM = ", round(swap0 *
                10000000000)/100000000))
        swap0 <- sum(frwds0[1:n, 2]/fvd0[1:n])/sum(1/fvd0[1:n])
        swapfixmax <- swap0
        print(paste("REGULAR SWAP FIX FULL TERM = ", round(swap0 * 10000000000)/
                100000000))
        prs <- nlregb(nrow(frwds0), start = c(0.5, 0.1), res = mrrateres, lower
                 = c(0.01, 0.001), upper = c(25, 5), control = nlregb.control(
                iter.max = 1000, x.tol = 1e-07), rts = frwds0)
        print(prs$parameters)
        prs <- prs$parameters
        dt <- frwds0[nrow(frwds0), 1] + frwds0[2:nrow(frwds0), 1]
        frwds0 <- rbind(frwds0, cbind(t(dt), t(frwds0[1, 2] * exp(( - prs[1] * (
                dt - frwds0[1, 1]))/360) + prs[2] * (1 - exp(( - prs[1] * (dt -
                frwds0[1, 1]))/360)))))
        print(frwds0) #nsims <- 1000
        swapfix <- swapfixmin + (swapfixmax - swapfixmin)/10 * (0:10)
        meancumpandl <- matrix(0, ncol = 11, nrow = n)
        meancumpandl[n, ] <- 10000000000
        nsims <- nsimsmax
        npapars[, 2] <- npapars[, 2]/100
        for(ns in 1:100) {
                if(min(abs(meancumpandl[n, ])) > tlrnc) {
                        nsims <- round(nsims * 1.02)
                        if(nsims > nsimsmax)
                                nsims <- nsimsmax
                        if(ns > 1) {
                                nmin <- c(1:11)[abs(meancumpandl[n, ]) == min(
                                   abs(meancumpandl[n, ]))]
                                swapfixold <- swapfix
                                if(nmin == 1) {
                                   swapfix <- swapfixmin + (swapfixold[nmin + 1] -
                                      swapfixmin)/10 * c(0:10)
                                }
                                else if(nmin == 11) {
                                   swapfix <- swapfixold[nmin - 1] + (swapfixmax -
                                      swapfixold[nmin - 1])/10 * c(0:10)
                                }
                                else {
                                   swapfix <- swapfixold[nmin - 1] + (swapfixold[
                                      nmin + 1] - swapfixold[nmin - 1])/10 * c(0:
                                      10)
                                }
                        }
                }
                print(paste("=============== TRIAL", ns, "; nsims =",
                        nsims, "==========================="))
                print(paste("SWAPFIX =", swapfix * 100))
                pandl <- matrix(0, ncol = 11, nrow = nsims)
                fvd <- matrix(1 + (frwd0 * diff(frwds0[, 1])[1])/360,
                        ncol = 1, nrow = nsims)
                frwdmean <- frwds0[, 2]
                frwdmean <- frwdmean[1:n]
                frwds <- matrix(rep(frwdmean[1:n], nsims), ncol = n,
                        nrow = nsims, byrow = TRUE)
                meannpa <- 1:n * 0
                meannpa[1] <- npa0
                npa <- matrix(npa0, ncol = 1, nrow = nsims)
                meancumpandl <- matrix(0, nrow = n, ncol = 11)
                cumpandl <- matrix(0, ncol = 11, nrow = nsims)
```

- 54 -

APPENDIX A

```
            for(l in 1:11) {
                    cumpandl[, l] <- (1/fvd[, 1] * npa[, 1] * tenor *
                        payrec * 365)/360 * (frwd0 - swapfix[l])
            }
            meancumpandl[1, ] <- apply(cumpandl, 2, mean)
            pandl <- cumpandl
            meanpandl <- matrix(0, nrow = n, ncol = 11)
            meanpandl[1, ] <- meancumpandl[1, ]
            qq <- matrix(rep(npapars[, 1], nsims), nrow = nsims,
                byrow = TRUE)
            strikes <- matrix(rep(npapars[, 2], nsims), nrow =
                nsims, byrow = TRUE)
            i <- 0
            print(paste("st=", 1, "mean p&l=", round(meanpandl[1,
                ] * 10000)/10000))
    print(paste("st=", 1, "mean cum p&l=", round(
            meancumpandl[1, ] * 10000)/10000))
            print(paste("st=", 1, "mean npa=", round(meannpa[1] *
                10000)/10000))
            for(i in 1:(n - 1)) {
                    npa[npa[, 1] <= npaterm, 1] <- 0
                    alphas <- calcalphas(dvols[i, ], corrs[1:nrow(
                        dvols), 1:nrow(dvols)])
                    frwdmean <- calcfrwdmean(frwds0[, 2], i)
                    frwds <- calcnewfrwds(frwds, frwdmean, tenor,
                        ralpha, alphas)
                    fvd[, 1] <- fvd[, 1] * (1 + (frwds[, 1] * tenor *
                        365)/360)
                    if((i + 1) > nlo) {
                        rf <- strikes - matrix(rep(frwds[, 1], ncol(
                            strikes)), ncol = ncol(strikes))
                        rf[rf < 0] <- 0
                        rf <- rf * qq
                        npa[, 1] <- npa[, 1] * (1 - t(apply(rf, 1,
                            sum)))
                        npa[npa[, 1] <= npaterm, 1] <- 0
                    }
                    for(l in 1:11) {
                        pandl[, l] <- (({frwds[, 1] - swapfix[l])/fvd[,
                            1] * tenor * 365)/360 * npa[, 1] * payrec
                        cumpandl[, l] <- cumpandl[, l] + pandl[, l]
                    }
    npa[npa[, 1] < 0.0001, 1] <- 0.0001
                    meannpa[i + 1] <- mean(npa[, 1])
                    meanpandl[i + 1, ] <- apply(pandl, 2, mean)
                    meancumpandl[i + 1, ] <- apply(cumpandl, 2,
                        mean)
            print(paste("st=", i + 1, "mean p&l=", round(
                meanpandl[i + 1, ] * 10000)/10000))
            print(paste("st=", i + 1, "mean cum p&l=",
                round(meancumpandl[i + 1, ] * 10000)/10000))
            print(paste("st=", i + 1, "mean npa=", round(
                mean(npa[, 1]) * 10000)/10000))
            }
            print(paste("================ TRIAL", ns,
                "================"))
            print(" swapfix        cumpandl")
            print(cbind(t(swapfix), meancumpandl[n, ]))
            nmintmp <- c(1:11)[abs(meancumpandl[n, ]) == min(abs(
                meancumpandl[n, ]))]
            print(paste("THE WINNER IS SWAPFIX =", swapfix[nmintmp],
                "WITH CUMM P&L =", meancumpandl[n, nmintmp]))
        }
}
```

- 55 -

APPENDIX _

Code Which Generated Output Under Appendix IV

```
[1] "THE TOP LEVEL PROGRAM FOR PRICING INDEX AMORTIZING SWAPS"
function(payrec, nexp, nlo, npastr, swapfix, npaterm, vols, mvols, valpha,
    ralpha, corrs, nsims)
{
    npa0 <- 100
    n <- nrow(vols)
    swapfix <- swapfix/100
    npapars <- calcnpapars(npastr)
    print(npapars)
    if(nexp < n)
        n <- nexp
    dvols <- discvols(vols[1:n,  ], mvols[1:n,  ], valpha)
    print(cbind(vols[1:n, 1], dvols[, 1], dvols[, n]))
    dvols <- dvols/100
    rates <- zerorates()
    tenor <- mean(diff(vols[, 1]))
    frwd0 <- calcfrwd0(rates, tenor * 360, n)
    print(frwd0)
    frwds0 <- calcfrwds(rates, tenor * 360, n - 1)
    fvd0 <- c(1 + frwd0 * tenor, frwds0[, 3])
    frwds0 <- rbind(c(0, frwd0), frwds0[, 1:2])
    frwds0[, 2] <- (frwds0[, 2] * 360)/365
    swap0 <- sum(frwds0[1:nlo, 2]/fvd0[1:nlo])/sum(1/fvd0[1:nlo])
    print(paste("REGULAR SWAP FIX LOCK OUT TERM = ", round(swap0 *
        10000000000)/100000000))
    swap0 <- sum(frwds0[1:n, 2]/fvd0[1:n])/sum(1/fvd0[1:n])
    print(paste("REGULAR SWAP FIX FULL TERM = ", round(swap0 * 10000000000)/
        100000000))
    prs <- nlregb(nrow(frwds0), start = c(0.5, 0.1), res = mrrateres, lower
        = c(0.01, 0.001), upper = c(25, 5), control = nlregb.control(
        iter.max = 1000, x.tol = 1e-07), rts = frwds0)
    print(prs$parameters)
    prs <- prs$parameters
    dt <- frwds0[nrow(frwds0), 1] + frwds0[2:nrow(frwds0), 1]
    frwds0 <- rbind(frwds0, cbind(t(dt), t(frwds0[1, 2] * exp(( - prs[1] * (
        dt - frwds0[1, 1]))/360) + prs[2] * (1 - exp(( - prs[1] * (dt -
        frwds0[1, 1]))/360)))))
    print(frwds0)
    pandl <- matrix(0, ncol = n, nrow = nsims)
    fvd <- matrix(0, ncol = n, nrow = nsims)
    fvd[, 1] <- 1 + (frwd0 * diff(frwds0[, 1])[1])/360
    frwdmean <- frwds0[, 2]
    frwdmean <- frwdmean[1:n]
    frwds <- matrix(rep(frwdmean[1:n], nsims), ncol = n, nrow = nsims,
        byrow = TRUE)
    meannpa <- 1:n * 0
    meannpa[1] <- npa0
    histbrk <- 0:10 * (npa0/10)
    npa <- matrix(0, ncol = n, nrow = nsims)
    delta <- matrix(0, ncol = n, nrow = nsims)
    npa[, 1] <- npa0
    cumpandl <- ((frwd0 - swapfix)/fvd[, 1] * npa[, 1] * tenor * payrec *
        365)/360
    meancumpandl <- 1:n * 0
    meancumpandl[1] <- mean(cumpandl)
    pandl[, 1] <- cumpandl
    meandelta <- 1:n * 0
    meanpandl <- 1:n * 0
    meanpandl[1] <- meancumpandl[1]
    npapars[, 2] <- npapars[, 2]/100
    qq <- matrix(rep(npapars[, 1], nsims), nrow = nsims, byrow = TRUE)
    strikes <- matrix(rep(npapars[, 2], nsims), nrow = nsims, byrow = TRUE)
    postscript(file = "out_graph2")
    par(mfrow = c(5, 4))
    i <- 0
    print(paste("st=", i + 1, "mean p&l=", round(mean(pandl[, i + 1]) *
        10000)/10000))
    hist(pandl[, i + 1])
    title(paste("st=", i + 1, "mean p&l=", round(mean(pandl[, i + 1]) *
        10000)/10000))
    print(paste("st=", i + 1, "mean cum p&l=", round(mean(cumpandl) * 10000
        )/10000))
    hist(cumpandl)
    title(paste("st=", i + 1, "mean cum p&l=", round(mean(cumpandl) * 10000
        )/10000))
    print(paste("st=", i + 1, "mean npa=", round(mean(npa[, i + 1]) * 10000
        )/10000))
    hist(npa[, i + 1], breaks = histbrk)
    title(paste("st=", i + 1, "mean npa=", round(mean(npa[, i + 1]) * 10000
        )/10000))
    print(paste("st=", i + 1, "mean delta=", round(mean(delta[, i + 1]) *
        10000)/10000))
    hist(delta[, i + 1])
```

APPENDIX

```
                title(paste("st=", i + 1, "mean delta=", round(mean(delta[, i + 1]) *
                        10000)/10000))
                for(i in 1:(n - 1)) {
                        npa[npa[, i] <= npaterm, i] <- 0
                        alphas <- calcalphas(dvols[i, ], corrs[1:nrow(dvols), 1:nrow(
                                dvols)])
                        frwdmean <- calcfrwdmean(frwds0[, 2], i)
                        frwds <- calcnewfrwds(frwds, frwdmean, tenor, ralpha, alphas)
                        fvd[, i + 1] <- fvd[, i] * (1 + (frwds[, 1] * tenor * 365)/360)
                        if((i + 1) > nlo) {
                                rf <- strikes - matrix(rep(frwds[, 1], ncol(strikes)),
                                        ncol = ncol(strikes))
                                rf[rf < 0] <- 0
                                deltarf <- rf
                                deltarf[deltarf > 0] <- 1
                                rf <- rf * qq
                                deltarf <- deltarf * qq
                                npa[, i + 1] <- npa[, i] * (1 - t(apply(rf, 1, sum)))
                                npa[npa[, i + 1] <= npaterm, i + 1] <- 0
                                delta[, i + 1] <- 0 - (t(apply(deltarf, 1, sum)) * npa[,
                                        i] * (frwds[, 1] - swapfix) * tenor * 365)/360/
                                        fvd[, i + 1]
                        }
                        else {
                                npa[, i + 1] <- npa[, i]
                        }
                        delta[, i + 1] <- delta[, i + 1] + (npa[, i + 1] * tenor * 365)/
                                360/fvd[, i + 1] - ((((frwds[, 1] - swapfix)/fvd[, i +
                                1] * tenor * 365)/360 * npa[, i + 1] * tenor * 365)/360 *
                                fvd[, i])/fvd[, i + 1]
                        delta[, i + 1] <- delta[, i + 1] * payrec * 0.0001
                        pandl[, i + 1] <- ((frwds[, 1] - swapfix)/fvd[, i + 1] * tenor *
                                365)/360 * npa[, i + 1] * payrec
                        cumpandl <- cumpandl + pandl[, i + 1]
                        print(paste("st=", i + 1, "mean p&l=", round(mean(pandl[, i + 1
                                ]) * 10000)/10000))
                        hist(pandl[, i + 1])
                        title(paste("st=", i + 1, "mean p&l=", round(mean(pandl[, i + 1
                                ]) * 10000)/10000))
                        print(paste("st=", i + 1, "mean cum p&l=", round(mean(cumpandl) *
                                10000)/10000))
                        hist(cumpandl)
                        title(paste("st=", i + 1, "mean cum p&l=", round(mean(cumpandl) *
                                10000)/10000))
                        print(paste("st=", i + 1, "mean npa=", round(mean(npa[, i + 1]) *
                                10000)/10000))
                        npa[npa[, i + 1] < 0.0001, i + 1] <- 0.0001
                        hist(npa[, i + 1], breaks = histbrk)
                        title(paste("st=", i + 1, "mean npa=", round(mean(npa[, i + 1]) *
                                10000)/10000))
                        print(paste("st=", i + 1, "mean delta=", round(mean(delta[, i +
                                1]) * 10000)/10000))
                        hist(delta[, i + 1])
                        title(paste("st=", i + 1, "mean delta=", round(mean(delta[, i +
                                1]) * 10000)/10000))
                        meannpa[i + 1] <- mean(npa[, i + 1])
                        meanpandl[i + 1] <- mean(pandl[, i + 1])
                        meandelta[i + 1] <- mean(delta[, i + 1])
                        meancumpandl[i + 1] <- mean(cumpandl)
                        if(round((i + 1)/5) == (i + 1)/5) {
                                print("Press RETURN to go to the next page of the graph."
                                        )
                                scan()
                        }
                }
        print("Press RETURN when done viewing the graph.")
        scan()
        dev.off()
        t(rbind(c(0, vols[1:(n - 1), 1]), meannpa, meanpandl, meancumpandl,
                meandelta))
}
[1] " "
[1] "SUBROUTINE CALCNPAPARS"
function(npastr)
{
        npapars <- npastr
        npapars[, 1] <- 0
        npastr <- npastr/100
        diffs <- npastr[1, 2] - npastr[2:nrow(npastr), 2]
        npastr <- matrix(npastr, ncol = 2)
        npapars[1, 1] <- npastr[2, 1]/diffs[1]
        for(i in 2:(nrow(npastr) - 1)) {
                npapars[i, 1] <- (npastr[i + 1, 1] - sum(npapars[1:(i - 1), 1] *
                        diffs[i:2]))/diffs[1]
        }
        npapars[nrow(npastr), 1] <- 0 - sum(npapars[1:(nrow(npastr) - 1), 1])
        npapars
}
[1] " "
```

- 57 -

APPENDIX

```
[1] "SUBROUTINE DISCVOLS"
function(vols, mvols, alpha)
{
        dt <- mean(diff(vols[, 1]))
        ealphadt <- exp( - alpha * dt)
        vol0 <- mvols
        vol0[, 2] <- 0
        for(i in 1:nrow(vols)) {
                vol0[i, 2] <- 1/ealphadt * (i * (vols[i, 2])^2 - (mvols[i, 2])^
                        2 * (1 - ealphadt))
                if(i > 1) {
                        vol0[i, 2] <- vol0[i, 2] - 1/ealphadt * sum((vol0[1:(i -
                                1), 2] - (mvols[1:(i - 1), 2])^2) * ealphadt^(i -
                                1:(i - 1) + 1) + (mvols[1:(i - 1), 2])^2)
                }
        }
        vol0[vol0 < 0] <- 0
        vol0[, 2] <- sqrt(vol0[, 2])
        print(vol0)
        dvols <- matrix(0, ncol = nrow(vols), nrow = nrow(vols))
        for(i in 1:nrow(vols)) {
                dvols[, i] <- sqrt(ealphadt^(1:nrow(vols)) * (vol0[i, 2])^2 + (
                        mvols[i, 2])^2 * (1 - ealphadt^(1:nrow(vols)))))
        }
        dvols
}
[1] " "
[1] "SUBROUTINE ZERORATES"
function()
{
        print("Which currency are you calculating vols for?")
        print("    1) usdpr")
        print("    2) usdcp")
        print("    3) usdli")
        print("    4) jpy")
        print("    5) gbp")
        print("    6) dem")
        print("    7) cad")
        print("    8) esp")
        print("    9) itl")
        print("   10) bec")
        print("   11) ecu")
        print("   12) test data")
        print("   13) you provide the file name")
        ncurrency <- scan(n = 1)
        if(ncurrency == 1) {
                mfv <- matrix(scan(file =
                        "/usr/local/bxs/data/prices/curves_output/ir_usdpr_fv.price",
                        skip = 3), ncol = 4, byrow = TRUE)
        }
        else if(ncurrency == 2) {
                mfv <- matrix(scan(file =
                        "/usr/local/bxs/data/prices/curves_output/ir_usdcp_fv.price",
                        skip = 3), ncol = 4, byrow = TRUE)
        }
        else if(ncurrency == 3) {
                mfv <- matrix(scan(file =
                        "/usr/local/bxs/data/prices/curves_output/ir_usdli_fv.price",
                        skip = 3), ncol = 4, byrow = TRUE)
        }
        else if(ncurrency == 4) {
                mfv <- matrix(scan(file =
                        "/usr/local/bxs/data/prices/curves_output/ir_jpy_fv.price",
                        skip = 3), ncol = 4, byrow = TRUE)
        }
        else if(ncurrency == 5) {
                mfv <- matrix(scan(file =
                        "/usr/local/bxs/data/prices/curves_output/ir_gbp_fv.price",
                        skip = 3), ncol = 4, byrow = TRUE)
        }
        else if(ncurrency == 6) {
                mfv <- matrix(scan(file =
                        "/usr/local/bxs/data/prices/curves_output/ir_dem_fv.price",
                        skip = 3), ncol = 4, byrow = TRUE)
        }
        else if(ncurrency == 7) {
                mfv <- matrix(scan(file =
                        "/usr/local/bxs/data/prices/curves_output/ir_cad_fv.price",
                        skip = 3), ncol = 4, byrow = TRUE)
        }
        else if(ncurrency == 8) {
                mfv <- matrix(scan(file =
                        "/usr/local/bxs/data/prices/curves_output/ir_esp_fv.price",
                        skip = 3), ncol = 4, byrow = TRUE)
        }
```

- 58 -

APPENDIX

```
        else if(ncurrency == 9) {
                mfv <- matrix(scan(file =
                        "/usr/local/bxs/data/prices/curves_output/ir_itl_fv.price",
                        skip = 3), ncol = 4, byrow = TRUE)
        }
        else if(ncurrency == 10) {
                mfv <- matrix(scan(file =
                        "/usr/local/bxs/data/prices/curves_output/ir_bec_fv.price",
                        skip = 3), ncol = 4, byrow = TRUE)
        }
        else if(ncurrency == 11) {
                mfv <- matrix(scan(file =
                        "/usr/local/bxs/data/prices/curves_output/ir_ecu_fv.price",
                        skip = 3), ncol = 4, byrow = TRUE)
        }
        else if(ncurrency == 12) {
                mfv <- matrix(scan(file =
                        "/home/dragana/indexamortswap/ir_usdli_fv.price", skip
                        = 3), ncol = 4, byrow = TRUE)
        }
        else if(ncurrency == 13) {
                print("Please give the file name (in double quotes)")
                yourfilename <- scan(n = 1, what = character())
                mfv <- matrix(scan(file = yourfilename, skip = 3), ncol = 4,
                        byrow = TRUE)
        }
        fvt <- mfv[, 1]
        fv <- mfv[, 3]
        fv <- (log(fv) * 365)/fvt
        fvt <- (fvt * 360)/365
        cbind(t(fvt), t(fv))
}
[1] " "
[1] "SUBROUTINE CALCFRWD0"
function(rates, tenor, nsettle)
{
        fvt <- rates[, 1]
        fv <- rates[, 2]
        texp <- 1:(nsettle[length(nsettle)] + 1) * 0
        forward <- texp
        fvd <- texp
        texp[1] <- 0
        i <- 1
        texp[i + 1] <- texp[i] + tenor
        for(j in 1:(length(fvt) - 1)) {
                if((texp[i + 1] >= fvt[j]) & (texp[i + 1] <= fvt[j + 1])) {
                        r2 <- (fv[j + 1] - fv[j]) * (texp[i + 1] - fvt[j])
                        r2 <- r2/(fvt[j + 1] - fvt[j])
                        r2 <- r2 + fv[j]
                }
        }
        forward[i] <- exp((r2 * texp[i + 1])/360) - 1
        forward[i] <- (forward[i] * 360)/tenor
        forward[1]
}
[1] " "
[1] "SUBROUTINE CALCFRWDS"
function(rates, tenor, nsettle)
{
        fvt <- rates[, 1]
        fv <- rates[, 2]
        texp <- 1:(nsettle[length(nsettle)] + 1) * 0
        forward <- texp
        fvd <- texp
        texp[1] <- tenor
        for(i in 1:nsettle[length(nsettle)]) {
                texp[i + 1] <- texp[i] + tenor
                for(j in 1:(length(fvt) - 1)) {
                        if((texp[i] >= fvt[j]) & (texp[i] <= fvt[j + 1])) {
                                r1 <- (fv[j + 1] - fv[j]) * (texp[i] - fvt[j])
                                r1 <- r1/(fvt[j + 1] - fvt[j])
                                r1 <- r1 + fv[j]
                        }
                }
                for(j in 1:(length(fvt) - 1)) {
                        if((texp[i + 1] >= fvt[j]) & (texp[i + 1] <= fvt[j + 1]
                                )) {
                                r2 <- (fv[j + 1] - fv[j]) * (texp[i + 1] - fvt[
                                        j])
                                r2 <- r2/(fvt[j + 1] - fvt[j])
                                r2 <- r2 + fv[j]
                        }
```

- 59 -

APPENDIX

```
                }
                forward[i] <- exp((r2 * texp[i + 1])/360)/exp((r1 * texp[i])/
                    360) - 1
                forward[i] <- (forward[i] * 360)/tenor
                fvd[i] <- exp((r2 * texp[i + 1])/360)
        }
        cbind(t(texp[1:(length(texp) - 1)]), t(forward[1:(length(texp) - 1)]),
            t(fvd[1:(length(texp) - 1)]))
}
[1] " "
[1] "SUBROUTINE CALCALPHAS"
function(dv, corrs)
{
        alphas <- corrs * 0
        if(mean(corrs) == 1) {
                alphas[, 1] <- dv
        }
        else {
                alphas[1, 1] <- dv[1]
                n <- nrow(corrs)
                for(i in 2:n) {
                        for(j in 1:(i - 1)) {
                                alphas[i, j] <- (corrs[i, j] * dv[i] * dv[j])/
                                    alphas[j, j]
                                if(j > 1) {
                                        alphas[i, j] <- alphas[i, j] - sum(alphas[i,
                                            1:(j - 1)] * alphas[j, 1:(j - 1)])/alphas[j,
                                            j]
                                }
                        }
                        alphas[i, i] <- sqrt(dv[i]^2 - sum(alphas[i, 1:(i - 1)]^
                            2))
                }
        }
        alphas
}
[1] " "
[1] "SUBROUTINE CALCFRWDMEAN"
function(frwd0, i)
{
        nlen <- length(frwd0)
        if(i < nlen) {
                frwdmean <- frwd0[(i + 1):nlen]
                if(nlen > length(frwdmean)) {
                        frwdmean <- c(frwdmean, frwd0[nlen] + 1:i * 0)
                }
        }
        else {
                frwdmean <- frwd0 * 0 + frwd0[nlen]
        }
        frwdmean
}
[1] " "
[1] "SUBROUTINE CALCNEWFRWDS"
function(frwds, frwdmean, dt, ralpha, alphas)
{
        jmax <- ncol(frwds) - 1
        nsims <- nrow(frwds)
        frwdmean <- frwdmean[1:jmax]
        alphas <- matrix(alphas[1:jmax, 1:jmax], ncol = jmax)
        alphas <- t(alphas)
        randoms <- rnorm((nsims * jmax)/2)
        randoms <- matrix(randoms, ncol = jmax, nrow = nsims/2)
        randoms <- rbind(randoms,  - randoms)
        randoms <- randoms/sqrt(mean(randoms^2))
        frwdsnew <- matrix(frwds[, 2:ncol(frwds)], nrow = nsims)
        newfrwds <- frwdsnew + ralpha * dt * (matrix(rep(frwdmean, nsims), nrow
             = nsims, byrow = TRUE) - frwdsnew)
        newfrwds <- newfrwds + randoms %*% alphas * sqrt(dt) * frwdsnew
        matrix(newfrwds, ncol = ncol(frwds) - 1, nrow = nsims)
}
```

APPENDIX I

Code Which Generated Output Under Appendix V

[1] "TOP LEVEL PROGRAM FOR CALCULATING SWAPTION VOLATILITIES USING THE DISCRETE VOLATILITIES
function(nexpopt, nexpswp, vols, mvols, valpha, ralpha, corrs, nsims)

```
{
        tenor <- mean(diff(vols[, 1]))
        nexpopt <- round(nexpopt/tenor) + 1
        nexpswp <- round(nexpswp/tenor) + nexpopt
        npa0 <- 100
        n <- nrow(vols)
        if(nexpswp < n)
                n <- nexpswp - 1
        dvols <- discvols(vols[1:(n), ], mvols[1:(n), ], valpha)
        print(cbind(vols[1:n, 1], dvols[, 1], dvols[, n]))
        dvols <- dvols/100
        rates <- zerorates()
        frwd0 <- calcfrwd0(rates, tenor * 360, n)
        print(frwd0)
        frwds0 <- calcfrwds(rates, tenor * 360, n - 1)
        fvd0 <- c(1 + frwd0 * tenor, frwds0[, 3])
        frwds0 <- rbind(c(0, frwd0), frwds0[, 1:2])
        swap0 <- sum(frwds0[nexpopt:(nexpswp - 1), 2]/fvd0[nexpopt:(nexpswp - 1
                )])/sum(1/fvd0[nexpopt:(nexpswp - 1)])
        print(paste("SWAP FIX = ", round(swap0 * 10000000000)/100000000))
        prs <- nlregb(nrow(frwds0), start = c(0.5, 0.1), res = mrrateres, lower
                 = c(0.01, 0.001), upper = c(25, 5), control = nlregb.control(
                iter.max = 1000, x.tol = 1e-07), rts = frwds0)
        print(prs$parameters)
        prs <- prs$parameters
        dt <- frwds0[nrow(frwds0), 1] + frwds0[2:nrow(frwds0), 1]
        frwds0 <- rbind(frwds0, cbind(t(dt), t(frwds0[1, 2] * exp(( - prs[1] * (
                dt - frwds0[1, 1]))/360) + prs[2] * (1 - exp(( - prs[1] * (dt -
                frwds0[1, 1]))/360)))))
        print(frwds0)
        frwdmean <- frwds0[, 2]
        frwdmean <- frwdmean[1:n]
        frwds <- matrix(rep(frwdmean[1:n], nsims), ncol = n, nrow = nsims,
                byrow = TRUE)
        openlook()
        par(mfrow = c(5, 3))
        i <- 0
        swapvol <- matrix(0, ncol = 1, nrow = nsims)
        swapvalue <- matrix(0, ncol = nexpswp, nrow = nsims)
        swapvalue[, 1] <- swap0
        fvd0 <- frwds
        for(i in 1:(nexpopt - 1)) {
                alphas <- calcalphas(dvols[i, ], corrs[1:nrow(dvols), 1:nrow(
                        dvols)])
                frwdmean <- calcfrwdmean(frwds0[, 2], i)
                frwds <- calcnewfrwds(frwds, frwdmean, tenor, ralpha, alphas)
                fvd0[, 1] <- 1 + frwds[, 1] * tenor
                if(ncol(frwds) > 1) {
                        for(j in 2:ncol(frwds)) {
                                fvd0[, j] <- fvd0[, j - 1] * (1 + frwds[, j] *
                                        tenor)
                        }
                }
                swapvalue[, i + 1] <- 0
                tmp <- matrix(0, ncol = 1, nrow = nsims)
                for(j in (nexpopt - i):(nexpswp - i - 1)) {
                        swapvalue[, i + 1] <- swapvalue[, i + 1] + frwds[, j]/
                                fvd0[, j]
                        tmp <- tmp + 1/fvd0[, j]
                }
                swapvalue[, i + 1] <- (swapvalue[, i + 1])/tmp
                currvol <- matrix((((swapvalue[, i + 1] - swapvalue[, i])/
                        swapvalue[, i]))^2/tenor, ncol = 1)
                swapvol <- swapvol + currvol
                print(paste("st=", i + 1, "SwapVAlue=", round(mean(swapvalue[,
                        i + 1]) * 10000)/10000))
                hist(swapvalue[, i + 1])
                title(paste("st=", i + 1, "SwapValue=", round(mean(swapvalue[,
                        i + 1]) * 10000)/10000))
                print(paste("st=", i + 1, "curr vol=", round(sqrt(mean(currvol)
                        ) * 10000)/100))
                hist(sqrt(currvol))
                title(paste("st=", i + 1, "curr vol=", round(sqrt(mean(currvol)
                        ) * 10000)/100))
                print(paste("st=", i + 1, "swap vol=", round(sqrt(mean(swapvol)/
                        i) * 10000)/100))
                hist(sqrt(swapvol/i))
                title(paste("st=", i + 1, "swap vol=", round(sqrt(mean(swapvol/
                        i)) * 10000)/100))
```

– 61 –

APPENDIX A

```
    #        if(round((i + 1)/5) == (i + 1)/5) {
    #            print("Press RETURN to go to the next page of the graph."
    #                )
    #            scan()
    #        }
    }
    print("Press RETURN when done viewing the graph.")
    scan()
    dev.off()
    print(paste("SWAPTION VOLATILITY -- SIMULATIONS =", sqrt(mean(swapvol/(
        nexpopt - 1)))))
}
[1] " "
```

APPENDIX

Code Which Generated Output Under Appendix VI

```
[1] "TOP LEVEL PROGRAM FOR CALCULATING SWAPTION VOLATILITIES USING THE DISCRETE VOLATILITIES
function(nexpopt, nexpswp, vols, mvols, valpha, ralpha, corrs)
{
        tenor <- mean(diff(vols[, 1]))
        nexpopt <- round(nexpopt/tenor) + 1
        nexpswp <- round(nexpswp/tenor) + nexpopt        #       example:
#               1-year option on a 1-year swap, then
#                       nexpopt<-5
#                       nexpswp<-9
#               5-year option on the forward rate, then, this should be the
#               option vol for 5-year expiration, then
#                       nexpopt<-21
#                       nexpswp<-22
        npa0 <- 100
        n <- nrow(vols)
        if(nexpswp < n)
                n <- nexpswp
        dvols <- discvols(vols[1:n,  ], mvols[1:n,  ], valpha)
        print(cbind(vols[1:n, 1], dvols[, 1], dvols[, n]))
        dvols <- dvols/100
        rates <- zerorates()
        frwd0 <- calcfrwd0(rates, tenor * 360, n)
        print(frwd0)
        frwds0 <- calcfrwds(rates, tenor * 360, n - 1)
        fvd0 <- c(1 + frwd0 * tenor, frwds0[, 3])
        frwds0 <- rbind(c(0, frwd0), frwds0[, 1:2])
        swap0 <- sum(frwds0[(nexpopt):(nexpswp - 1), 2]/fvd0[(nexpopt):(nexpswp -
                1)])/sum(1/fvd0[(nexpopt):(nexpswp - 1)])
        print(paste("SWAP FIX = ", round(swap0 * 10000000000)/100000000))
        prs <- nlregb(nrow(frwds0), start = c(0.5, 0.1), res = mrrateres, lower
                = c(0.01, 0.001), upper = c(25, 5), control = nlregb.control(
                iter.max = 1000, x.tol = 1e-07), rts = frwds0)
        print(prs$parameters)
        prs <- prs$parameters
        dt <- frwds0[nrow(frwds0), 1] + frwds0[2:nrow(frwds0), 1]
        frwds0 <- rbind(frwds0, cbind(t(dt), t(frwds0[1, 2] * exp(( - prs[1] * (
                dt - frwds0[1, 1]))/360) + prs[2] * (1 - exp(( - prs[1] * (dt -
                frwds0[1, 1]))/360)))))
        print(frwds0)
        frwdmean <- frwds0[, 2]
        frwdmean <- frwdmean[1:n]
        theovol <- 1:(nexpopt - 1) * 0
        for(i in 1:(nexpopt - 1)) {
                tmp <- tenor * sum(1/fvd0[(nexpopt):(nexpswp - 1)] * fvd0[i])
                vl <- (frwdmean[(nexpopt):(nexpswp - 1)]/fvd0[(nexpopt):(
                        nexpswp - 1)] * fvd0[i] * dvols[i, nexpopt - i - 1 + 1:(
                        nexpswp - nexpopt)] * tenor)/swap0
                vk <- vl
                theovol[i] <- vl %*% matrix(corrs[nexpopt - i - 1 + 1:(nexpswp -
                        nexpopt), nexpopt - i - 1 + 1:(nexpswp - nexpopt)],
                        ncol = length(nexpopt - i - 1 + 1:(nexpswp - nexpopt))) %*%
                        t(vk)/tmp^2
                print(paste("SWAPTION VOL", i, sqrt(theovol[i]), sqrt(mean(
                        theovol[1:i]))))      #       for(j in 1:(nexpswp - nexpopt)) {
#                       vk <- (((frwdmean[nexpopt + j] - swap0) * tenor^2)/(
#                               fvd0[nexpopt + j]/fvd0[i]) * frwdmean[2:(
#                               nexpopt + j - i)])/swap0/(1 + frwdmean[2:(
#                               nexpopt + j - i)] * tenor) * dvols[i, 1:(
#                               nexpopt + j - i - 1)]
#                       theovol[i] <- theovol[i] - (2 * vl %*% matrix(corrs[
#                               nexpopt - i - 1 + 1:(nexpswp - nexpopt), 1:(
#                               nexpopt + j - i - 1)], ncol = (nexpopt + j - i -
#                               1)) %*% t(vk))/tmp^2
        }
        print(paste("SWAPTION VOL", i, sqrt(theovol[i]), sqrt(mean(
                theovol[1:i]))))        #       for(j in 1:(nexpswp - nexpopt)) {
#               for(n in 1:(nexpswp - nexpopt)) {
#                       vk <- (((frwdmean[nexpopt + j] - swap0) * tenor^
#                               2)/(fvd0[nexpopt + j]/fvd0[i]) * frwdmean[2:(
#                               nexpopt + j - i)])/swap0/(1 + frwdmean[2:(
#                               nexpopt + j - i)] * tenor) * dvols[i, 1:(
#                               nexpopt + j - i - 1)]
#                       vn <- (((frwdmean[nexpopt + n] - swap0) * tenor^
#                               2)/(fvd0[nexpopt + n]/fvd0[i]) * frwdmean[2:(
#                               nexpopt + n - i)])/swap0/(1 + frwdmean[2:(
#                               nexpopt + n - i)] * tenor) * dvols[i, 1:(
#                               nexpopt + n - i - 1)]
#                       theovol[i] <- theovol[i] + vn %*% matrix(corrs[
#                               1:(nexpopt + n - i - 1), 1:(nexpopt + j - i -
#                               1)], ncol = (nexpopt + j - i - 1)) %*% t(vk)/
#                               tmp^2
#               }
}
```

− 63 −

APPENDIX 1

```
#       print(paste("SWAPTION VOL", i, sqrt(theovol[i]), sqrt(mean(
#               theovol[1:i]))))
        }
        theoswaptionvol <- sqrt(mean(theovol))
        print(paste("SWAPTION VOL - THEORETICAL =", theoswaptionvol))
}
[1] " "
```

APPENDIX A

```
Splus
S-PLUS : Copyright (c) 1988, 1992 Statistical Sciences, Inc.
S : Copyright AT&T.
Version 3.1 Release 1 for Sun SPARC, SunOS 4.x : 1992
Working data will be in .Data
> ptntsims()

[1] "FIRST -- SOME QUESTIONS........................................"

[1] "How many price paths do you want to simulate?"
1: 2000

[1] "How far out in calendar time do you want to go?"
1: 1

[1] "Please give me the name of the file where the present market"
[1] "forward prices are stored."
1: forward_prices.prn

[1] "Please give me the name of the file where the present market"
[1] "standard option volatilities are stored."
1: market_vols.prn

[1] "Please give me the name of the file where the historical"
[1] "forward price volatilities are stored."
1: historical_vols.prn

[1] "Please give me the name of the file where the historical"
[1] "forward price correlations are stored."
1: historical_corrs.prn

[1] "I will now recap what you have given me as inputs..............."
[1] "Do you want the graphs to be sent to..."
[1] "    1) the screen"
[1] "    2) a file for later printing"
1: 2

[1] "Here are the PRESENT MARKET FORWARD PRICES -- Across Expiration Times"
      [,1]     [,2]
[1,]  0.00  0.03204864
[2,]  0.25  0.03278280
[3,]  0.50  0.03453621
[4,]  0.75  0.03774639
[5,]  1.00  0.03855085
[6,]  1.25  0.04016627
[7,]  1.50  0.04177766

[1] "Here are the PRESENT MARKET OPTION VOLATILITIES -- Across Option Expiration Times"
      [,1]     [,2]
 [1,]  0.25  22.600000
 [2,]  0.50  28.145216
 [3,]  0.75  34.014236
 [4,]  1.00  31.536027
 [5,]  1.25  29.286380
 [6,]  1.50  27.244215
 [7,]  1.75  25.390397
 [8,]  2.00  23.707555
 [9,]  2.25  22.179919
[10,]  2.50  20.793176
[11,]  2.75  19.534330
[12,]  3.00  18.391586
[13,]  3.25  17.354236
[14,]  3.50  16.412560
[15,]  3.75  15.557734
[16,]  4.00  14.781747
[17,]  4.25  14.077328
[18,]  4.50  13.437878
[19,]  4.75  12.857403
[20,]  5.00  12.330464
[21,]  5.25  11.852125
[22,]  5.50  11.417902
[23,]  5.75  11.023727
[24,]  6.00  10.665907
[25,]  6.25  10.341088
[26,]  6.50  10.046226
[27,]  6.75   9.778559
[28,]  7.00   9.535579
[29,]  7.25   9.315009
[30,]  7.50   9.114782
[31,]  7.75   8.933021
[32,]  8.00   8.768024
[33,]  8.25   8.618244
[34,]  8.50   8.482279
[35,]  8.75   8.358853
[36,]  9.00   8.246811
[37,]  9.25   8.145102
[38,]  9.50   8.052774
[39,]  9.75   7.968961
[40,] 10.00   7.892878
```

- 65 -

APPENDIX

[1] "Here are the HISTORICAL FORWARD PRICE SINGLE PERIOD VOLATILITIES --
Across Forward Price Expiration Times"

```
          [,1]   [,2]
 [1,]    0.25  5.650000
 [2,]    0.50  7.036304
 [3,]    0.75  8.503559
 [4,]    1.00  7.884007
 [5,]    1.25  7.321595
 [6,]    1.50  6.811054
 [7,]    1.75  6.347599
 [8,]    2.00  5.926889
 [9,]    2.25  5.544980
[10,]    2.50  5.198294
[11,]    2.75  4.883583
[12,]    3.00  4.597897
[13,]    3.25  4.338559
[14,]    3.50  4.103140
[15,]    3.75  3.889433
[16,]    4.00  3.695437
[17,]    4.25  3.519332
[18,]    4.50  3.359469
[19,]    4.75  3.214351
[20,]    5.00  3.082616
[21,]    5.25  2.963031
[22,]    5.50  2.854475
[23,]    5.75  2.755932
[24,]    6.00  2.666477
[25,]    6.25  2.585272
[26,]    6.50  2.511557
[27,]    6.75  2.444640
[28,]    7.00  2.383895
[29,]    7.25  2.328752
[30,]    7.50  2.278695
[31,]    7.75  2.233255
[32,]    8.00  2.192006
[33,]    8.25  2.154561
[34,]    8.50  2.120570
[35,]    8.75  2.089713
[36,]    9.00  2.061703
[37,]    9.25  2.036275
[38,]    9.50  2.013193
[39,]    9.75  1.992240
[40,]   10.00  1.973219
```

[1] "Here are the FORWARD PRICE SINGLE PERIOD CORRELATIONS --
Across Option Expiration Times"

```
          [,1]       [,2]       [,3]       [,4]       [,5]       [,6]       [,7]
 [1,] 1.0000000  0.9935897  0.9871795  0.9807692  0.9743590  0.9679487  0.9615385
 [2,] 0.9935897  1.0000000  0.9935897  0.9871795  0.9807692  0.9743590  0.9679487
 [3,] 0.9871795  0.9935897  1.0000000  0.9935897  0.9871795  0.9807692  0.9743590
 [4,] 0.9807692  0.9871795  0.9935897  1.0000000  0.9935897  0.9871795  0.9807692
 [5,] 0.9743590  0.9807692  0.9871795  0.9935897  1.0000000  0.9935897  0.9871795
 [6,] 0.9679487  0.9743590  0.9807692  0.9871795  0.9935897  1.0000000  0.9935897
 [7,] 0.9615385  0.9679487  0.9743590  0.9807692  0.9871795  0.9935897  1.0000000
 [8,] 0.9551282  0.9615385  0.9679487  0.9743590  0.9807692  0.9871795  0.9935897
 [9,] 0.9487179  0.9551282  0.9615385  0.9679487  0.9743590  0.9807692  0.9871795
[10,] 0.9423077  0.9487179  0.9551282  0.9615385  0.9679487  0.9743590  0.9807692
[11,] 0.9358974  0.9423077  0.9487179  0.9551282  0.9615385  0.9679487  0.9743590
[12,] 0.9294872  0.9358974  0.9423077  0.9487179  0.9551282  0.9615385  0.9679487
[13,] 0.9230769  0.9294872  0.9358974  0.9423077  0.9487179  0.9551282  0.9615385
[14,] 0.9166667  0.9230769  0.9294872  0.9358974  0.9423077  0.9487179  0.9551282
[15,] 0.9102564  0.9166667  0.9230769  0.9294872  0.9358974  0.9423077  0.9487179
[16,] 0.9038462  0.9102564  0.9166667  0.9230769  0.9294872  0.9358974  0.9423077
[17,] 0.8974359  0.9038462  0.9102564  0.9166667  0.9230769  0.9294872  0.9358974
[18,] 0.8910256  0.8974359  0.9038462  0.9102564  0.9166667  0.9230769  0.9294872
[19,] 0.8846154  0.8910256  0.8974359  0.9038462  0.9102564  0.9166667  0.9230769
[20,] 0.8782051  0.8846154  0.8910256  0.8974359  0.9038462  0.9102564  0.9166667
[21,] 0.8717949  0.8782051  0.8846154  0.8910256  0.8974359  0.9038462  0.9102564
[22,] 0.8653846  0.8717949  0.8782051  0.8846154  0.8910256  0.8974359  0.9038462
[23,] 0.8589744  0.8653846  0.8717949  0.8782051  0.8846154  0.8910256  0.8974359
[24,] 0.8525641  0.8589744  0.8653846  0.8717949  0.8782051  0.8846154  0.8910256
[25,] 0.8461538  0.8525641  0.8589744  0.8653846  0.8717949  0.8782051  0.8846154
[26,] 0.8397436  0.8461538  0.8525641  0.8589744  0.8653846  0.8717949  0.878 2051
[27,] 0.8333333  0.8397436  0.8461538  0.8525641  0.8589744  0.8653846  0.8717949
[28,] 0.8269231  0.8333333  0.8397436  0.8461538  0.8525641  0.8589744  0.8653846
[29,] 0.8205128  0.8269231  0.8333333  0.8397436  0.8461538  0.8525641  0.8589744
[30,] 0.8141026  0.8205128  0.8269231  0.8333333  0.8397436  0.8461538  0.8525641
[31,] 0.8076923  0.8141026  0.8205128  0.8269231  0.8333333  0.8397436  0.8461538
[32,] 0.8012821  0.8076923  0.8141026  0.8205128  0.8269231  0.8333333  0.8397436
[33,] 0.7948718  0.8012821  0.8076923  0.8141026  0.8205128  0.8269231  0.8333333
[34,] 0.7884615  0.7948718  0.8012821  0.8076923  0.8141026  0.8205128  0.8269231
[35,] 0.7820513  0.7884615  0.7948718  0.8012821  0.8076923  0.8141026  0.8205128
[36,] 0.7756410  0.7820513  0.7884615  0.7948718  0.8012821  0.8076923  0.8141026
[37,] 0.7692308  0.7756410  0.7820513  0.7884615  0.7948718  0.8012821  0.8076923
[38,] 0.7628205  0.7692308  0.7756410  0.7820513  0.7884615  0.7948718  0.8012821
[39,] 0.7564103  0.7628205  0.7692308  0.7756410  0.7820513  0.7884615  0.7948718
[40,] 0.7500000  0.7564103  0.7628205  0.7692308  0.7756410  0.7820513  0.7884615
```

APPENDIX

|  | [,8] | [,9] | [,10] | [,11] | [,12] | [,13] | [,14] |
|---|---|---|---|---|---|---|---|
| [1,] | 0.9551282 | 0.9487179 | 0.9423077 | 0.9358974 | 0.9294872 | 0.9230769 | 0.9166667 |
| [2,] | 0.9615385 | 0.9551282 | 0.9487179 | 0.9423077 | 0.9358974 | 0.9294872 | 0.9230769 |
| [3,] | 0.9679487 | 0.9615385 | 0.9551282 | 0.9487179 | 0.9423077 | 0.9358974 | 0.9294872 |
| [4,] | 0.9743590 | 0.9679487 | 0.9615385 | 0.9551282 | 0.9487179 | 0.9423077 | 0.9358974 |
| [5,] | 0.9807692 | 0.9743590 | 0.9679487 | 0.9615385 | 0.9551282 | 0.9487179 | 0.9423077 |
| [6,] | 0.9871795 | 0.9807692 | 0.9743590 | 0.9679487 | 0.9615385 | 0.9551282 | 0.9487179 |
| [7,] | 0.9935897 | 0.9871795 | 0.9807692 | 0.9743590 | 0.9679487 | 0.9615385 | 0.9551282 |
| [8,] | 1.0000000 | 0.9935897 | 0.9871795 | 0.9807692 | 0.9743590 | 0.9679487 | 0.9615385 |
| [9,] | 0.9935897 | 1.0000000 | 0.9935897 | 0.9871795 | 0.9807692 | 0.9743590 | 0.9679487 |
| [10,] | 0.9871795 | 0.9935897 | 1.0000000 | 0.9935897 | 0.9871795 | 0.9807692 | 0.9743590 |
| [11,] | 0.9807692 | 0.9871795 | 0.9935897 | 1.0000000 | 0.9935897 | 0.9871795 | 0.9807692 |
| [12,] | 0.9743590 | 0.9807692 | 0.9871795 | 0.9935897 | 1.0000000 | 0.9935897 | 0.9871795 |
| [13,] | 0.9679487 | 0.9743590 | 0.9807692 | 0.9871795 | 0.9935897 | 1.0000000 | 0.9935897 |
| [14,] | 0.9615385 | 0.9679487 | 0.9743590 | 0.9807692 | 0.9871795 | 0.9935897 | 1.0000000 |
| [15,] | 0.9551282 | 0.9615385 | 0.9679487 | 0.9743590 | 0.9807692 | 0.9871795 | 0.9935897 |
| [16,] | 0.9487179 | 0.9551282 | 0.9615385 | 0.9679487 | 0.9743590 | 0.9807692 | 0.9871795 |
| [17,] | 0.9423077 | 0.9487179 | 0.9551282 | 0.9615385 | 0.9679487 | 0.9743590 | 0.9807692 |
| [18,] | 0.9358974 | 0.9423077 | 0.9487179 | 0.9551282 | 0.9615385 | 0.9679487 | 0.9743590 |
| [19,] | 0.9294872 | 0.9358974 | 0.9423077 | 0.9487179 | 0.9551282 | 0.9615385 | 0.9679487 |
| [20,] | 0.9230769 | 0.9294872 | 0.9358974 | 0.9423077 | 0.9487179 | 0.9551282 | 0.9615385 |
| [21,] | 0.9166667 | 0.9230769 | 0.9294872 | 0.9358974 | 0.9423077 | 0.9487179 | 0.9551282 |
| [22,] | 0.9102564 | 0.9166667 | 0.9230769 | 0.9294872 | 0.9358974 | 0.9423077 | 0.9487179 |
| [23,] | 0.9038462 | 0.9102564 | 0.9166667 | 0.9230769 | 0.9294872 | 0.9358974 | 0.9423077 |
| [24,] | 0.8974359 | 0.9038462 | 0.9102564 | 0.9166667 | 0.9230769 | 0.9294872 | 0.9358974 |
| [25,] | 0.8910256 | 0.8974359 | 0.9038462 | 0.9102564 | 0.9166667 | 0.9230769 | 0.9294872 |
| [26,] | 0.8846154 | 0.8910256 | 0.8974359 | 0.9038462 | 0.9102564 | 0.9166667 | 0.9230769 |
| [27,] | 0.8782051 | 0.8846154 | 0.8910256 | 0.8974359 | 0.9038462 | 0.9102564 | 0.9166667 |
| [28,] | 0.8717949 | 0.8782051 | 0.8846154 | 0.8910256 | 0.8974359 | 0.9038462 | 0.9102564 |
| [29,] | 0.8653846 | 0.8717949 | 0.8782051 | 0.8846154 | 0.8910256 | 0.8974359 | 0.9038462 |
| [30,] | 0.8589744 | 0.8653846 | 0.8717949 | 0.8782051 | 0.8846154 | 0.8910256 | 0.8974359 |
| [31,] | 0.8525641 | 0.8589744 | 0.8653846 | 0.8717949 | 0.8782051 | 0.8846154 | 0.8910256 |
| [32,] | 0.8461538 | 0.8525641 | 0.8589744 | 0.8653846 | 0.8717949 | 0.8782051 | 0.8846154 |
| [33,] | 0.8397436 | 0.8461538 | 0.8525641 | 0.8589744 | 0.8653846 | 0.8717949 | 0.8782051 |
| [34,] | 0.8333333 | 0.8397436 | 0.8461538 | 0.8525641 | 0.8589744 | 0.8653846 | 0.8717949 |
| [35,] | 0.8269231 | 0.8333333 | 0.8397436 | 0.8461538 | 0.8525641 | 0.8589744 | 0.8653846 |
| [36,] | 0.8205128 | 0.8269231 | 0.8333333 | 0.8397436 | 0.8461538 | 0.8525641 | 0.8589744 |
| [37,] | 0.8141026 | 0.8205128 | 0.8269231 | 0.8333333 | 0.8397436 | 0.8461538 | 0.8525641 |
| [38,] | 0.8076923 | 0.8141026 | 0.8205128 | 0.8269231 | 0.8333333 | 0.8397436 | 0.8461538 |
| [39,] | 0.8012821 | 0.8076923 | 0.8141026 | 0.8205128 | 0.8269231 | 0.8333333 | 0.8397436 |
| [40,] | 0.7948718 | 0.8012821 | 0.8076923 | 0.8141026 | 0.8205128 | 0.8269231 | 0.8333333 |

|  | [,15] | [,16] | [,17] | [,18] | [,19] | [,20] | [,21] |
|---|---|---|---|---|---|---|---|
| [1,] | 0.9102564 | 0.9038462 | 0.8974359 | 0.8910256 | 0.8846154 | 0.8782051 | 0.8717949 |
| [2,] | 0.9166667 | 0.9102564 | 0.9038462 | 0.8974359 | 0.8910256 | 0.8846154 | 0.8782051 |
| [3,] | 0.9230769 | 0.9166667 | 0.9102564 | 0.9038462 | 0.8974359 | 0.8910256 | 0.8846154 |
| [4,] | 0.9294872 | 0.9230769 | 0.9166667 | 0.9102564 | 0.9038462 | 0.8974359 | 0.8910256 |
| [5,] | 0.9358974 | 0.9294872 | 0.9230769 | 0.9166667 | 0.9102564 | 0.9038462 | 0.8974359 |
| [6,] | 0.9423077 | 0.9358974 | 0.9294872 | 0.9230769 | 0.9166667 | 0.9102564 | 0.9038462 |
| [7,] | 0.9487179 | 0.9423077 | 0.9358974 | 0.9294872 | 0.9230769 | 0.9166667 | 0.9102564 |
| [8,] | 0.9551282 | 0.9487179 | 0.9423077 | 0.9358974 | 0.9294872 | 0.9230769 | 0.9166667 |
| [9,] | 0.9615385 | 0.9551282 | 0.9487179 | 0.9423077 | 0.9358974 | 0.9294872 | 0.9230769 |
| [10,] | 0.9679487 | 0.9615385 | 0.9551282 | 0.9487179 | 0.9423077 | 0.9358974 | 0.9294872 |
| [11,] | 0.9743590 | 0.9679487 | 0.9615385 | 0.9551282 | 0.9487179 | 0.9423077 | 0.9358974 |
| [12,] | 0.9807692 | 0.9743590 | 0.9679487 | 0.9615385 | 0.9551282 | 0.9487179 | 0.9423077 |
| [13,] | 0.9871795 | 0.9807692 | 0.9743590 | 0.9679487 | 0.9615385 | 0.9551282 | 0.9487179 |
| [14,] | 0.9935897 | 0.9871795 | 0.9807692 | 0.9743590 | 0.9679487 | 0.9615385 | 0.9551282 |
| [15,] | 1.0000000 | 0.9935897 | 0.9871795 | 0.9807692 | 0.9743590 | 0.9679487 | 0.9615385 |
| [16,] | 0.9935897 | 1.0000000 | 0.9935897 | 0.9871795 | 0.9807692 | 0.9743590 | 0.9679487 |
| [17,] | 0.9871795 | 0.9935897 | 1.0000000 | 0.9935897 | 0.9871795 | 0.9807692 | 0.9743590 |
| [18,] | 0.9807692 | 0.9871795 | 0.9935897 | 1.0000000 | 0.9935897 | 0.9871795 | 0.9807692 |
| [19,] | 0.9743590 | 0.9807692 | 0.9871795 | 0.9935897 | 1.0000000 | 0.9935897 | 0.9871795 |
| [20,] | 0.9679487 | 0.9743590 | 0.9807692 | 0.9871795 | 0.9935897 | 1.0000000 | 0.9935897 |
| [21,] | 0.9615385 | 0.9679487 | 0.9743590 | 0.9807692 | 0.9871795 | 0.9935897 | 1.0000000 |
| [22,] | 0.9551282 | 0.9615385 | 0.9679487 | 0.9743590 | 0.9807692 | 0.9871795 | 0.9935897 |
| [23,] | 0.9487179 | 0.9551282 | 0.9615385 | 0.9679487 | 0.9743590 | 0.9807692 | 0.9871795 |
| [24,] | 0.9423077 | 0.9487179 | 0.9551282 | 0.9615385 | 0.9679487 | 0.9743590 | 0.9807692 |
| [25,] | 0.9358974 | 0.9423077 | 0.9487179 | 0.9551282 | 0.9615385 | 0.9679487 | 0.9743590 |
| [26,] | 0.9294872 | 0.9358974 | 0.9423077 | 0.9487179 | 0.9551282 | 0.9615385 | 0.9679487 |
| [27,] | 0.9230769 | 0.9294872 | 0.9358974 | 0.9423077 | 0.9487179 | 0.9551282 | 0.9615385 |
| [28,] | 0.9166667 | 0.9230769 | 0.9294872 | 0.9358974 | 0.9423077 | 0.9487179 | 0.9551282 |
| [29,] | 0.9102564 | 0.9166667 | 0.9230769 | 0.9294872 | 0.9358974 | 0.9423077 | 0.9487179 |
| [30,] | 0.9038462 | 0.9102564 | 0.9166667 | 0.9230769 | 0.9294872 | 0.9358974 | 0.9423077 |
| [31,] | 0.8974359 | 0.9038462 | 0.9102564 | 0.9166667 | 0.9230769 | 0.9294872 | 0.9358974 |
| [32,] | 0.8910256 | 0.8974359 | 0.9038462 | 0.9102564 | 0.9166667 | 0.9230769 | 0.9294872 |
| [33,] | 0.8846154 | 0.8910256 | 0.8974359 | 0.9038462 | 0.9102564 | 0.9166667 | 0.9230769 |
| [34,] | 0.8782051 | 0.8846154 | 0.8910256 | 0.8974359 | 0.9038462 | 0.9102564 | 0.9166667 |
| [35,] | 0.8717949 | 0.8782051 | 0.8846154 | 0.8910256 | 0.8974359 | 0.9038462 | 0.9102564 |
| [36,] | 0.8653846 | 0.8717949 | 0.8782051 | 0.8846154 | 0.8910256 | 0.8974359 | 0.9038462 |
| [37,] | 0.8589744 | 0.8653846 | 0.8717949 | 0.8782051 | 0.8846154 | 0.8910256 | 0.8974359 |
| [38,] | 0.8525641 | 0.8589744 | 0.8653846 | 0.8717949 | 0.8782051 | 0.8846154 | 0.8910256 |
| [39,] | 0.8461538 | 0.8525641 | 0.8589744 | 0.8653846 | 0.8717949 | 0.8782051 | 0.8846154 |
| [40,] | 0.8397436 | 0.8461538 | 0.8525641 | 0.8589744 | 0.8653846 | 0.8717949 | 0.8782051 |

|  | [,22] | [,23] | [,24] | [,25] | [,26] | [,27] | [,28] |
|---|---|---|---|---|---|---|---|
| [1,] | 0.8653846 | 0.8589744 | 0.8525641 | 0.8461538 | 0.8397436 | 0.8333333 | 0.8269231 |
| [2,] | 0.8717949 | 0.8653846 | 0.8589744 | 0.8525641 | 0.8461538 | 0.8397436 | 0.8333333 |
| [3,] | 0.8782051 | 0.8717949 | 0.8653846 | 0.8589744 | 0.8525641 | 0.8461538 | 0.8397436 |
| [4,] | 0.8846154 | 0.8782051 | 0.8717949 | 0.8653846 | 0.8589744 | 0.8525641 | 0.8461538 |
| [5,] | 0.8910256 | 0.8846154 | 0.8782051 | 0.8717949 | 0.8653846 | 0.8589744 | 0.8525641 |
| [6,] | 0.8974359 | 0.8910256 | 0.8846154 | 0.8782051 | 0.8717949 | 0.8653846 | 0.8589744 |

- 67 -

APPENDIX

```
          [,29]     [,30]     [,31]     [,32]     [,33]     [,34]     [,35]
 [7,]  0.9038462 0.8974359 0.8910256 0.8846154 0.8782051 0.8717949 0.8653846
 [8,]  0.9102564 0.9038462 0.8974359 0.8910256 0.8846154 0.8782051 0.8717949
 [9,]  0.9166667 0.9102564 0.9038462 0.8974359 0.8910256 0.8846154 0.8782051
[10,]  0.9230769 0.9166667 0.9102564 0.9038462 0.8974359 0.8910256 0.8846154
[11,]  0.9294872 0.9230769 0.9166667 0.9102564 0.9038462 0.8974359 0.8910256
[12,]  0.9358974 0.9294872 0.9230769 0.9166667 0.9102564 0.9038462 0.8974359
[13,]  0.9423077 0.9358974 0.9294872 0.9230769 0.9166667 0.9102564 0.9038462
[14,]  0.9487179 0.9423077 0.9358974 0.9294872 0.9230769 0.9166667 0.9102564
[15,]  0.9551282 0.9487179 0.9423077 0.9358974 0.9294872 0.9230769 0.9166667
[16,]  0.9615385 0.9551282 0.9487179 0.9423077 0.9358974 0.9294872 0.9230769
[17,]  0.9679487 0.9615385 0.9551282 0.9487179 0.9423077 0.9358974 0.9294872
[18,]  0.9743590 0.9679487 0.9615385 0.9551282 0.9487179 0.9423077 0.9358974
[19,]  0.9807692 0.9743590 0.9679487 0.9615385 0.9551282 0.9487179 0.9423077
[20,]  0.9871795 0.9807692 0.9743590 0.9679487 0.9615385 0.9551282 0.9487179
[21,]  0.9935897 0.9871795 0.9807692 0.9743590 0.9679487 0.9615385 0.9551282
[22,]  1.0000000 0.9935897 0.9871795 0.9807692 0.9743590 0.9679487 0.9615385
[23,]  0.9935897 1.0000000 0.9935897 0.9871795 0.9807692 0.9743590 0.9679487
[24,]  0.9871795 0.9935897 1.0000000 0.9935897 0.9871795 0.9807692 0.9743590
[25,]  0.9807692 0.9871795 0.9935897 1.0000000 0.9935897 0.9871795 0.9807692
[26,]  0.9743590 0.9807692 0.9871795 0.9935897 1.0000000 0.9935897 0.9871795
[27,]  0.9679487 0.9743590 0.9807692 0.9871795 0.9935897 1.0000000 0.9935897
[28,]  0.9615385 0.9679487 0.9743590 0.9807692 0.9871795 0.9935897 1.0000000
[29,]  0.9551282 0.9615385 0.9679487 0.9743590 0.9807692 0.9871795 0.9935897
[30,]  0.9487179 0.9551282 0.9615385 0.9679487 0.9743590 0.9807692 0.9871795
[31,]  0.9423077 0.9487179 0.9551282 0.9615385 0.9679487 0.9743590 0.9807692
[32,]  0.9358974 0.9423077 0.9487179 0.9551282 0.9615385 0.9679487 0.9743590
[33,]  0.9294872 0.9358974 0.9423077 0.9487179 0.9551282 0.9615385 0.9679487
[34,]  0.9230769 0.9294872 0.9358974 0.9423077 0.9487179 0.9551282 0.9615385
[35,]  0.9166667 0.9230769 0.9294872 0.9358974 0.9423077 0.9487179 0.9551282
[36,]  0.9102564 0.9166667 0.9230769 0.9294872 0.9358974 0.9423077 0.9487179
[37,]  0.9038462 0.9102564 0.9166667 0.9230769 0.9294872 0.9358974 0.9423077
[38,]  0.8974359 0.9038462 0.9102564 0.9166667 0.9230769 0.9294872 0.9358974
[39,]  0.8910256 0.8974359 0.9038462 0.9102564 0.9166667 0.9230769 0.9294872
[40,]  0.8846154 0.8910256 0.8974359 0.9038462 0.9102564 0.9166667 0.9230769
          [,29]     [,30]     [,31]     [,32]     [,33]     [,34]     [,35]
 [1,]  0.8205128 0.8141026 0.8076923 0.8012821 0.7948718 0.7884615 0.7820513
 [2,]  0.8269231 0.8205128 0.8141026 0.8076923 0.8012821 0.7948718 0.7884615
 [3,]  0.8333333 0.8269231 0.8205128 0.8141026 0.8076923 0.8012821 0.7948718
 [4,]  0.8397436 0.8333333 0.8269231 0.8205128 0.8141026 0.8076923 0.8012821
 [5,]  0.8461538 0.8397436 0.8333333 0.8269231 0.8205128 0.8141026 0.8076923
 [6,]  0.8525641 0.8461538 0.8397436 0.8333333 0.8269231 0.8205128 0.8141026
 [7,]  0.8589744 0.8525641 0.8461538 0.8397436 0.8333333 0.8269231 0.8205128
 [8,]  0.8653846 0.8589744 0.8525641 0.8461538 0.8397436 0.8333333 0.8269231
 [9,]  0.8717949 0.8653846 0.8589744 0.8525641 0.8461538 0.8397436 0.8333333
[10,]  0.8782051 0.8717949 0.8653846 0.8589744 0.8525641 0.8461538 0.8397436
[11,]  0.8846154 0.8782051 0.8717949 0.8653846 0.8589744 0.8525641 0.8461538
[12,]  0.8910256 0.8846154 0.8782051 0.8717949 0.8653846 0.8589744 0.8525641
[13,]  0.8974359 0.8910256 0.8846154 0.8782051 0.8717949 0.8653846 0.8589744
[14,]  0.9038462 0.8974359 0.8910256 0.8846154 0.8782051 0.8717949 0.8653846
[15,]  0.9102564 0.9038462 0.8974359 0.8910256 0.8846154 0.8782051 0.8717949
[16,]  0.9166667 0.9102564 0.9038462 0.8974359 0.8910256 0.8846154 0.8782051
[17,]  0.9230769 0.9166667 0.9102564 0.9038462 0.8974359 0.8910256 0.8846154
[18,]  0.9294872 0.9230769 0.9166667 0.9102564 0.9038462 0.8974359 0.8910256
[19,]  0.9358974 0.9294872 0.9230769 0.9166667 0.9102564 0.9038462 0.8974359
[20,]  0.9423077 0.9358974 0.9294872 0.9230769 0.9166667 0.9102564 0.9038462
[21,]  0.9487179 0.9423077 0.9358974 0.9294872 0.9230769 0.9166667 0.9102564
[22,]  0.9551282 0.9487179 0.9423077 0.9358974 0.9294872 0.9230769 0.9166667
[23,]  0.9615385 0.9551282 0.9487179 0.9423077 0.9358974 0.9294872 0.9230769
[24,]  0.9679487 0.9615385 0.9551282 0.9487179 0.9423077 0.9358974 0.9294872
[25,]  0.9743590 0.9679487 0.9615385 0.9551282 0.9487179 0.9423077 0.9358974
[26,]  0.9807692 0.9743590 0.9679487 0.9615385 0.9551282 0.9487179 0.9423077
[27,]  0.9871795 0.9807692 0.9743590 0.9679487 0.9615385 0.9551282 0.9487179
[28,]  0.9935897 0.9871795 0.9807692 0.9743590 0.9679487 0.9615385 0.9551282
[29,]  1.0000000 0.9935897 0.9871795 0.9807692 0.9743590 0.9679487 0.9615385
[30,]  0.9935897 1.0000000 0.9935897 0.9871795 0.9807692 0.9743590 0.9679487
[31,]  0.9871795 0.9935897 1.0000000 0.9935897 0.9871795 0.9807692 0.9743590
[32,]  0.9807692 0.9871795 0.9935897 1.0000000 0.9935897 0.9871795 0.9807692
[33,]  0.9743590 0.9807692 0.9871795 0.9935897 1.0000000 0.9935897 0.9871795
[34,]  0.9679487 0.9743590 0.9807692 0.9871795 0.9935897 1.0000000 0.9935897
[35,]  0.9615385 0.9679487 0.9743590 0.9807692 0.9871795 0.9935897 1.0000000
[36,]  0.9551282 0.9615385 0.9679487 0.9743590 0.9807692 0.9871795 0.9935897
[37,]  0.9487179 0.9551282 0.9615385 0.9679487 0.9743590 0.9807692 0.9871795
[38,]  0.9423077 0.9487179 0.9551282 0.9615385 0.9679487 0.9743590 0.9807692
[39,]  0.9358974 0.9423077 0.9487179 0.9551282 0.9615385 0.9679487 0.9743590
[40,]  0.9294872 0.9358974 0.9423077 0.9487179 0.9551282 0.9615385 0.9679487
          [,36]     [,37]     [,38]     [,39]     [,40]
 [1,]  0.7756410 0.7692308 0.7628205 0.7564103 0.7500000
 [2,]  0.7820513 0.7756410 0.7692308 0.7628205 0.7564103
 [3,]  0.7884615 0.7820513 0.7756410 0.7692308 0.7628205
 [4,]  0.7948718 0.7884615 0.7820513 0.7756410 0.7692308
 [5,]  0.8012821 0.7948718 0.7884615 0.7820513 0.7756410
 [6,]  0.8076923 0.8012821 0.7948718 0.7884615 0.7820513
 [7,]  0.8141026 0.8076923 0.8012821 0.7948718 0.7884615
 [8,]  0.8205128 0.8141026 0.8076923 0.8012821 0.7948718
 [9,]  0.8269231 0.8205128 0.8141026 0.8076923 0.8012821
[10,]  0.8333333 0.8269231 0.8205128 0.8141026 0.8076923
```

- 68 -

APPENDIX

```
[11,] 0.8397436 0.8333333 0.8269231 0.8205128 0.8141026
[12,] 0.8461538 0.8397436 0.8333333 0.8269231 0.8205128
[13,] 0.8525641 0.8461538 0.8397436 0.8333333 0.8269231
[14,] 0.8589744 0.8525641 0.8461538 0.8397436 0.8333333
[15,] 0.8653846 0.8589744 0.8525641 0.8461538 0.8397436
[16,] 0.8717949 0.8653846 0.8589744 0.8525641 0.8461538
[17,] 0.8782051 0.8717949 0.8653846 0.8589744 0.8525641
[18,] 0.8846154 0.8782051 0.8717949 0.8653846 0.8589744
[19,] 0.8910256 0.8846154 0.8782051 0.8717949 0.8653846
[20,] 0.8974359 0.8910256 0.8846154 0.8782051 0.8717949
[21,] 0.9038462 0.8974359 0.8910256 0.8846154 0.8782051
[22,] 0.9102564 0.9038462 0.8974359 0.8910256 0.8846154
[23,] 0.9166667 0.9102564 0.9038462 0.8974359 0.8910256
[24,] 0.9230769 0.9166667 0.9102564 0.9038462 0.8974359
[25,] 0.9294872 0.9230769 0.9166667 0.9102564 0.9038462
[26,] 0.9358974 0.9294872 0.9230769 0.9166667 0.9102564
[27,] 0.9423077 0.9358974 0.9294872 0.9230769 0.9166667
[28,] 0.9487179 0.9423077 0.9358974 0.9294872 0.9230769
[29,] 0.9551282 0.9487179 0.9423077 0.9358974 0.9294872
[30,] 0.9615385 0.9551282 0.9487179 0.9423077 0.9358974
[31,] 0.9679487 0.9615385 0.9551282 0.9487179 0.9423077
[32,] 0.9743590 0.9679487 0.9615385 0.9551282 0.9487179
[33,] 0.9807692 0.9743590 0.9679487 0.9615385 0.9551282
[34,] 0.9871795 0.9807692 0.9743590 0.9679487 0.9615385
[35,] 0.9935897 0.9871795 0.9807692 0.9743590 0.9679487
[36,] 1.0000000 0.9935897 0.9871795 0.9807692 0.9743590
[37,] 0.9935897 1.0000000 0.9935897 0.9871795 0.9807692
[38,] 0.9871795 0.9935897 1.0000000 0.9935897 0.9871795
[39,] 0.9807692 0.9871795 0.9935897 1.0000000 0.9935897
[40,] 0.9743590 0.9807692 0.9871795 0.9935897 1.0000000
```

[1] "I WILL NOW DECOMPOSE THE INPUT VOLATILITY INFORMATION INTO THE DISCRETE VOLATILITY MATRIX"
[1] "Do you want to...."
[1] "   1) use the default mean-reverting volatility model, or"
[1] "   2) provide your own mean-reverting volatility model?"
1: 1

[1] "Please give me the mean-reverting parameter value..."
1: 0.5

[1] "HERE IS THE DISCRETE VOLATILITY MATRIX"

```
          [,1]       [,2]       [,3]       [,4]       [,5]       [,6]       [,7]
 [1,] 22.600000  33.612665  45.422360  29.949225  27.430722  25.244065  23.353835
 [2,] 21.318891  31.668162  42.769804  28.264194  25.890709  23.829257  22.046534
 [3,] 20.120674  29.847100  40.284111  26.688936  24.451215  22.506939  20.824787
 [4,] 19.000589  28.142305  37.955516  25.217169  23.106496  21.271829  19.683710
 [5,] 17.954167  26.547046  35.774858  23.842996  21.851153  20.118963  18.618713
 [6,] 16.977213  25.055007  33.733543  22.560873  20.680116  19.043677  17.625484
 [7,] 16.065781  23.660261  31.823510  21.365590  19.588614  18.041585  16.699967
 [8,] 15.216165  22.357243  30.037192  20.252243  18.572159  17.108556  15.838340
 [9,] 14.424873  21.140727  28.367489  19.216211  17.626519  16.240697  15.037003
[10,] 13.688618  20.005804  26.807736  18.253136  16.747701  15.434333  14.292554
[11,] 13.004297  18.947854  25.351672  17.358898  15.931931  14.685987  13.601777
[12,] 12.368977  17.962534  23.993413  16.529600  15.175634  13.992369  12.961625
[13,] 11.779881  17.045746  22.727427  15.761545  14.475419  13.350352  12.369204
[14,] 11.234376  16.193628  21.548505  15.051217  13.828061  12.756964  11.821759
[15,] 10.729957  15.402528  20.451739  14.395270  13.230485  12.209368  11.316665
[16,] 10.264239  14.668988  19.432496  13.790506  12.679754  11.704857  10.851409
[17,]  9.834943  13.989729  18.486397  13.233868  12.173056  11.240833  10.423587
[18,]  9.439888  13.361632  17.609295  12.722422  11.707696  10.814809  10.030890
[19,]  9.076982  12.781727  16.797254  12.253354  11.281082  10.424392   9.671100
[20,]  8.744217  12.247174  16.046533  11.823955  10.890725  10.067281   9.342084
[21,]  8.439661  11.755260  15.353564  11.431623  10.534227   9.741263   9.041788
[22,]  8.161456  11.303378  14.714938  11.073850  10.209283   9.444210   8.768240
[23,]  7.907816  10.889029  14.127393  10.748230   9.913679   9.174075   8.519542
[24,]  7.677022  10.509806  13.587799  10.452448   9.645286   8.928896   8.293874
[25,]  7.467424  10.163396  13.093151  10.184289   9.402068   8.706794   8.089496
[26,]  7.277441   9.847574  12.640557   9.941632   9.182080   8.505973   7.904744
[27,]  7.105564   9.560200  12.227237   9.722459   8.983467   8.324726   7.738039
[28,]  6.950354   9.299219  11.850514   9.524852   8.804471   8.161433   7.587880
[29,]  6.810443   9.062663  11.507819   9.346994   8.643428   8.014565   7.452852
[30,]  6.684541   8.848652  11.196682   9.187175   8.498775   7.882682   7.331625
[31,]  6.571429   8.655393  10.914739   9.043790   8.369042   7.764434   7.222953
[32,]  6.469966   8.481186  10.659733   8.915338   8.252859   7.658565   7.125674
[33,]  6.379084   8.324421  10.429514   8.800422   8.148953   7.563905   7.038709
[34,]  6.297792   8.183583  10.222040   8.697748   8.056142   7.479373   6.961060
[35,]  6.225171   8.057248  10.035382   8.606121   7.973340   7.403972   6.891808
[36,]  6.160371   7.944090   9.867725   8.524443   7.899547   7.336787   6.830110
[37,]  6.102615   7.842872   9.717366   8.451706   7.833846   7.276981   6.775196
[38,]  6.051186   7.752450   9.582715   8.386992   7.775405   7.223791   6.726361
[39,]  6.005436   7.671767   9.462294   8.329465   7.723464   7.176524   6.682969
[40,]  5.964769   7.599854   9.354735   8.278365   7.677334   7.134551   6.644439
```

APPENDIX

|  | [,8] | [,9] | [,10] | [,11] | [,12] | [,13] | [,14] |
|---|---|---|---|---|---|---|---|
| [1,] | 21.727475 | 20.335001 | 19.148845 | 18.143644 | 17.296286 | 16.585797 | 15.993359 |
| [2,] | 20.511938 | 19.197295 | 18.076715 | 17.126387 | 16.324620 | 15.651730 | 15.090062 |
| [3,] | 19.375991 | 18.134080 | 17.074736 | 16.175608 | 15.416340 | 14.778461 | 14.245406 |
| [4,] | 18.315092 | 17.141103 | 16.138903 | 15.287510 | 14.567821 | 13.962509 | 13.456031 |
| [5,] | 17.324974 | 16.214370 | 15.265453 | 14.458524 | 13.775661 | 13.200607 | 12.718779 |
| [6,] | 16.401623 | 15.350127 | 14.450848 | 13.685299 | 13.036660 | 12.489682 | 12.030687 |
| [7,] | 15.541268 | 14.544841 | 13.691764 | 12.964680 | 12.347810 | 11.826850 | 11.388968 |
| [8,] | 14.740353 | 13.795187 | 12.985066 | 12.293699 | 11.706280 | 11.209392 | 10.791000 |
| [9,] | 13.995529 | 13.098028 | 12.327803 | 11.669558 | 11.109402 | 10.634751 | 10.234315 |
| [10,] | 13.303630 | 12.450404 | 11.717185 | 11.089615 | 10.554658 | 10.100512 | 9.716586 |
| [11,] | 12.661665 | 11.849512 | 11.150576 | 10.551372 | 10.039670 | 9.604395 | 9.235615 |
| [12,] | 12.066796 | 11.292700 | 10.625476 | 10.052464 | 9.562183 | 9.144243 | 8.789325 |
| [13,] | 11.516331 | 10.777445 | 10.139515 | 9.590646 | 9.120060 | 8.718008 | 8.375745 |
| [14,] | 11.007706 | 10.301349 | 9.690433 | 9.163780 | 8.711269 | 8.323748 | 7.993007 |
| [15,] | 10.538474 | 9.862123 | 9.276078 | 8.769831 | 8.333873 | 7.959609 | 7.639329 |
| [16,] | 10.106298 | 9.457578 | 8.894391 | 8.406852 | 7.986021 | 7.623824 | 7.313016 |
| [17,] | 9.708937 | 9.085619 | 8.543401 | 8.072979 | 7.665943 | 7.314702 | 7.012444 |
| [18,] | 9.344242 | 8.744233 | 8.221216 | 7.766423 | 7.371941 | 7.030622 | 6.736058 |
| [19,] | 9.010147 | 8.431488 | 7.926017 | 7.485468 | 7.102382 | 6.770028 | 6.482368 |
| [20,] | 8.704664 | 8.145522 | 7.656056 | 7.228461 | 6.855700 | 6.531424 | 6.249939 |
| [21,] | 8.425881 | 7.884548 | 7.409651 | 6.993812 | 6.630384 | 6.313371 | 6.037393 |
| [22,] | 8.171960 | 7.646845 | 7.185183 | 6.779993 | 6.424984 | 6.114484 | 5.843404 |
| [23,] | 7.941135 | 7.430759 | 6.981099 | 6.585535 | 6.238103 | 5.933431 | 5.666695 |
| [24,] | 7.731710 | 7.234705 | 6.795906 | 6.409026 | 6.068403 | 5.768935 | 5.506042 |
| [25,] | 7.542064 | 7.057164 | 6.628178 | 6.249119 | 5.914600 | 5.619769 | 5.360267 |
| [26,] | 7.370650 | 6.896691 | 6.476550 | 6.104522 | 5.775469 | 5.484762 | 5.228247 |
| [27,] | 7.215996 | 6.751906 | 6.339728 | 5.974009 | 5.649840 | 5.362797 | 5.108906 |
| [28,] | 7.076708 | 6.621504 | 6.216482 | 5.856417 | 5.536606 | 5.252811 | 5.001224 |
| [29,] | 6.951468 | 6.504254 | 6.105652 | 5.750645 | 5.434718 | 5.153799 | 4.904230 |
| [30,] | 6.839040 | 6.398996 | 6.006146 | 5.655659 | 5.343188 | 5.064814 | 4.817012 |
| [31,] | 6.738265 | 6.304648 | 5.916942 | 5.570489 | 5.261091 | 4.984966 | 4.738709 |
| [32,] | 6.648062 | 6.220196 | 5.837088 | 5.494230 | 5.187561 | 4.913422 | 4.668516 |
| [33,] | 6.567429 | 6.144705 | 5.765698 | 5.426041 | 5.121795 | 4.849408 | 4.605683 |
| [34,] | 6.495439 | 6.077304 | 5.701955 | 5.365145 | 5.063047 | 4.792206 | 4.549511 |
| [35,] | 6.431239 | 6.017197 | 5.645103 | 5.310824 | 5.010629 | 4.741152 | 4.499358 |
| [36,] | 6.374046 | 5.963649 | 5.594452 | 5.262421 | 4.963912 | 4.695636 | 4.454629 |
| [37,] | 6.323143 | 5.915990 | 5.549369 | 5.219332 | 4.922315 | 4.655099 | 4.414779 |
| [38,] | 6.277879 | 5.873611 | 5.509277 | 5.181009 | 4.885312 | 4.619029 | 4.379310 |
| [39,] | 6.237661 | 5.835955 | 5.473651 | 5.146951 | 4.852422 | 4.586963 | 4.347769 |
| [40,] | 6.201952 | 5.802521 | 5.442019 | 5.116708 | 4.823211 | 4.558476 | 4.319743 |

|  | [,15] | [,16] | [,17] | [,18] | [,19] | [,20] | [,21] |
|---|---|---|---|---|---|---|---|
| [1,] | 15.502256 | 15.097802 | 14.767273 | 14.499750 | 14.285854 | 14.117749 | 13.988847 |
| [2,] | 14.623924 | 14.239529 | 13.924925 | 13.669847 | 13.465474 | 13.304426 | 13.180498 |
| [3,] | 13.802449 | 13.436645 | 13.136766 | 12.893164 | 12.697539 | 12.542941 | 12.423521 |
| [4,] | 13.034566 | 12.685963 | 12.399675 | 12.166628 | 11.979015 | 11.830289 | 11.714931 |
| [5,] | 12.317212 | 11.984494 | 11.710720 | 11.487357 | 11.307057 | 11.163650 | 11.051930 |
| [6,] | 11.647507 | 11.329431 | 11.067151 | 10.852644 | 10.678992 | 10.540379 | 10.431891 |
| [7,] | 11.022748 | 10.718136 | 10.466384 | 10.259948 | 10.092312 | 9.957993 | 9.852349 |
| [8,] | 10.440392 | 10.148129 | 9.905991 | 9.706881 | 9.544661 | 9.414159 | 9.310989 |
| [9,] | 9.898045 | 9.617077 | 9.383687 | 9.191198 | 9.033826 | 8.906688 | 8.805638 |
| [10,] | 9.393451 | 9.122783 | 8.897324 | 8.710788 | 8.557723 | 8.433520 | 8.334254 |
| [11,] | 8.924481 | 8.663175 | 8.444875 | 8.263661 | 8.114393 | 7.992716 | 7.894914 |
| [12,] | 8.489123 | 8.236297 | 8.024427 | 7.847940 | 7.701988 | 7.582452 | 7.485811 |
| [13,] | 8.085473 | 7.840295 | 7.634173 | 7.461895 | 7.318765 | 7.201005 | 7.105239 |
| [14,] | 7.711723 | 7.473415 | 7.272400 | 7.103727 | 6.963073 | 6.846751 | 6.751591 |
| [15,] | 7.366155 | 7.133990 | 6.937484 | 6.771966 | 6.633353 | 6.518148 | 6.423344 |
| [16,] | 7.047130 | 6.820431 | 6.627878 | 6.465063 | 6.328122 | 6.213740 | 6.119058 |
| [17,] | 6.753085 | 6.531224 | 6.342110 | 6.181577 | 6.045969 | 5.932140 | 5.837366 |
| [18,] | 6.482521 | 6.264920 | 6.078772 | 5.920137 | 5.785552 | 5.672027 | 5.576967 |
| [19,] | 6.234002 | 6.020131 | 5.836515 | 5.679429 | 5.545586 | 5.432142 | 5.336623 |
| [20,] | 6.006150 | 5.795523 | 5.614048 | 5.458195 | 5.324842 | 5.211280 | 5.115147 |
| [21,] | 5.797637 | 5.589815 | 5.410128 | 5.255226 | 5.122139 | 5.008287 | 4.911407 |
| [22,] | 5.607189 | 5.401775 | 5.223561 | 5.069360 | 4.936346 | 4.822052 | 4.724314 |
| [23,] | 5.433576 | 5.230218 | 5.053198 | 4.899481 | 4.766372 | 4.651512 | 4.552823 |
| [24,] | 5.275620 | 5.074004 | 4.897933 | 4.744513 | 4.611169 | 4.495639 | 4.395930 |
| [25,] | 5.132188 | 4.932037 | 4.756704 | 4.603423 | 4.469729 | 4.353449 | 4.252666 |
| [26,] | 5.002195 | 4.803268 | 4.628492 | 4.475219 | 4.341082 | 4.223993 | 4.122103 |
| [27,] | 4.884603 | 4.686691 | 4.512320 | 4.358948 | 4.224298 | 4.106359 | 4.003345 |
| [28,] | 4.778425 | 4.581349 | 4.407256 | 4.253699 | 4.118487 | 3.999676 | 3.895536 |
| [29,] | 4.682725 | 4.486332 | 4.312412 | 4.158606 | 4.022798 | 3.903106 | 3.797854 |
| [30,] | 4.596614 | 4.400775 | 4.226945 | 4.072843 | 3.936421 | 3.815854 | 3.709514 |
| [31,] | 4.519260 | 4.323865 | 4.150058 | 3.995629 | 3.858588 | 3.737163 | 3.629768 |
| [32,] | 4.449877 | 4.254838 | 4.081003 | 3.926226 | 3.788572 | 3.666315 | 3.557908 |
| [33,] | 4.387737 | 4.192978 | 4.019077 | 3.863943 | 3.725691 | 3.602635 | 3.493265 |
| [34,] | 4.332157 | 4.137618 | 3.963624 | 3.808132 | 3.669303 | 3.545488 | 3.435207 |
| [35,] | 4.282510 | 4.088141 | 3.914034 | 3.758191 | 3.618812 | 3.494280 | 3.383143 |
| [36,] | 4.238212 | 4.043975 | 3.869743 | 3.713560 | 3.573660 | 3.448457 | 3.336522 |
| [37,] | 4.198732 | 4.004594 | 3.830231 | 3.673724 | 3.533335 | 3.407507 | 3.294832 |
| [38,] | 4.163580 | 3.969515 | 3.795020 | 3.638205 | 3.497362 | 3.370955 | 3.257597 |
| [39,] | 4.132310 | 3.938299 | 3.763673 | 3.606570 | 3.465306 | 3.338366 | 3.224380 |
| [40,] | 4.104517 | 3.910544 | 3.735791 | 3.578420 | 3.436768 | 3.309339 | 3.194780 |

APPENDIX

|  | [,22] | [,23] | [,24] | [,25] | [,26] | [,27] | [,28] |
|---|---|---|---|---|---|---|---|
| [1,] | 13.893561 | 13.827319 | 13.786263 | 13.767141 | 13.767260 | 13.784359 | 13.816486 |
| [2,] | 13.088419 | 13.023871 | 12.983210 | 12.963359 | 12.961767 | 12.976294 | 13.005086 |
| [3,] | 12.334304 | 12.271213 | 12.230799 | 12.210151 | 12.206851 | 12.218869 | 12.244446 |
| [4,] | 11.628248 | 11.566382 | 11.526071 | 11.504558 | 11.499548 | 11.509113 | 11.531583 |
| [5,] | 10.967463 | 10.906601 | 10.866253 | 10.843804 | 10.837077 | 10.844238 | 10.863697 |
| [6,] | 10.349337 | 10.289263 | 10.248740 | 10.225286 | 10.216830 | 10.221627 | 10.238162 |
| [7,] | 9.771417 | 9.711924 | 9.671091 | 9.646560 | 9.636359 | 9.638826 | 9.652516 |
| [8,] | 9.231400 | 9.172287 | 9.131013 | 9.105332 | 9.093368 | 9.093533 | 9.104446 |
| [9,] | 8.727124 | 8.668199 | 8.626354 | 8.599453 | 8.585703 | 8.583587 | 8.591785 |
| [10,] | 8.256558 | 8.197635 | 8.155095 | 8.126900 | 8.111340 | 8.106960 | 8.112496 |
| [11,] | 7.817794 | 7.758693 | 7.715337 | 7.685778 | 7.668380 | 7.661749 | 7.664671 |
| [12,] | 7.409033 | 7.349585 | 7.305295 | 7.274303 | 7.255039 | 7.246166 | 7.246514 |
| [13,] | 7.028585 | 6.968627 | 6.923292 | 6.890798 | 6.869640 | 6.858529 | 6.856341 |
| [14,] | 6.674852 | 6.614232 | 6.567745 | 6.533685 | 6.510603 | 6.497259 | 6.492567 |
| [15,] | 6.346328 | 6.284901 | 6.237163 | 6.201475 | 6.176442 | 6.160867 | 6.153701 |
| [16,] | 6.041586 | 5.979220 | 5.930138 | 5.892764 | 5.865754 | 5.847951 | 5.838337 |
| [17,] | 5.759273 | 5.695846 | 5.645336 | 5.606225 | 5.577216 | 5.557187 | 5.545153 |
| [18,] | 5.498105 | 5.433507 | 5.381493 | 5.340601 | 5.309573 | 5.287323 | 5.272894 |
| [19,] | 5.256858 | 5.190993 | 5.137410 | 5.094697 | 5.061637 | 5.037174 | 5.020377 |
| [20,] | 5.034365 | 4.967150 | 4.911943 | 4.867379 | 4.832279 | 4.805615 | 4.786479 |
| [21,] | 4.829509 | 4.760875 | 4.704001 | 4.657566 | 4.620423 | 4.591574 | 4.570132 |
| [22,] | 4.641219 | 4.571112 | 4.512540 | 4.464222 | 4.425044 | 4.394032 | 4.370319 |
| [23,] | 4.468468 | 4.396850 | 4.336561 | 4.286359 | 4.245161 | 4.212013 | 4.186070 |
| [24,] | 4.310269 | 4.237115 | 4.175103 | 4.123027 | 4.079831 | 4.044583 | 4.016456 |
| [25,] | 4.165671 | 4.090971 | 4.027243 | 3.973314 | 3.928152 | 3.890847 | 3.860587 |
| [26,] | 4.033760 | 3.957520 | 3.892095 | 3.836342 | 3.789256 | 3.749944 | 3.717609 |
| [27,] | 3.913658 | 3.835895 | 3.768803 | 3.711269 | 3.662307 | 3.621045 | 3.586700 |
| [28,] | 3.804521 | 3.725264 | 3.656547 | 3.597281 | 3.546503 | 3.503356 | 3.467070 |
| [29,] | 3.705538 | 3.624829 | 3.554538 | 3.493600 | 3.441071 | 3.396109 | 3.357958 |
| [30,] | 3.615936 | 3.533826 | 3.462019 | 3.399475 | 3.345268 | 3.298569 | 3.258634 |
| [31,] | 3.534977 | 3.451523 | 3.378268 | 3.314191 | 3.258383 | 3.210029 | 3.168396 |
| [32,] | 3.461958 | 3.377225 | 3.302594 | 3.237062 | 3.179736 | 3.129813 | 3.086570 |
| [33,] | 3.396216 | 3.310272 | 3.234341 | 3.167437 | 3.108678 | 3.057275 | 3.012513 |
| [34,] | 3.337122 | 3.250042 | 3.172889 | 3.104696 | 3.044593 | 2.991800 | 2.945612 |
| [35,] | 3.284090 | 3.195945 | 3.117652 | 3.048254 | 2.986896 | 2.932805 | 2.885284 |
| [36,] | 3.236567 | 3.147433 | 3.068079 | 2.997562 | 2.935036 | 2.879738 | 2.830977 |
| [37,] | 3.194041 | 3.103992 | 3.023657 | 2.952104 | 2.888497 | 2.832080 | 2.782171 |
| [38,] | 3.156035 | 3.065144 | 2.983905 | 2.911397 | 2.846794 | 2.789346 | 2.738378 |
| [39,] | 3.122112 | 3.030447 | 2.948495 | 2.874995 | 2.809477 | 2.751082 | 2.699140 |
| [40,] | 3.091865 | 2.999493 | 2.916667 | 2.842483 | 2.776129 | 2.716867 | 2.664032 |

|  | [,29] | [,30] | [,31] | [,32] | [,33] | [,34] | [,35] |
|---|---|---|---|---|---|---|---|
| [1,] | 13.861972 | 13.919381 | 13.987449 | 14.065114 | 14.151361 | 14.245367 | 14.346283 |
| [2,] | 13.046562 | 13.099357 | 13.162273 | 13.234299 | 13.314473 | 13.402012 | 13.496110 |
| [3,] | 12.282079 | 12.330473 | 12.388487 | 12.455159 | 12.529576 | 12.610992 | 12.698642 |
| [4,] | 11.565527 | 11.609714 | 11.663057 | 11.724641 | 11.793596 | 11.869210 | 11.950757 |
| [5,] | 10.894093 | 10.934252 | 10.983140 | 11.039881 | 11.103648 | 11.173760 | 11.249527 |
| [6,] | 10.265139 | 10.301436 | 10.346065 | 10.398192 | 10.457025 | 10.521916 | 10.592202 |
| [7,] | 9.676190 | 9.708776 | 9.749331 | 9.797055 | 9.851191 | 9.911117 | 9.976204 |
| [8,] | 9.124923 | 9.153938 | 9.190587 | 9.234103 | 9.283761 | 9.338966 | 9.399113 |
| [9,] | 8.609161 | 8.634732 | 8.667630 | 8.707118 | 8.752503 | 8.803209 | 8.858658 |
| [10,] | 8.126858 | 8.149101 | 8.178392 | 8.214020 | 8.255319 | 8.301735 | 8.352712 |
| [11,] | 7.676097 | 7.695119 | 7.720933 | 7.752856 | 7.790243 | 7.832561 | 7.879276 |
| [12,] | 7.255076 | 7.270973 | 7.293432 | 7.321791 | 7.355429 | 7.393829 | 7.436476 |
| [13,] | 6.862102 | 6.874965 | 6.894180 | 6.919107 | 6.949144 | 6.983792 | 7.022552 |
| [14,] | 6.495586 | 6.505495 | 6.521569 | 6.543186 | 6.569762 | 6.600812 | 6.635853 |
| [15,] | 6.154031 | 6.161063 | 6.174091 | 6.192510 | 6.215754 | 6.243350 | 6.274829 |
| [16,] | 5.836029 | 5.840253 | 5.850324 | 5.865650 | 5.885683 | 5.909958 | 5.938021 |
| [17,] | 5.540253 | 5.541735 | 5.548931 | 5.561263 | 5.578196 | 5.599276 | 5.624060 |
| [18,] | 5.265448 | 5.264251 | 5.268650 | 5.278081 | 5.292020 | 5.310022 | 5.331655 |
| [19,] | 5.010430 | 5.006614 | 5.008291 | 5.014909 | 5.025954 | 5.040989 | 5.059591 |
| [20,] | 4.774075 | 4.767700 | 4.766728 | 4.770617 | 4.778862 | 4.791036 | 4.806722 |
| [21,] | 4.555317 | 4.546441 | 4.542891 | 4.544133 | 4.549671 | 4.559084 | 4.571962 |
| [22,] | 4.353142 | 4.341826 | 4.335768 | 4.334443 | 4.337363 | 4.344111 | 4.354287 |
| [23,] | 4.166583 | 4.152888 | 4.144394 | 4.140581 | 4.140970 | 4.145149 | 4.152722 |
| [24,] | 3.994714 | 3.978705 | 3.967846 | 3.961625 | 3.959570 | 3.961272 | 3.966343 |
| [25,] | 3.836650 | 3.818395 | 3.805246 | 3.796698 | 3.792285 | 3.791602 | 3.794266 |
| [26,] | 3.691542 | 3.671111 | 3.655749 | 3.644957 | 3.638273 | 3.635297 | 3.635650 |
| [27,] | 3.558573 | 3.536042 | 3.518547 | 3.505594 | 3.496727 | 3.491550 | 3.489688 |
| [28,] | 3.436957 | 3.412405 | 3.392860 | 3.377833 | 3.366874 | 3.359590 | 3.355608 |
| [29,] | 3.325940 | 3.299450 | 3.277942 | 3.260930 | 3.247970 | 3.238672 | 3.232666 |
| [30,] | 3.224795 | 3.196454 | 3.173071 | 3.154167 | 3.139299 | 3.128082 | 3.120150 |
| [31,] | 3.132824 | 3.102722 | 3.077556 | 3.056852 | 3.040172 | 3.027132 | 3.017371 |
| [32,] | 3.049355 | 3.017586 | 2.990732 | 2.968324 | 2.949928 | 2.935162 | 2.923669 |
| [33,] | 2.973750 | 2.940406 | 2.911960 | 2.887944 | 2.867929 | 2.851536 | 2.838409 |
| [34,] | 2.905394 | 2.870573 | 2.840631 | 2.815104 | 2.793567 | 2.775644 | 2.760982 |
| [35,] | 2.843706 | 2.807502 | 2.776160 | 2.749220 | 2.726259 | 2.706902 | 2.690802 |
| [36,] | 2.788133 | 2.750642 | 2.717996 | 2.689737 | 2.665448 | 2.644755 | 2.627312 |
| [37,] | 2.738153 | 2.699468 | 2.665612 | 2.636129 | 2.610606 | 2.588671 | 2.569980 |
| [38,] | 2.693276 | 2.653488 | 2.618512 | 2.587898 | 2.561233 | 2.538147 | 2.518301 |

APPENDIX

```
        [,36]      [,37]      [,38]      [,39]      [,40]
[39,]   2.653041   2.612238   2.576232   2.544575   2.516857   2.492710   2.471796
[40,]   2.617021   2.575287   2.538335   2.505721   2.477035   2.451913   2.430017
        [,36]      [,37]      [,38]      [,39]      [,40]
 [1,]  14.453469  14.566230  14.684024  14.806280  14.932531
 [2,]  13.596157  13.701498  13.811615  13.925968  14.044113
 [3,]  12.791945  12.890279  12.993151  13.100048  13.210550
 [4,]  12.037684  12.129397  12.225428  12.325290  12.428583
 [5,]  11.330420  11.415873  11.505442  11.598661  11.695149
 [6,]  10.667381  10.746912  10.830371  10.917314  11.007378
 [7,]  10.045966  10.119891  10.197569  10.278579  10.362573
 [8,]   9.463737   9.532348   9.604554   9.679951   9.758207
 [9,]   8.918404   8.981975   9.048996   9.119080   9.191907
[10,]   8.407820   8.466607   8.528710   8.593760   8.661449
[11,]   7.929971   7.984211   8.041647   8.101923   8.164744
[12,]   7.482966   7.532881   7.585883   7.641629   7.699834
[13,]   7.065032   7.110828   7.159613   7.211056   7.264881
[14,]   6.674505   6.716374   6.761145   6.808496   6.858160
[15,]   6.309820   6.347942   6.388888   6.432345   6.478054
[16,]   5.969509   6.004052   6.041349   6.081097   6.123043
[17,]   5.652192   5.683312   5.717124   5.753336   5.791699
[18,]   5.356569   5.384412   5.414896   5.447733   5.482681
[19,]   5.081417   5.106121   5.133421   5.163035   5.194727
[20,]   4.825581   4.847277   4.871530   4.898064   4.926647
[21,]   4.587972   4.606783   4.628118   4.651708   4.677322
[22,]   4.367559   4.383601   4.402142   4.422915   4.445694
[23,]   4.163363   4.176750   4.192614   4.210693   4.230763
[24,]   3.974456   3.985297   3.998597   4.014098   4.031579
[25,]   3.799954   3.808353   3.819199   3.832236   3.847244
[26,]   3.639012   3.645073   3.653571   3.664253   3.676901
[27,]   3.490823   3.494648   3.500902   3.509336   3.519732
[28,]   3.354613   3.356302   3.360416   3.366706   3.374957
[29,]   3.229640   3.229294   3.231368   3.235617   3.241828
[30,]   3.115191   3.112908   3.113043   3.115353   3.119626
[31,]   3.010577   3.006457   3.004753   3.005225   3.007661
[32,]   2.915139   2.909281   2.905838   2.904572   2.905271
[33,]   2.828242   2.820744   2.815660   2.812755   2.811816
[34,]   2.749275   2.740235   2.733609   2.729162   2.726684
[35,]   2.677653   2.667168   2.659097   2.653205   2.649283
[36,]   2.612816   2.600983   2.591562   2.584319   2.579049
[37,]   2.554231   2.541143   2.530465   2.521965   2.515438
[38,]   2.501391   2.487139   2.475295   2.465629   2.457936
[39,]   2.453815   2.438487   2.425565   2.414821   2.406048
[40,]   2.411049   2.394731   2.380816   2.369077   2.359310
```

```
"THE RESULTS------------------------------------------"
[1] "SPOT PRICE DISTRIBUTION AT FUTURE CALENDAR PERIOD 1"
[1] "Mean Price = 0.032782802336483 Standard Deviation = 0.00383071576255923"

[1] "SPOT PRICE DISTRIBUTION AT FUTURE CALENDAR PERIOD 2"
[1] "Mean Price = 0.0345476490333821 Standard Deviation = 0.0070433264952759"

[1] "SPOT PRICE DISTRIBUTION AT FUTURE CALENDAR PERIOD 3"
"Mean Price = 0.0377805264464832 Standard Deviation = 0.0114481825684166"

[1] "SPOT PRICE DISTRIBUTION AT FUTURE CALENDAR PERIOD 4"
"Mean Price = 0.0385896985443022 Standard Deviation = 0.0123383375990265"

==================================================================
A look at the input files:

forward_price.prn:
0    0.032048638570416
0.25 0.032782802336483
0.5  0.034536211344899
0.75 0.0377463873640723
1    0.0385508540250418
1.25 0.0401662735498693
1.5  0.0417776595698666 market_vols.prn
0.25 22.6
0.5  28.145216
0.75 34.014236
1    31.536027
1.25 29.28638
1.5  27.244215
1.75 25.390397
2    23.707555
2.25 22.179919
2.5  20.793176
2.75 19.53433
3    18.391586
```

APPENDIX

```
3.25 17.354236
3.5 16.41256
3.75 15.557734
4 14.781747
4.25 14.077328
4.5 13.437878
4.75 12.857403
5 12.330464
5.25 11.852125
5.5 11.417902
5.75 11.023727
6 10.665907
6.25 10.341088
6.5 10.046226
6.75 9.778559
7 9.535579
7.25 9.315009
7.5 9.114782
7.75 8.933021
8 8.768024
8.25 8.618244
8.5 8.482279
8.75 8.358853
9 8.246811
9.25 8.145102
9.5 8.052774
9.75 7.968961
10 7.892878 historical_vols.prn
0.25 5.65
0.5 7.036304
0.75 8.503559
1 7.88400675
1.25 7.321595
1.5 6.81105375
1.75 6.34759925
2 5.92688875
2.25 5.54497975
2.5 5.198294
2.75 4.8835825
3 4.5978965
3.25 4.338559
3.5 4.10314
3.75 3.8894335
4 3.69543675
4.25 3.519332
4.5 3.3594695
4.75 3.21435075
5 3.082616
5.25 2.96303125
5.5 2.8544755
5.75 2.75593175
6 2.66647675
6.25 2.585272
6.5 2.5115565
6.75 2.44463975
7 2.38389475
7.25 2.32875225
7.5 2.2786955
7.75 2.23325525
8 2.192006
8.25 2.154561
8.5 2.12056975
8.75 2.08971325
9 2.06170275
9.25 2.0362755
9.5 2.0131935
9.75 1.99224025
10 1.9732195 historical_corrs.prn
1 0.993589743589744 0.987179487179487 0.980769230769231 0.974358974358974 0.967948717948718
0.993589743589744 1 0.993589743589744 0.987179487179487 0.980769230769231 0.974358974358974
0.987179487179487 0.993589743589744 1 0.993589743589744 0.987179487179487 0.980769230769231
0.980769230769231 0.987179487179487 0.993589743589744 1 0.993589743589744 0.987179487179487
0.974358974358974 0.980769230769231 0.987179487179487 0.993589743589744 1 0.993589743589744
0.967948717948718 0.974358974358974 0.980769230769231 0.987179487179487 0.993589743589744 1
0.961538461538462 0.967948717948718 0.974358974358974 0.980769230769231 0.987179487179487 0.993589743589744
0.955128205128205 0.961538461538462 0.967948717948718 0.974358974358974 0.980769230769231 0.987179487179487
0.948717948717949 0.955128205128205 0.961538461538462 0.967948717948718 0.974358974358974 0.980769230769231
0.942307692307692 0.948717948717949 0.955128205128205 0.961538461538462 0.967948717948718 0.974358974358974
0.935897435897436 0.942307692307692 0.948717948717949 0.955128205128205 0.961538461538462 0.967948717948718
0.92948717948718 0.935897435897436 0.942307692307692 0.948717948717949 0.955128205128205 0.961538461538462
0.923076923076923 0.92948717948718 0.935897435897436 0.942307692307692 0.948717948717949 0.955128205128205
0.916666666666667 0.923076923076923 0.92948717948718 0.935897435897436 0.942307692307692 0.948717948717949
0.91025641025641 0.916666666666667 0.923076923076923 0.92948717948718 0.935897435897436 0.942307692307692
0.903846153846154 0.91025641025641 0.916666666666667 0.923076923076923 0.92948717948718 0.935897435897436
0.897435897435897 0.903846153846154 0.91025641025641 0.916666666666667 0.923076923076923
```

APPENDIX

```
0.891025641025641  0.897435897435897  0.903846153846154  0.91025641025641   0.916666666666667
0.884615384615385  0.891025641025641  0.897435897435897  0.903846153846154  0.91025641025641
0.878205128205128  0.884615384615385  0.891025641025641  0.897435897435897  0.903846153846154
0.871794871794872  0.878205128205128  0.884615384615385  0.891025641025641  0.897435897435897
0.865384615384615  0.871794871794872  0.878205128205128  0.884615384615385  0.891025641025641
0.858974358974359  0.865384615384615  0.871794871794872  0.878205128205128  0.884615384615385
0.852564102564103  0.858974358974359  0.865384615384615  0.871794871794872  0.878205128205128
0.846153846153846  0.852564102564103  0.858974358974359  0.865384615384615  0.871794871794872
0.83974358974359   0.846153846153846  0.852564102564103  0.858974358974359  0.865384615384615
0.833333333333333  0.83974358974359   0.846153846153846  0.852564102564103  0.858974358974359
0.826923076923077  0.833333333333333  0.83974358974359   0.846153846153846  0.852564102564103
0.82051282051282   0.826923076923077  0.833333333333333  0.83974358974359   0.846153846153846
0.814102564102564  0.82051282051282   0.826923076923077  0.833333333333333  0.83974358974359
0.807692307692308  0.814102564102564  0.82051282051282   0.826923076923077  0.833333333333333
0.801282051282051  0.807692307692308  0.814102564102564  0.82051282051282   0.826923076923077
0.794871794871795  0.801282051282051  0.807692307692308  0.814102564102564  0.82051282051282
0.788461538461538  0.794871794871795  0.801282051282051  0.807692307692308  0.814102564102564
0.782051282051282  0.788461538461538  0.794871794871795  0.801282051282051  0.807692307692308
0.775641025641026  0.782051282051282  0.788461538461538  0.794871794871795  0.801282051282051
0.769230769230769  0.775641025641026  0.782051282051282  0.788461538461538  0.794871794871795
0.762820512820513  0.769230769230769  0.775641025641026  0.782051282051282  0.788461538461538
0.756410256410256  0.762820512820513  0.769230769230769  0.775641025641026  0.782051282051282
0.75  0.756410256410256  0.762820512820513  0.769230769230769  0.775641025641026  0.782051282051282
```

APPENDIX

```
[1] "REGULAR SWAP FIX LOCK OUT TERM =   3.39281571"
[1] "REGULAR SWAP FIX FULL TERM =   4.25942299"
[1] 0.010000 1.170042
        [,1]        [,2]
 [1,]      0  0.03294195
 [2,]     90  0.03492309
 [3,]    180  0.03922218
 [4,]    270  0.04098016
 [5,]    360  0.04404054
 [6,]    450  0.04697589
 [7,]    540  0.05081491
 [8,]    630  0.05219310
 [9,]    720  0.05545805
[10,]    810  0.05824103
[11,]    900  0.06101706
[12,]    990  0.06378616
[13,]   1080  0.06654835
[14,]   1170  0.06930364
[15,]   1260  0.07205205
[1] "================= TRIAL 1 ================="
[1] " swapfix     cumpandl"
         [,1]         [,2]
 [1,] 0.03392816   0.21148160
 [2,] 0.03479476   0.16194252
 [3,] 0.03566137   0.11240345
 [4,] 0.03652798   0.06286437
 [5,] 0.03739459   0.01332530
 [6,] 0.03826119  -0.03621378
 [7,] 0.03912780  -0.08575286
 [8,] 0.03999441  -0.13529193
 [9,] 0.04086102  -0.18483101
[10,] 0.04172762  -0.23437009
[11,] 0.04259423  -0.28390916
[1] "THE WINNER IS SWAPFIX = 0.0373945861981745 WITH CUMM P&L = 0.0133252951392391"
[1] "================= TRIAL 2 ================="
[1] " swapfix     cumpandl"
         [,1]         [,2]
 [1,] 0.03652798   0.082153250
 [2,] 0.03670130   0.072164346
 [3,] 0.03687462   0.062175441
 [4,] 0.03704794   0.052186536
 [5,] 0.03722126   0.042197632
 [6,] 0.03739459   0.032208727
 [7,] 0.03756791   0.022219823
 [8,] 0.03774123   0.012230918
 [9,] 0.03791455   0.002242013
[10,] 0.03808787  -0.007746891
[11,] 0.03826119  -0.017735796
[1] "THE WINNER IS SWAPFIX = 0.0379145505693015 WITH CUMM P&L = 0.0022420134260132"
```

APPENDIX

```
> ptntiassimsdlt(payrec, 10,4,npastr, 4.5, npaterm, vols, mvols, valpha,
        ralpha, corrs+ ,2000)
       [,1] [,2]
 [1,]  10.5  6.25
 [2,]  10.0  5.25
 [3,]  48.5  4.25
 [4,] -69.0  3.25
       [,1]    [,2]
 [1,]  0.25 23.96907
 [2,]  0.50 35.68826
 [3,]  0.75 48.25219
 [4,]  1.00 31.75072
 [5,]  1.25 29.07738
 [6,]  1.50 26.75699
 [7,]  1.75 24.75189
 [8,]  2.00 23.02744
 [9,]  2.25 21.55173
[10,]  2.50 20.29539
       [,1]    [,2]     [,3]
 [1,]  0.25 22.60000 19.14885
 [2,]  0.50 21.31889 18.07672
 [3,]  0.75 20.12067 17.07474
 [4,]  1.00 19.00059 16.13890
 [5,]  1.25 17.95417 15.26545
 [6,]  1.50 16.97721 14.45085
 [7,]  1.75 16.06578 13.69176
 [8,]  2.00 15.21616 12.98507
 [9,]  2.25 14.42487 12.32780
[10,]  2.50 13.68862 11.71718
[1] "Which currency are you calculating vols for?"
[1] "    1) usdpr"
[1] "    2) usdcp"
[1] "    3) usdli"
[1] "    4) jpy"
[1] "    5) gbp"
[1] "    6) dem"
[1] "    7) cad"
[1] "    8) esp"
[1] "    9) itl"
[1] "   10) bec"
[1] "   11) ecu"
[1] "   12) test data"
[1] "   13) you provide the file name"
1: 12
[1] "REGULAR SWAP FIX LOCK OUT TERM = 3.42575534"
[1] "REGULAR SWAP FIX FULL TERM = 4.19849838"
[1] 0.0100000 0.9933305
       [,1]      [,2]
 [1,]    0 0.03204864
 [2,]   90 0.03278280
 [3,]  180 0.03453621
 [4,]  270 0.03774639
 [5,]  360 0.03960670
 [6,]  450 0.04299870
 [7,]  540 0.04616321
 [8,]  630 0.04993312
 [9,]  720 0.05190803
[10,]  810 0.05454531
[11,]  900 0.05578277
[12,]  990 0.05812371
[13,] 1080 0.06045881
[14,] 1170 0.06278808
[15,] 1260 0.06511153
[16,] 1350 0.06742918
[17,] 1440 0.06974104
[18,] 1530 0.07204713
[19,] 1620 0.07434746
[1] "st= 1 mean p&l= -0.3144"
[1] "st= 1 mean cum p&l= -0.3144"
[1] "st= 1 mean npa= 100"
[1] "st= 1 mean delta= 0"
[1] "st= 2 mean p&l= -0.3047"
[1] "st= 2 mean cum p&l= -0.6192"
[1] "st= 2 mean npa= 100"
[1] "st= 2 mean delta= 0.0025"
[1] "st= 3 mean p&l= -0.259"
[1] "st= 3 mean cum p&l= -0.8782"
[1] "st= 3 mean npa= 100"
[1] "st= 3 mean delta= 0.0025"
[1] "st= 4 mean p&l= -0.1784"
[1] "st= 4 mean cum p&l= -1.0566"
[1] "st= 4 mean npa= 100"
[1] "st= 4 mean delta= 0.0025"
[1] "st= 5 mean p&l= 0.0545"
[1] "st= 5 mean cum p&l= -1.0021"
[1] "st= 5 mean npa= 42.4688"
```

APPENDIX 1

```
[1] "st= 5 mean delta= 0.0014"
[1] "st= 6 mean p&l= 0.0998"
[1] "st= 6 mean cum p&l= -0.9023"
[1] "st= 6 mean npa= 34.1136"
[1] "st= 6 mean delta= 0.0008"
[1] "st= 7 mean p&l= 0.1225"
[1] "st= 7 mean cum p&l= -0.7798"
[1] "st= 7 mean npa= 29.9757"
[1] "st= 7 mean delta= 0.0007"
[1] "st= 8 mean p&l= 0.1405"
[1] "st= 8 mean cum p&l= -0.6393"
[1] "st= 8 mean npa= 27.596"
[1] "st= 8 mean delta= 0.0006"
[1] "st= 9 mean p&l= 0.1422"
[1] "st= 9 mean cum p&l= -0.4971"
[1] "st= 9 mean npa= 25.8189"
[1] "st= 9 mean delta= 0.0006"
[1] "st= 10 mean p&l= 0.1507"
[1] "st= 10 mean cum p&l= -0.3463"
[1] "st= 10 mean npa= 24.6209"
[1] "st= 10 mean delta= 0.0005"
[1] "Press RETURN to go to the next page of the graph."
1: [1] "Press RETURN when done viewing the graph."

"A SUMMARY OF THE RESULTS PER FUTURE CALENDAR PERIOD:"

meannpa    meanpandl  meancumpandl   meandelta
 [1,] 0.00 100.00000 -0.31444411   -0.3144441 0.0000000000
 [2,] 0.25 100.00000 -0.30473285   -0.6191770 0.0025012419
 [3,] 0.50 100.00000 -0.25899045   -0.8781674 0.0024784634
 [4,] 0.75 100.00000 -0.17840843   -1.0565758 0.0024530407
 [5,] 1.00  42.46880  0.05446976   -1.0021061 0.0013704826
 [6,] 1.25  34.11364  0.09979100   -0.9023151 0.0008247558
 [7,] 1.50  29.97578  0.12251175   -0.7798033 0.0006870546
 [8,] 1.75  27.59602  0.14047912   -0.6393242 0.0006083478
 [9,] 2.00  25.81896  0.14224548   -0.4970787 0.0005607684
[10,] 2.25  24.62097  0.15073599   -0.3463427 0.0005242700
```

"THE OVERALL VALUE OF THIS INDEX AMORTIZING SWAP, IN PRESENT $ TERMS, IS:

-0.346342% * ORIGINAL NOTIONAL PRINCIPAL AMOUNT"

Hence, for an ORIGINAL NOTIONAL PRINCIPAL AMOUNT of $100,000,000, the Index Amortizing Swap would have negative market value for the payor of the fixed rate (meaning that the receiver of the fixed rate would be holding a net positive market value product) -- the absolute value of which would be $346,342.70.

APPENDIX

```
> swaptionsims(nexpopt, nexpswp, vols, mvols, valpha, ralpha, corrs, nsims)
        [,1]     [,2]
 [1,]  0.25  23.96907
 [2,]  0.50  35.68826
 [3,]  0.75  48.25219
 [4,]  1.00  31.75072
 [5,]  1.25  29.07738
 [6,]  1.50  26.75699
 [7,]  1.75  24.75189
 [8,]  2.00  23.02744
 [9,]  2.25  21.55173
[10,]  2.50  20.29539
[11,]  2.75  19.23142
[12,]  3.00  18.33520
[13,]  3.25  17.58437
[14,]  3.50  16.95888
[15,]  3.75  16.44092
[16,]  4.00  16.01486
[17,]  4.25  15.66714
[18,]  4.50  15.38615
[19,]  4.75  15.16191
[20,]  5.00  14.98611
[21,]  5.25  14.85175
[22,]  5.50  14.75290
[23,]  5.75  14.68471
[24,]  6.00  14.64311
[25,]  6.25  14.62465
[26,]  6.50  14.62649
[27,]  6.75  14.64623
[28,]  7.00  14.68183
        [,1]       [,2]       [,3]
 [1,]  0.25  22.600000  13.816486
 [2,]  0.50  21.318891  13.005086
 [3,]  0.75  20.120674  12.244446
 [4,]  1.00  19.000589  11.531583
 [5,]  1.25  17.954167  10.863697
 [6,]  1.50  16.977213  10.238162
 [7,]  1.75  16.065781   9.652516
 [8,]  2.00  15.216165   9.104446
 [9,]  2.25  14.424873   8.591785
[10,]  2.50  13.688618   8.112496
[11,]  2.75  13.004297   7.664671
[12,]  3.00  12.368977   7.246514
[13,]  3.25  11.779881   6.856341
[14,]  3.50  11.234376   6.492567
[15,]  3.75  10.729957   6.153701
[16,]  4.00  10.264239   5.838337
[17,]  4.25   9.834943   5.545153
[18,]  4.50   9.439888   5.272894
[19,]  4.75   9.076982   5.020377
[20,]  5.00   8.744217   4.786479
[21,]  5.25   8.439661   4.570132
[22,]  5.50   8.161456   4.370319
[23,]  5.75   7.907816   4.186070
[24,]  6.00   7.677022   4.016456
[25,]  6.25   7.467424   3.860587
[26,]  6.50   7.277441   3.717609
[27,]  6.75   7.105564   3.586700
[28,]  7.00  14.68183
        [,1]       [,2]       [,3]
 [1,]  0.25  22.600000  13.816486
 [2,]  0.50  21.318891  13.005086
 [3,]  0.75  20.120674  12.244446
 [4,]  1.00  19.000589  11.531583
 [5,]  1.25  17.954167  10.863697
 [6,]  1.50  16.977213  10.238162
 [7,]  1.75  16.065781   9.652516
 [8,]  2.00  15.216165   9.104446
 [9,]  2.25  14.424873   8.591785
[10,]  2.50  13.688618   8.112496
[11,]  2.75  13.004297   7.664671
[12,]  3.00  12.368977   7.246514
[13,]  3.25  11.779881   6.856341
[14,]  3.50  11.234376   6.492567
[15,]  3.75  10.729957   6.153701
[16,]  4.00  10.264239   5.838337
[17,]  4.25   9.834943   5.545153
[18,]  4.50   9.439888   5.272894
[19,]  4.75   9.076982   5.020377
[20,]  5.00   8.744217   4.786479
[21,]  5.25   8.439661   4.570132
[22,]  5.50   8.161456   4.370319
[23,]  5.75   7.907816   4.186070
[24,]  6.00   7.677022   4.016456
```

APPENDIX

```
[25,]  6.25   7.467424   3.860587
[26,]  6.50   7.277441   3.717609
[27,]  6.75   7.105564   3.586700
[28,]  7.00   6.950354   3.467070
[1] "Which currency are you calculating vols for?"
[1] "    1) usdpr"
[1] "    2) usdcp"
[1] "    3) usdli"
[1] "    4) jpy"
[1] "    5) gbp"
[1] "    6) dem"
[1] "    7) cad"
[1] "    8) esp"
[1] "    9) itl"
[1] "   10) bec"
[1] "   11) ecu"
[1] "   12) test data"
[1] "   13) you provide the file name"
1: 12

[1] 0.03249376

[1] "SWAP FIX =  6.73901796"

[1] "st= 2 SwapVAlue= 0.0674"
[1] "st= 2 curr vol= 15.49"
[1] "st= 2 swap vol= 15.49"
[1] "st= 3 SwapVAlue= 0.0674"
[1] "st= 3 curr vol= 14.73"
[1] "st= 3 swap vol= 15.12"
[1] "st= 4 SwapVAlue= 0.0674"
[1] "st= 4 curr vol= 14.92"
[1] "st= 4 swap vol= 15.05"
[1] "st= 5 SwapVAlue= 0.0674"
[1] "st= 5 curr vol= 14.25"
[1] "st= 5 swap vol= 14.86"
[1] "st= 6 SwapVAlue= 0.0674"
[1] "st= 6 curr vol= 13.62"
[1] "st= 6 swap vol= 14.62"
[1] "st= 7 SwapVAlue= 0.0675"
[1] "st= 7 curr vol= 14.26"
[1] "st= 7 swap vol= 14.56"
[1] "st= 8 SwapVAlue= 0.0675"
[1] "st= 8 curr vol= 14.46"
[1] "st= 8 swap vol= 14.54"
[1] "st= 9 SwapVAlue= 0.0675"
[1] "st= 9 curr vol= 13.64"
[1] "st= 9 swap vol= 14.43"
[1] "Press RETURN when done viewing the graph."
1:
[1] "SWAPTION VOLATILITY -- SIMULATIONS = 0.14433665795304"

"HENCE THE SWAPTION VOLATILITY CALCULATED USING THE SIMULATIONS IS GIVEN BY 14.43%"
```

- 79 -

APPENDIX V

```
> swaptiontheo(nexpopt, nexpswp, vols, mvols, valpha, ralpha, corrs)
         [,1]    [,2]
 [1,]    0.25  23.96907
 [2,]    0.50  35.68826
 [3,]    0.75  48.25219
 [4,]    1.00  31.75072
 [5,]    1.25  29.07738
 [6,]    1.50  26.75699
 [7,]    1.75  24.75189
 [8,]    2.00  23.02744
 [9,]    2.25  21.55173
[10,]    2.50  20.29539
[11,]    2.75  19.23142
[12,]    3.00  18.33520
[13,]    3.25  17.58437
[14,]    3.50  16.95888
[15,]    3.75  16.44092
[16,]    4.00  16.01486
[17,]    4.25  15.66714
[18,]    4.50  15.38615
[19,]    4.75  15.16191
[20,]    5.00  14.98611
[21,]    5.25  14.85175
[22,]    5.50  14.75290
[23,]    5.75  14.68471
[24,]    6.00  14.64311
[25,]    6.25  14.62465
[26,]    6.50  14.62649
[27,]    6.75  14.64623
[28,]    7.00  14.68183
[29,]    7.25  14.73150
         [,1]      [,2]        [,3]
 [1,]    0.25  22.600000  13.861972
 [2,]    0.50  21.318891  13.046562
 [3,]    0.75  20.120674  12.282079
 [4,]    1.00  19.000589  11.565527
 [5,]    1.25  17.954167  10.894093
 [6,]    1.50  16.977213  10.265139
 [7,]    1.75  16.065781   9.676190
 [8,]    2.00  15.216165   9.124923
 [9,]    2.25  14.424873   8.609161
[10,]    2.50  13.688618   8.126858
[11,]    2.75  13.004297   7.676097
[12,]    3.00  12.368977   7.255076
[13,]    3.25  11.779881   6.862102
[14,]    3.50  11.234376   6.495586
[15,]    3.75  10.729957   6.154031
[16,]    4.00  10.264239   5.836029
[17,]    4.25   9.834943   5.540253
[18,]    4.50   9.439888   5.265448
[19,]    4.75   9.076982   5.010430
[20,]    5.00   8.744217   4.774075
[21,]    5.25   8.439661   4.555317
[22,]    5.50   8.161456   4.353142
[23,]    5.75   7.907816   4.166583
[24,]    6.00   7.677022   3.994714
[25,]    6.25   7.467424   3.836650
[26,]    6.50   7.277441   3.691542
[27,]    6.75   7.105564   3.558573
[28,]    7.00   6.950354   3.436957
[29,]    7.25   6.810443   3.325940
[1] "Which currency are you calculating vols for?"
[1] "    1) usdpr"
[1] "    2) usdcp"
[1] "    3) usdli"
[1] "    4) jpy"
[1] "    5) gbp"
[1] "    6) dem"
[1] "    7) cad"
[1] "    8) esp"
[1] "    9) itl"
[1] "   10) bec"
[1] "   11) ecu"
[1] "   12) test data"
[1] "   13) you provide the file name"
1: 12
[1] 0.03249376
```

APPENDIX \

[1] "SWAP FIX =  6.73901796"

[1] "SWAPTION VOL 1 0.153269785277403 0.153269785277403"
[1] "SWAPTION VOL 2 0.148881311906279 0.151091482410353"
[1] "SWAPTION VOL 3 0.145431071509678 0.149228536898241"
[1] "SWAPTION VOL 4 0.142907523228564 0.147673651060109"
[1] "SWAPTION VOL 5 0.141301195437657 0.146421348649575"
[1] "SWAPTION VOL 6 0.144570657928558 0.146114528045468"
[1] "SWAPTION VOL 7 0.143769114703447 0.145781779274127"
[1] "SWAPTION VOL 8 0.139611886973744 0.145024898363471"

[1] "SWAPTION VOL - THEORETICAL = 0.145024898363471"

"HENCE, THE SWAPTION VOL -- CALCULATED USING THE DISCRETE VOLATILITY MATRIX AND A THEORETICAL MATRIX"

What is claimed is:

1. A method for using an apparatus to generate output by processing input market data in accordance with factors defined by testing for accuracy, the method including the steps of:

controlling a data processing system apparatus comprising a digital electrical computer with the processor operably connected to memory, means for receiving input data, and means for outputting processed market data, the processor controlled with logic means so that the system performs a step of processing input data entered at the means for inputting data to calculate projected market data respectively for each of a plurality of variables, and a step of generating output including the projected data at the means for outputting processed data; wherein the step of controlling includes directing the logic means with factors defined by testing for accuracy by preprocessing at least a portion of input test market data entered at the means for inputting data to calculate projected test data for each of the variables and preprocessing the projected test data to derive processed data equal to a portion of the input test data; and the step of processing includes computing $$V[1, n] = \sqrt{n*(M[n])^2 - \sum_{k=1}^{n-1}(V[n-k+1, k])^2},$$

wherein V represents a discrete volatility matrix and is a portion of the projected data, M is a vector representing a portion of the input data, n represents an index number and k represents a summation coefficient.

2. The method of claim 1, wherein the input test data includes a liquid financial product market price; and wherein the step of preprocessing the projected test data includes preprocessing the projected test data to derive the liquid financial product market price.

3. The method of claim 1, wherein the input data includes a liquid financial product market price; and wherein the step of controlling further includes the step of:

processing the projected data, including projected data representing a projected liquid financial product price, and deriving an illiquid financial product expected price from the projected data.

4. The method of claim 1, wherein the input data includes price data; and wherein the step of controlling the digital computer with logic means includes:

processing the input data to compute discrete forward price volatilities across forward prices and future calendar periods; and wherein:

a portion of the projected data represents discrete forward price volatilities.

5. The method of claim 1, wherein the step of processing includes:

if $m=1$, then computing $A[k,m]=\rho[k,m]*V[n,k]*V[n,m]/A[m,m]$;

if $k>m>1$, then computing $A[k,m]=\rho[k,m]*V[k,n]=V[k,m]$ $$A[m, m] - \sum_{l=1}^{m-1}(A[k, 1]$$

$*A[m,1]/A[m,m])$;

and if $m=k$, then computing $A[k,m]=$ $$\sqrt{\left(V[n, k]^2 - \sum_{l=1}^{k-1}(A[k, 1])^2\right)};$$

if $m>k$, then setting $A[k,m]=\phi$;

wherein

V represents a discrete volatility matrix; k represents an index number, m represents matrix column, l represents a summation coefficient, and A represents a random number coefficients matrix for a simulation having a simulation node denoted by n, the randomn number coefficients matrix including a portion of the projected data, and ρ represents a correlation matrix including a portion of the input data.

6. The method of claim 5, wherein the step of processing includes:

computing $F[m, s]=F[m+1,s]*$ exponent $(-(V[n,m])^2/2=(T[m]-T[m-1]))*$ exponent $$\left(\sum_{k=1}^{m} A[m, k] * Z[s, k]\right);$$

wherein;

F is a forward price matrix for the simulation node n and is a portion of the projected data, T is a vector and a portion of the input data representing future time periods corresponding respectively to each said simulation node and includes a portion of the input data, Z is a matrix of random normally distributed numbers, Z[s,k] is one of the random normally distributed numbers, and s represents an index number.

7. The method of claim 1, wherein some of the variables represent driver factors used in the processing.

8. The method of claim 7, wherein the step or preprocessing the projected test data include using the driver factors to derive the portion of the input test data from the projected test data.

9. The method of claim 7, wherein the step of controlling the digital computer with logic means further comprises forming a simulation of future behavior for each said driver factor to produce a corresponding driver factor distribution of values.

10. The method of claim 9 wherein one of the variables is a dependent variable; and wherein the step of controlling the digital computer with logic means further comprises processing the values of at leas one of the driver factor distributions to form a simulation of future behavior of the dependent variable represented by a distribution of values for the dependent variable.

11. The method of claim 10, wherein the step of processing the values for the dependent variable includes processing such that an increased number of the values in the distribution of values for the dependent variable produces increased convergence on the portion of input data.

12. The method of claim 10, wherein the step of processing produces the output data including confidence intervals at the 66th percentile, the 95th percentile, and the 99th percentile.

13. The method of claim 10, wherein the dependent variable represents a liquid financial product price.

14. The method of claim 13, wherein the input data includes a liquid financial product market price; and wherein the step of processing the values for the dependent variable includes processing such that an increased number of the values in the distribution of values for the dependent variable produces increased convergence on the liquid financial product market price.

15. The method of claim 10, wherein the dependent variable represents a illiquid financial product price.

16. The method of claim 15, wherein the input data includes a liquid financial product market price; and wherein the step of processing the values for the dependent variable includes processing such that an increased number of the values in the distribution of values for the dependent variable produces increased convergence on the illiquid financial product expected price.

17. The method of claim 7, wherein the input data includes market forward prices; and wherein some of the driver factors represent forward prices.

18. The method of claim 17, wherein one of the variables represents a liquid financial product price.

19. The method of claim 18, wherein the step of processing includes applying the driver factors to form a distribution of the values for the liquid financial product price.

20. The method of claim 17, wherein one of the variables represents an illiquid financial product price.

21. The method of claim 20, wherein the step of processing includes applying the driver factors to form a distribution of the values for the illiquid financial product price.

22. The method of claim 1, wherein the input data includes price data; and wherein:
the step of controlling the digital computer with logic means includes processing the input data into discrete future forward prices across future calendar periods; and wherein:
a portion of the projected data represents the future forward prices.

23. The method of claim 22, wherein the input data further includes a function representing cash flow of a financial product across the future calendar periods; and wherein the step of controlling the digital computer with logic means includes the steps of:
generating forward price distributions from the projected data;
generating a cash flow distribution from the forward price distributions; and
calculating a price for the financial product from the generated cash flow distribution.

24. The method of claim 23, wherein the input function represents cash flow for an illiquid financial product.

25. The method of claim 23, wherein the step of controlling the digital computer with logic means further includes computing a delta value for the financial product; and wherein the output includes the computed delta value.

26. The method of claim 23, wherein the input function represents cash flow for a portfolio of financial products.

27. The method of claim 26, wherein the step of controlling the digital computer with logic means further includes calculating a mean replacement cost of the portfolio; and wherein the output includes the mean replacement cost.

28. The method of claim 23, wherein the financial product is an index amortizing swap; and wherein the step of controlling the digital computer with logic means further includes the step of computing a break even price for the index amortizing swap; and wherein the output includes the break even price.

29. The method of claim 28, further comprising the step of adding a spread to the break even price to produce a price quote for the index amortizing swap.

30. The method of claim 23, wherein the financial product is represented by swaption volatility; and wherein the step of controlling the digital computer with logic means further includes the step of computing a break even price for the financial product represented by the swaption volatility; and wherein the output includes the break even price.

31. The method of claim 30, further comprising the step of adding a spread to the break even price to produce a price quote for the financial product.

32. The method of claim 30, wherein the step of controlling the digital computer with logic means further includes the step of computing a delta value for the financial product represented by the swaption volatility; and wherein the output includes the delta valve.

33. The method of claim 32, wherein the step of controlling the digital computer with logic means further includes the step of generating a remaining distribution after changing the portfolio by adding a financial product to the portfolio or by removing a financial product from the portfolio.

34. The method of any one of claims 1–33 further comprising the step of:
making a buy/sell/keep decision in response to the output, such that if the projected data includes a datum greater than a sale price for a financial product then making a buy decision, and if the projected data includes a datum less than the sale price then making a sell decision, and otherwise making a keep decision.

35. A method for using an apparatus to generate output by processing market data in accordance with factors defined by testing for accuracy, the method including the step of:
controlling a data processing system apparatus comprising a digital electrical computer with the processor operably connected to memory, means for receiving market data, and means for outputting processed market data, the processor controlled with logic means so that the system performs a step of processing input market data entered at the means for inputting market data to calculate projected market data respectively for each of a plurality of variables, and a step of generating output including the projected market data at the means for outputting processed market data;
wherein the step of controlling includes directing the logic means with factors defined by testing for accuracy by preprocessing at least a portion of input test market data entered at the means for inputting market data to calculate projected test market data for each of the variables and preprocessing the projected test market data to derive processed market data equal to a portion of the input test market data;
wherein some of the variables represent driver factors used in the processing, and the step of controlling further comprises forming a simulation of future behavior for each said driver factor to produce a corresponding driver factor distribution of values;
the variables include a plurality of dependent variables; and wherein the step of controlling the digital computer with logic means further comprises:
processing the values of at least one of the driver factor distributions to form a simulation of future behavior of the dependent variables represented by distributions of values for each said dependent variable; and wherein the step of processing the values for each said dependent variable includes:
a calculating an average value for each said distribution such that an increased number of the values in the distribution of values for the dependent variable produces increased convergence on the portion of the input market data;

and computing $V[1,n] = \sqrt{n*(M[n])^2 - \Sigma^{n-1}(V[n-k+1, k])^2}$, wherein V represents a discrete volatility matrix and is a portion of the projected market data, M is a vector representing a portion of the input market data, n represents an index number and k represents a summation coefficient.

36. The method of claim 35, wherein the variables include volatilities; and
wherein the step of controlling the digital computer with logic means further comprises:
processing the projected data to form distributions of the volatilities, each distribution of the volatilities having an average, the distributions of the volatilities being generated so that the averages of the distributions of volatilities converge to the volatilities within the input data with increased numbers or the volatilities generated; and wherein the output includes the distributions of volatilities.

37. The method of claim 35, wherein the input data includes market forward prices, market option volatilities, historical forward price volatilities, and historical correlations between the forward prices.

38. A data processing system apparatus for generating output by processing defined by testing, the output including projected market data for variables, the data processing system including:
a digital electrical computer having a processor operably connected to memory, to means for receiving input market data, and to means for outputting processed market data; and means for programming the digital electrical computer to process input-data, entered at the means for inputting data, to calculate projected data respectively for each of a plurality of variables, and for generating output including the projected data at the means for outputting processed data; wherein
the means for programming is made by a process including adjusting the means for programming and then testing for accuracy by preprocessing input test market data, entered at the means for inputting data, to calculate projected test data for each of the variables and followed by preprocessing the projected test data, the adjusting being carried out until the means for programming is adjusted sufficiently to derive processed data that converges to a portion of the input test data; and
said processing includes computing $$V[1, n] = \sqrt{n*(M[n])^2 - \sum_{k=1}^{n-1} (V[n-k+1, k])^2},$$

wherein V represents a discrete volatility matrix and is a portion of the projected data, M is a vector representing a portion of the input data, n represents an index number and k represents a summation coefficient.

39. An article of manufacture for making a data processing system generate projected market data for variables, the article of manufacturing including:
a disk storing logic means readable by a data processing system comprising a digital electrical computer having a processor operably connected to a disk drive, and operable for controlling the digital electrical computer to perform a step of processing input data, entered at the means for inputting data, to calculate projected market data respectively for each of a plurality of variables, and the step of generating output including the projected data at the means for outputting processed market data; wherein
the logic means is made by a process including testing the processing for accuracy by preprocessing input test market data, entered at the means for inputting data, to calculate projected test data for each of the variables and preprocessing the projected test data until the processing defines factors for the logic means that derive a portion of the input test data from the projected test data; and
said processing includes computing $$V[1, n] = \sqrt{n*(M[n])^2 - \sum_{k=1}^{n-1} (V[n-k+1, k])^2},$$

wherein V represents a discrete volatility matrix and is a portion of the projected data, M is a vector representing a portion of the input data, n represents an index number and k represents a summation coefficient.

40. A computer-implemented method for using a data processing system apparatus comprising a digital electrical computer with the processor operably connected to memory, means for receiving input market data, and means for outputting processed market data, the method including the steps of:
processing, by logic means direction of processor operations, input historical market data entered at the means for inputting data into processed market data, by substeps including creating a three-dimensional framework using a statistical iterative search process to break down the input market data into time-sensitive building blocks; using the building blocks in calibrating implied volatility parameter values functionally related to mathematically expressed econometric relationships, articulating end conditions to bound the statistical iterative search process, and generating data for each of a plurality of variables until the processed data converge on the input historical data;
projecting future data with the three-dimensional framework subsequent to the calibrating; and
generating output including the future market data at the means for outputting processed data;
wherein the step of processing includes computing $$V[1, n] = \sqrt{n*(M[n])^2 - \sum_{k=1}^{n-1} (V[n-k+1, k])^2},$$

wherein V represents a discrete volatility matrix and is a portion of the projected data, M is a vector representing a portion of the input data, n represents an index number and k represents a summation coefficient.

41. A computer-implemented method for using a data processing system apparatus comprising a digital electrical computer with the processor operably connected to memory, means for receiving input market data, and means for outputting processed market data, the method including the steps of:
processing, by, logic means direction of processor operations, input historical data entered at the means for inputting data into processed market data, by substeps including creating a three-dimensional framework utilizing the input historical data to articulate parameter values by breaking down the input historical data into building blocks with values, and by comparing the building block values so that the parameter values are calibrated for each cell of the three-dimensional framework to project market data by mathematically-expressed econometric relationships;

projecting future data with the three-dimensional framework subsequent to the calibrating; and generating output including the future market data at the means for outputting processed data;

wherein the step of processing includes computing $$V[1, n] = \sqrt{n*(M[n])^2 - \sum_{k=1}^{n-1}(V[n-k+1,k])^2},$$

wherein V represents a discrete volatility matrix and is a portion of the projected data, M is a vector representing a portion of the input data, n represents an index number and k represents a summation coefficient.

* * * * *